(12) United States Patent
Konig et al.

(10) Patent No.: US 11,367,080 B2
(45) Date of Patent: Jun. 21, 2022

(54) SYSTEMS AND METHODS RELATING TO CUSTOMER EXPERIENCE AUTOMATION

(71) Applicant: Genesys Telecommunications Laboratories, Inc., Daly City, CA (US)

(72) Inventors: Yochai Konig, Daly City, CA (US); Archana Sekar, Chennai (IN); James Hvezda, Markham (CA); Javier Villalobos, Daly City, CA (US)

( * ) Notice: Subject to any disclaimer, the term of this patent is extended or adjusted under 35 U.S.C. 154(b) by 167 days.

(21) Appl. No.: 16/730,698

(22) Filed: Dec. 30, 2019

(65) Prior Publication Data
US 2021/0201327 A1    Jul. 1, 2021

(51) Int. Cl.
| | |
|---|---|
| G06Q 30/00 | (2012.01) |
| H04M 3/42 | (2006.01) |
| H04M 3/51 | (2006.01) |
| G06N 3/08 | (2006.01) |
| G06F 9/455 | (2018.01) |

(52) U.S. Cl.
CPC ....... *G06Q 30/016* (2013.01); *G06F 9/45558* (2013.01); *G06N 3/08* (2013.01); *H04M 3/42221* (2013.01); *H04M 3/5191* (2013.01); *G06F 2009/45595* (2013.01); *H04M 2203/552* (2013.01)

(58) Field of Classification Search
CPC ...... G06F 9/45558; G06F 2009/45595; G06N 3/08; G06Q 30/016; H04M 3/42; H04M 3/42221; H04M 3/51; H04M 3/5191; H04M 3/523; H04M 2203/552
USPC .......................... 379/265.01–265.14; 705/304
See application file for complete search history.

(56) References Cited

U.S. PATENT DOCUMENTS

| | | | |
|---|---|---|---|
| 2001/0023402 A1* | 9/2001 | Flynn ................... | G06Q 30/016 705/304 |
| 2004/0103017 A1* | 5/2004 | Reed ..................... | G06Q 30/02 705/7.31 |
| 2014/0314225 A1 | 10/2014 | Riahi et al. | |
| 2015/0201077 A1* | 7/2015 | Konig ................. | H04M 3/5175 379/265.07 |
| 2015/0256677 A1 | 9/2015 | Konig et al. | |

(Continued)

OTHER PUBLICATIONS

PCT Search Report and Written Opinion of co-pending PCT application No. PCT/US2020/067311 dated Feb. 18, 2021.
(Continued)

*Primary Examiner* — Harry S Hong

(57) ABSTRACT

A method for personalizing a delivery of services to a first customer including: providing a customer profile; updating the customer profile via performing a first process to collect interaction data, the first process including the steps of: monitoring activity on the communication device and, therefrom, detecting the first interaction with the first contact center; identifying data relating to the first interaction for collecting as the interaction data; and updating the customer profile to include the interaction data identified from the first interaction; generating an interaction predictor, the interaction predictor comprising knowledge about the first customer derived, at least in part, from the data stored within the customer profile, the knowledge comprising a behavioral factor attributable to the first customer given a first type of interaction; and augmenting the customer profile by storing therein the interaction predictor.

24 Claims, 14 Drawing Sheets

(56) References Cited

U.S. PATENT DOCUMENTS

| | | |
|---|---|---|
| 2015/0347951 A1 | 12/2015 | Tamblyn et al. |
| 2017/0111509 A1 | 4/2017 | McGann et al. |
| 2017/0316438 A1 | 11/2017 | Konig et al. |
| 2018/0218407 A1* | 8/2018 | He .................... G06Q 30/0201 |
| 2019/0037007 A1 | 1/2019 | Gauthier et al. |
| 2019/0037077 A1 | 1/2019 | Konig et al. |

OTHER PUBLICATIONS

PCT Search Report and Written Opinion of co-pending PCT application No. PCT/US2020/067316 dated Mar. 25, 2021.
PCT Search Report and Written Opinion of co-pending PCT application No. PCT/US2020/067320 dated Apr. 7, 2021.

* cited by examiner ns of the present invention may be enabled or practiced;
SYSTEMS AND METHODS RELATING TO CUSTOMER EXPERIENCE AUTOMATION

BACKGROUND

The present invention generally relates to telecommunications systems in the field of customer relations management including customer assistance via internet-based service options. More particularly, but not by way of limitation, the present invention pertains to systems and methods for automating the customer experience, including aspects of customer service offered through an application executed on a mobile computing device.

BRIEF DESCRIPTION OF THE INVENTION

The present invention may include a computer-implemented method for personalizing a delivery of services to a first customer, the first customer having a communication device through which the first customer conducts interactions with contact centers. The method may include the following steps: providing a customer profile that stores data related to the first customer; updating the customer profile via performing a first process to collect interaction data related to the interactions between the first customer and the contact centers, the first process being performed repetitively so to update the customer profile after each successive one of the interactions, wherein, described in relation to an exemplary first one of the interactions (hereinafter "first interaction") between the first customer and a first one of the contact centers (hereinafter "first contact center"), the first process includes the steps of: monitoring activity on the communication device and, therefrom, detecting the first interaction with the first contact center; identifying data relating to the first interaction for collecting as the interaction data; and updating the customer profile to include the interaction data identified from the first interaction; generating an interaction predictor, the interaction predictor comprising knowledge about the first customer derived, at least in part, from the data stored within the customer profile, the knowledge comprising a behavioral factor attributable to the first customer given a first type of interaction (hereinafter "first interaction type"); and augmenting the customer profile by storing therein the interaction predictor, the storage of the interaction predictor linking the behavioral factor to the first interaction type to facilitate real time retrieval when detecting an incoming interaction of the first interaction type.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Figure 1:
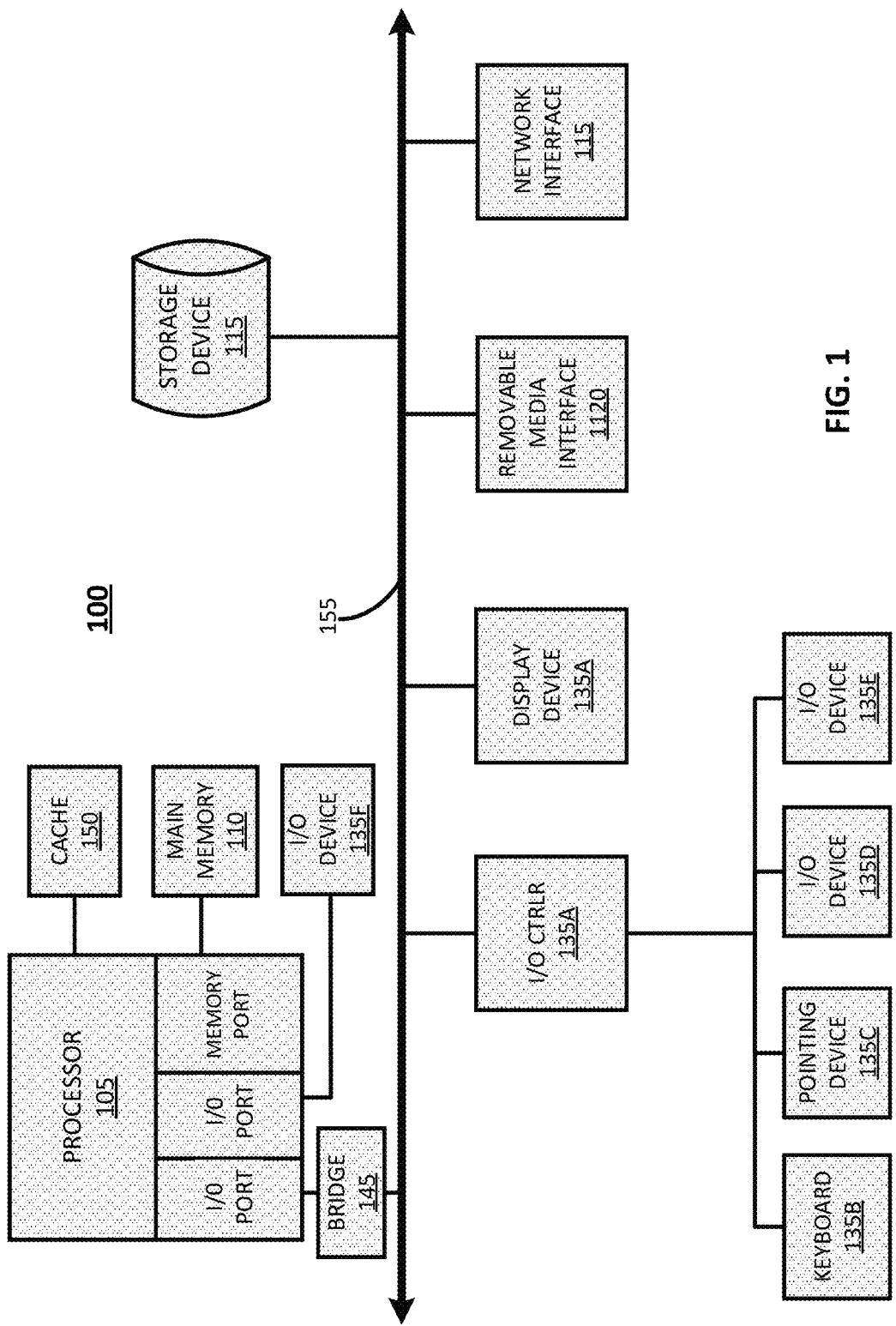
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily all referring to the same embodiment or example. Further, particular features, structures or characteristics may be combined in any suitable combinations and/or sub-combinations in one or more embodiments or examples.

Embodiments of the present invention may be implemented as an apparatus, method, or computer program product. Accordingly, example embodiments may take the form of an entirely hardware embodiment, an entirely software embodiment (including firmware, resident software, micro-code, etc.), or an embodiment combining software and hardware aspects that may all generally be referred to herein as a "module" or "system." Further, example embodiments may take the form of a computer program product embodied in any tangible medium of expression having computer-usable program code embodied in the medium. In addition, it will be appreciated that the figures provided herewith are for explanation purposes to persons ordinarily skilled in the art and that the drawings are not necessarily drawn to scale.

It will be further appreciated that the flowchart and block diagrams provided in the figures illustrate architecture, functionality, and operation of possible implementations of systems, methods, and computer program products according to example embodiments of the present invention. In this regard, each block in the flowchart or block diagrams may represent a module, segment, or portion of code, which comprises one or more executable instructions for implementing the specified logical functions. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Exemplary Computing Device

Turning now to FIG. 1, a schematic block diagram of an exemplary computing device 100 is shown in accordance with embodiments of the present invention and/or with which exemplary embodiments of the present invention may be enabled or practiced. It should be appreciated that FIG. 1 is provided as a non-limiting example.

The computing device 100, as used herein, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers) may be implemented via one or more of the computing devices 100. For example, the various servers may be a process or thread running on one or more processors of one or more computing devices 100 executing computer program instructions and interacting with other system components for performing the various functionalities described herein. A server also may be a software module, for example, a software module of the contact center system 200 depicted in FIG. 2 may include one or more servers. Further, unless otherwise specifically limited, the functionality described in relation to a plurality of computing devices may be integrated into a single computing device 100, or the functionality described in relation to a single computing device may be distributed across several computing devices 100. In relation to computing systems described herein, such as the contact center system 200 of FIG. 2, the various servers and computer systems thereof may be located on one or more local computing devices 100 (i.e., on-site at the same physical location as the agents of the contact center) or may be located on one or more remote computing devices 100 (i.e., off-site or in the cloud in a geographically different location, for example, in a remote data center connected to the contact center via a network). In exemplary embodiments, functionality provided by servers located on computing devices off-site may be accessed and provided over a virtual private network (VPN) as if such servers were on-site, or the functionality may be provided using a software as a service (SaaS) to provide functionality over the Internet using various protocols, such as by exchanging data using encoded in extensible markup language (XML) or JSON.

Though other configurations are also possible, in the illustrated example, the computing device 100 include a central processing unit (CPU) or processor 105 and a main memory 110. The computing device 100 also includes a storage device 115, a removable media interface 120, a network interface 115, one or more input/output (I/O) devices 135, which as depicted includes an I/O controller 130, a display device 135A, a keyboard 135B, and a pointing device 135C (e.g., a mouse). The storage device 115 may provide storage for an operating system and software run on the computing device. The computing device 100 further includes additional optional elements, such as a memory port 140, a bridge 145, one or more additional input/output devices 135D, 135E, 135F, and a cache memory 150 in communication with the processor 105.

The processor 105 of the computing device 100 may be any logic circuitry that responds to and processes instructions fetched from the main memory 110. It may be implemented, for example, in an integrated circuit, in the form of a microprocessor, microcontroller, or graphics processing unit, or in a field-programmable gate array (FPGA) or application-specific integrated circuit (ASIC). The main memory 110 may be one or more memory chips capable of storing data and allowing any storage location to be directly accessed by the central processing unit 105. Though other configurations are possible, as shown in the illustrated example, the central processing unit 105 may communicate directly with the main memory 110 via a memory port 140 and indirectly with the storage device 115 via a system bus 155.

In exemplary embodiments, the processor 105 may include a plurality of processors and may provide functionality for simultaneous execution of instructions or for simultaneous execution of one instruction on more than one piece of data. The computing device 100 may include a parallel processor with one or more cores. The computing device 100 may include a shared memory parallel device, with multiple processors and/or multiple processor cores, accessing all available memory as a single global address space. In another embodiment, the computing device 100 may be a distributed memory parallel device with multiple processors each accessing local memory only. The computing device 100 may have both some memory which is shared and some which may only be accessed by particular processors. The processor 105 may include a multicore microprocessor, which combines two or more independent processors into a single package, e.g., into a single integrated circuit (IC). In exemplary embodiments, the processor 105 may provide single instruction multiple data (SIMD) functionality. In another embodiment, several processors in the processor 105 may provide functionality for execution of multiple instructions simultaneously on multiple pieces of data (MIMD).

As depicted in FIG. 1, the processor 105 may communicate directly with the cache memory 150 via a secondary bus or backside bus. In other embodiments, the processor 105 communicates with the cache memory 150 using the system bus 155. The cache memory 150 typically has a faster response time than main memory 110. As illustrated, the processor 105 may communicate with various I/O devices 135 via the local system bus 155, though direct communication though backside buses are also possible. Various buses may be used as the local system bus 155 in accordance with conventional technology. For embodiments in which an I/O device is a display device 135A, the processor 105 may communicate with the display device 135A through an advanced graphics port (AGP).

A wide variety of I/O devices 135 may be present in the computing device 100. Input devices may include one or more keyboards 135, mice, trackpads, trackballs, microphones, and drawing tablets, to name a few non-limiting examples. Output devices may include video display devices, speakers and printers. An I/O controller 130 may be used to control the I/O devices, such as, for example, as a keyboard 135B and a pointing device 135C (e.g., a mouse or optical pen).

The computing device 100 may support one or more removable media interfaces 120, such as a floppy disk drive, a CD-ROM drive, a DVD-ROM drive, tape drives of various formats, a USB port, or any other device suitable for reading data from read-only media, or for reading data from, or writing data to, read-write media. The removable media interface 120, for example, may be used for installing software and programs. The computing device 100 may further include a storage device 115, such as one or more hard disk drives or hard disk drive arrays, for storing an operating system and other related software. Optionally, a removable media interface 120 may also be used as the storage device.

The computing device 100 may include or be connected to multiple display devices 135A. As such, any of the I/O devices 135 and/or the I/O controller 130 may include any type and/or form of suitable hardware, software, or combination of hardware and software to support, enable or provide for the connection to, and use of, the multiple display devices 135A by the computing device 100. For example, the computing device 100 may include any type and/or form of video adapter, video card, driver, and/or library to interface, communicate, connect or otherwise use the multiple display devices 135A. In exemplary embodiments, a video adapter may include multiple connectors to interface to multiple display devices 135A. In another embodiment, the computing device 100 may include multiple video adapters, with each video adapter connected to one or more of the display devices 135A. In other embodiments, one or more of the display devices 135A may be provided by one or more other computing devices, connected, for example, to the computing device 100 via a network. These embodiments may include any type of software designed and constructed to use the display device of another computing device as a second display device 135A for the computing device 100. One of ordinary skill in the art will recognize and appreciate the various ways and embodiments that a computing device 100 may be configured to have multiple display devices 135A.

The computing device 100 may operate under the control of an operating system, which controls scheduling of tasks and access to system resources. The computing device 100 may run any operating system, embedded operating system, real-time operating system, open source operation system, proprietary operating system, mobile device operating system, or any other operating system capable of running on a computing device and performing the operations described herein. The computing device 100 may be any workstation, desktop computer, laptop or notebook computer, server machine, handled computer, mobile telephone, smart phone, portable telecommunication device, media playing device, gaming system, mobile computing device, or any other type and/or form of computing, telecommunications or media device that is capable of communication and that has sufficient processor power and memory capacity to perform the operations described herein. In exemplary embodiments, the computing device 100 may have different processors, operating systems, and input devices consistent with the device. In certain embodiments, the computing device 100 is a mobile device. In exemplary embodiments, the computing device 100 may include a combination of devices, such as a mobile phone combined with a digital audio player or portable media player.

The computing device 100 may be one of a plurality of machines connected by a network, or it may include a plurality of machines so connected. A network environment may include one or more local machine(s), client(s), client node(s), client machine(s), client computer(s), client device (s), endpoint(s), or endpoint node(s) in communication with one or more remote machines (which may also be generally referred to as server machines or remote machines) via one or more networks. In exemplary embodiments, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 100 communicates with other computing devices 100 via any type and/or form of gateway or tunneling protocol such as secure socket layer (SSL) or transport layer security (TLS). The network interface may include a built-in network adapter, such as a network interface card, suitable for interfacing the computing device to any type of network capable of communication and performing the operations described herein. As discussed more below, aspects of the computing device 100 may include components, serves, or other modules that are a cloud-based or implemented within a cloud computing environment In exemplary embodiments, a network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. In exemplary embodiments, a "hypervisor" type of virtualizing is used where multiple virtual machines run on the same host physical machine, each acting as if it has its own dedicated box. The virtual machines may also run on different host physical machines. Other types of virtualization are also contemplated, such as, for example, the network (e.g., via software defined networking (SDN)). Functions, such as functions of a session border controller, may also be virtualized, such as, for example, via network functions virtualization (NFV).

Contact Centers

Figure 2:
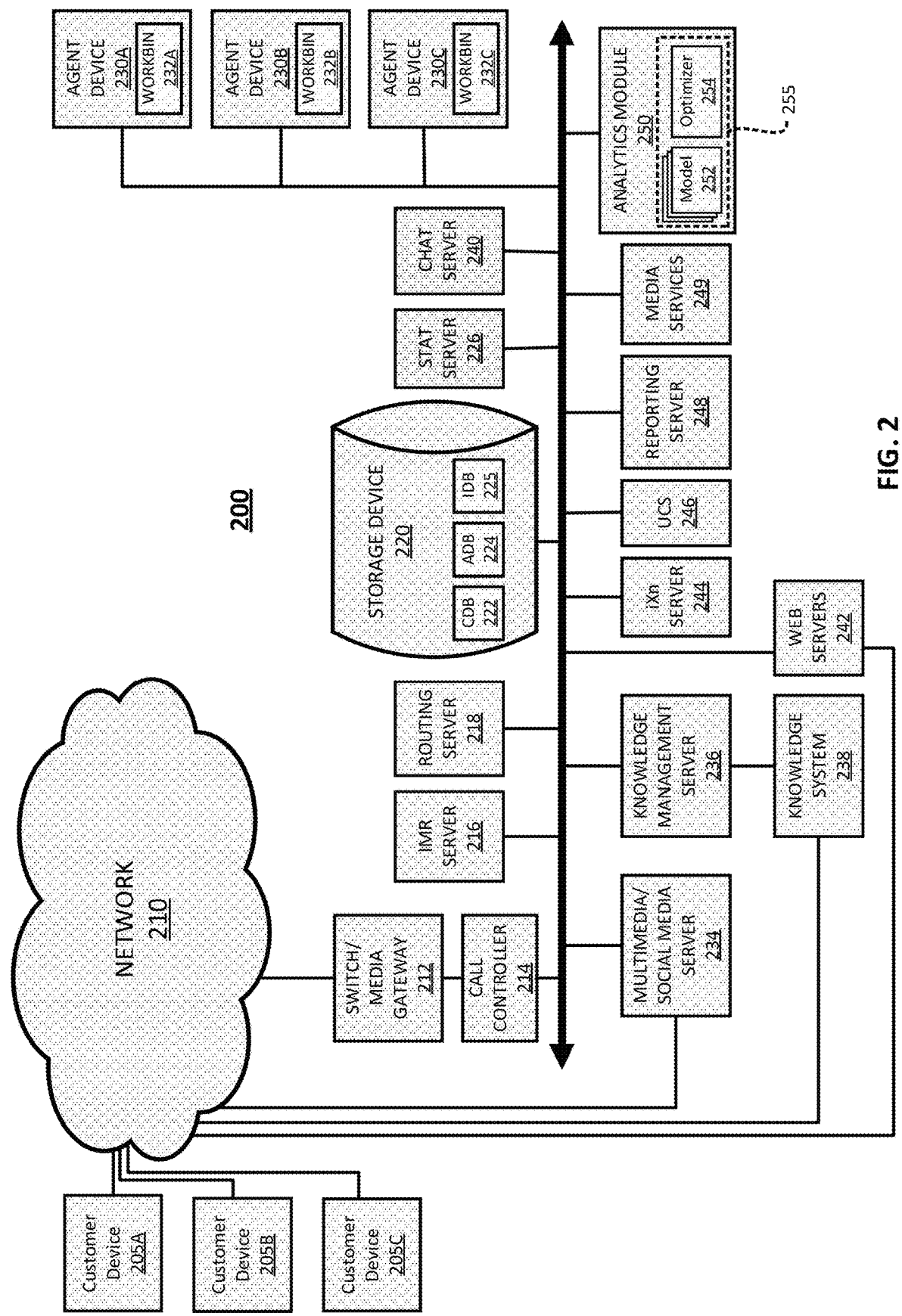
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or, as used herein, contact center system 200 is shown in accordance with exemplary embodiments of the present invention and/or with which exemplary embodiments of the present invention may be enabled or practiced. As used therein, the term "contact center system" is used to refer to the system depicted in FIG. 2 and/or the components thereof, while the term "contact center" is used more generally to refer to contact center systems, customer service providers, and/or the organizations or enterprises associated therewith. Thus, unless otherwise limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers generally offer many types of services through contact centers. Such contact centers may be staffed with employees and/or customer service agents (or simply "agents"), with the agents serving as an interface between an organization, such as a company, enterprise, or government agency, and persons, such as users or customers (hereinafter generally referred to as "customers"). For example, the agents at a contact center may assist customers in making purchasing decisions and receive purchase orders. Similarly, agents may assist or support customers in solving problems with products or services already provided by the organization. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), or through other media.

Operationally, contact centers generally strive to provide quality services to customers, while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and the like. In many cases this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. As a result, customer service providers are increasingly relying on automated processes to interact with customers.

However, while such automation technology is now commonly used by contact centers to increase efficiency, it remains far less developed for use by customers. Thus, while IVR systems, IMR systems, and/or bots are used to automate portions of the interaction on the contact center side of the interaction, the actions on the customer-side are still left for the customer to perform manually. As will be seen, embodiments of the present invention relate to systems and methods for automating aspects of the customer-side of the interactions between customers and customer service providers or contact centers. Accordingly, present embodiments may provide ways to automate actions that customers are required to perform when contacting and interacting with customer service providers or contact centers. For example, embodiments of the present invention include methods and systems for identifying outstanding matters or pending actions for a customer that need additional attention stemming from a previous interaction between the customer and a contact center. Once identified, other embodiments may include methods and systems for automating follow-up actions on behalf of the customer for resolving such pending actions.

Referring specifically to FIG. 2, a block diagram is presented that illustrates an embodiment of a communications infrastructure or contact center system 200 in accordance with the present invention and/or an environment within which embodiments of the present invention may be enabled or practiced. The contact center system 200 may be used by a customer service provider to provide various types of services to customers. For example, the contact center system 200 may be used to engage and manage chat conversations in which automated chat robots or bots and/or human agents communicate with customers. As will be appreciated, the contact center system 200 may be used as an in-house facility to a business or enterprise for serving the enterprise in performing the functions of sales and service relative to the products and services available through the enterprise. In another aspect, the contact center system 200 may be operated by a third-party service provider. According to another embodiment, the contact center system 200 may operate as a hybrid system in which some components are hosted at the contact center premise while other components are hosted remotely (e.g., in a cloud-based or cloud computing environment). The contact center system 200 may be deployed on equipment dedicated to the enterprise or third-party service provider, and/or deployed in a remote computing environment such as, for example, a private or public cloud environment with infrastructure for supporting multiple contact centers for multiple enterprises. As discussed more below, the contact center system 200 may include software applications or programs, which may be executed on premises or remotely or some combination thereof. It should further be appreciated that the various components of the contact center system 200 may also be distributed across various geographic locations and computing environments and not necessarily contained in a single location, computing environment, or even computing device.

Further, it should be generally noted that, unless otherwise specifically limited, any of the computing elements of present invention may be implemented in cloud-based or cloud computing environments. As used herein, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Also often referred to as a "serverless architecture", a cloud computing (or simply "cloud") execution model generally includes a service provider dynamically managing an allocation and provisioning of remote servers for achieving a desired functionality. It will be appreciated that such "serverless" platforms still require servers.

In accordance with the exemplary embodiment of FIG. 2, the components or modules of the contact center system 200 may include: a plurality of customer devices 205A, 205B, 205C; a communications network 210 (also referred to simply as network 210); a switch/media gateway 212; a call controller 214; an interactive media response (IMR) server 216; a routing server 218; a storage device 220; a statistics or stat server 226; a plurality of agent devices 230A, 230B, 230C that include workbins 232A, 232B, 232C, respectively; a multimedia/social media server 234; a knowledge management server 234 coupled to a knowledge system 238; a chat server 240, web servers 242; an interaction (iXn) server 244; a universal contact server (UCS) 246; a reporting server 248; media services 249; and an analytics module 250. As will be seen, the contact center system 200 manages resources (e.g., personnel, computers, telecommunication equipment, etc.) to enable delivery of services via telephone, email, chat, or other communication mechanisms. Such services may vary depending on the type of contact center and range from customer service to help desk, emergency response, telemarketing, order taking, etc.

For example, in accordance with an embodiment, customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—it should be understood that any number may be present. Each of the customer devices 205 may be a communication device conventional in the art, such as a telephone, wireless phone, smart phone, personal computer, electronic tablet, or laptop, to name some non-limiting examples. In general, the customer devices 205 are used by customers to initiate, manage, and respond to telephone calls, emails, chats, text messages, web-browsing sessions, and other multi-media transactions in accordance with any of the functionality described herein. For example, a customer may use a customer device 205 to contact the contact center system 200 by way of a chat channel with the text being transmitted to a chatbot or human agent. A response from the chatbot or human agent may be generated and delivered to the customer device 205 as text.

Inbound and outbound communications from and to the customer devices 205 may traverse the network 210, with the nature of network depending on the type of customer device being used and form of communication. As an example, the network 210 may include a communication network of telephone, cellular, and/or data services and may also comprise a private or public switched telephone network (PSTN), local area network (LAN), private wide area network (WAN), and/or public WAN such as the Internet. The network 210 may also include a wireless carrier network including a code division multiple access (CDMA) network, global system for mobile communications (GSM) network, or any wireless network/technology conventional in the art, including but not limited to 3G, 4G, LTE, etc.

Embodiments of the contact center system 200 may include a switch/media gateway 212 coupled to the network 210 for receiving and transmitting telephone calls between the customers and the contact center system 200. The switch/media gateway 212 may include a telephone switch or communication switch configured to function as a central switch for agent level routing within the center. The switch may be a hardware switching system or a soft switch implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephone or communication device. In this example, the switch/media gateway establishes a voice path/connection between the calling customer and the agent telephone device, by establishing, for example, a connection between the customer's telephone device and the agent telephone device.

In exemplary embodiments, the switch is coupled to a call controller 214 which, for example, serves as an adapter or interface between the switch and the remainder of the routing, monitoring, and other communication-handling components of the contact center. The call controller 214 may be configured to process PSTN calls, VoIP calls, etc. For example, the call controller 214 may include computer-telephone integration (CTI) software for interfacing with the switch/media gateway and contact center equipment. In exemplary embodiments, the call controller 214 may include a session initiation protocol (SIP) server for processing SIP calls. The call controller 214 may also extract data about the customer interaction, such as the caller's telephone number (e.g., the automatic number identification (ANI) number), the customer's internet protocol (IP) address, or email address, and communicate with other components of the contact center system 200 in processing the interaction.

Embodiments of the contact center system 200 may include an interactive media response (IMR) server 216. The IMR server 216 may also be referred to as a self-help system, a virtual assistant, etc. The IMR server 216 may be similar to an interactive voice response (IVR) server, except that the IMR server 216 is not restricted to voice and additionally may cover a variety of media channels. In an example illustrating voice, the IMR server 216 may be configured with an IMR script for querying customers on their needs. For example, a contact center for a bank may tell customers via the IMR script to 'press 1' if they wish to retrieve their account balance. Through continued interaction with the IMR server 216, customers may be able to complete service without needing to speak with an agent. The IMR server 216 may also ask an open-ended question such as, "How can I help you?" and the customer may speak or otherwise enter a reason for contacting the contact center. The customer's response may be used by a routing server 218 to route the call or communication to an appropriate contact center system 200 resource.

For example, if the communication is to be routed to an agent, the call controller 214 may interact with the routing server (also referred to as an orchestration server) 218 to find an appropriate agent for processing the interaction with the particular customer. The selection of an appropriate agent for routing an inbound customer interaction may be based, for example, on a routing strategy employed by the routing server 218, and further based on stored information about the customer and agents (which, as described more below, may be maintained in customer and agent databases on the storage device 220) and other routing parameters provided, for example, by the statistics server 226, which aggregates data relating to the performance of the contact center system 200. The routing server 218, for example, may query such data via an ANI. Thus, in general, the routing server 218 may query data relevant to an incoming interaction for facilitating the routing of that interaction to the most appropriate contact center.

Regarding data storage, the contact center system 200 may include one or more mass storage devices—represented generally by the storage device 220—that stores one or more databases of data deemed relevant to the functioning of the contact center system 200. For example, the storage device 220 may store customer data that is maintained in a customer database (also CDB) 222. Customer data maintained by the contact center system 200 may include customer profiles, contact information, service level agreement (SLA), and interaction history (e.g., details of each previous interaction with a customer, including nature of previous customer contacts, reason for the interaction, disposition data, wait time, handle time, and actions taken by the contact center to resolve customer issues). As another example, the storage device 220 may store agent data in an agent database (also ADB) 223. Agent data maintained by the contact center system 200 may include agent availability, profiles, schedules, skills, etc. As another example, the storage device 220 may store interaction data in an interaction database (also IDB) 224. Interaction data may include data relating to numerous past interactions between customers and contact centers. More generally, it should be understood that, unless otherwise specified, the storage device 220 is configured to include databases and/or store data related to any of the types of information described herein, with those databases and/or data being accessible to the other modules or servers of the contact center system 200 in ways that facilitate the functionality described herein. For example, the servers or modules of the contact center system 200 may query the databases for retrieving particular data stored therewithin as well as transfer data to the databases for storage thereon. The storage device 220, for example, may take the form of a hard disk, disk array, or any other storage medium as is conventional in the art. The storage device 220 may be included as part of the contact center system 200 or operated remotely by a third party. The databases, for example, may be Cassandra or any NoSQL database. The databases may also be a SQL database and be managed by any database management system, such as, for example, Oracle, IBM DB2, Microsoft SQL server, Microsoft Access, PostgreSQL, etc., to name a few non-limiting examples.

In exemplary embodiments, the agent devices 230 are configured to interact with the various components and modules of the contact center system 200 in ways that facilitate the functionality described herein. For example, the agent devices 230 may include a telephone adapted for regular telephone calls, VoIP calls, etc. The agent device 230 may further include a computer for communicating with one or more servers of the contact center system 200 and performing data processing associated with contact center operations, as well as for interfacing with customers via voice and other multimedia communication mechanisms pursuant to described functionality. While FIG. 2 shows three such agent devices—i.e., agent devices 230A, 230B and 230C—it should be understood that any number may be present.

Once it is determined that an inbound communication should be handled by a human agent, functionality within the routing server 218 may select an agent from those available for routing the communication thereto. As already discussed, this selection may be based on which agent is best suited for handling the inbound communication. Once the appropriate agent is selected, the contact center system 200 forms a connection between the customer device 205 and the agent device 230 that corresponds to the selected agent. As part of this connection, information about the customer and/or the customer's history may be provided to the selected agent via his/her agent device 230. This information generally includes data that may aid the selected agent to better service the customer.

According to an embodiment, the contact center system 200 may include a multimedia/social media server 234 for engaging in media interactions other than voice interactions with the customer devices 205 and/or web servers 242. The media interactions may be related, for example, to email, vmail (voice mail through email), chat, video, text-messaging, web, social media, co-browsing, etc. The multi-media/social media server 234 may take the form of any IP router conventional in the art with specialized hardware and software for receiving, processing, and forwarding multi-media events.

Embodiments of the contact center system 200 may include a knowledge management server 234 for facilitating interactions between customers operating the customer devices 205 and a knowledge system 238. The knowledge system 238 may be included as part of the contact center system 200 or operated remotely by a third party. In general, the knowledge system 238 may be a computer system capable of receiving questions or queries and providing answers in response. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson®, though other types of systems also may be used. Additional details of the knowledge management server and knowledge system are provided in U.S. application Ser. No. 14/449,018, filed on Jul. 31, 2014, entitled "System and Method for Controlled Knowledge System Management," the content of which is incorporated herein by reference.

According to an embodiment, the contact center system 200 may include a chat server 240 for conducting and managing electronic chat communications with customers operating customer devices 205. As will be seen, chat communications may be conducted by the chat server 240 in such a way that a customer communicates with both automated systems, which may also be referred to as chatbots, as well as human agents, which may also be referred to simply as agents. According to an embodiment, the chat server 240 may be configured to implement and maintain chat conversations, generate chat transcripts, and determine whether a chat communication is completed (e.g., based on timeout or by a customer closing a chat window). In exemplary embodiments, the chat server 240 may also operate as a chat orchestration server, dispatching actual chat conversations among the chatbots or available human agents. The processing logic of the chat server 240 may be rules driven, and leverage, for example, intelligent workload distribution protocols and various business rules for routing communications. The chat server 240 further may implement, manage and facilitate user interfaces (also UIs) associated with the chat feature, including those UIs generated at either the customer device 205 or the agent device 230. Further, the chat server 240 may orchestrate and implement chats conducted by both human agents and automated chatbots. According to an embodiment, the chat server 240 is configured to transfer chats within a single chat session with a particular customer between automated and human sources such that, for example, a chat session transfers from a chatbot to a human agent or from a human agent to a chatbot.

The chat server 240 may also be coupled to the knowledge management server 234 and the knowledge systems 238 for receiving suggestions and answers to queries posed by customers during an automated chat, providing links to knowledge articles, or the like. Additionally, the chat server 240 may be configured to facilitate (e.g., supervise and coordinate) self-learning by certain of the chatbots. For example, prior to characteristics of individual chatbots being modified, the chat server 240 may determine whether the feedback from customer that precipitated the modification is suspicious or malicious (e.g., by searching for or identifying key words or phrases, and/or flagging potential issues for review by an agent). Although the chat server 240 is depicted in the embodiment of FIG. 2 as being a separate server component, a person of skill in the art should recognize that functionalities of the chat server 240 may be incorporated into other servers, such as, for example, the multimedia/social media server 234 or the IMR server 216.

According to an embodiment, the web servers 242 may include social interaction site hosts for a variety of known social interaction sites to which a customer may subscribe, such as Facebook, Twitter, Instagram, etc., to name a few non-limiting examples. In exemplary embodiments, although web servers 242 are depicted as part of the contact center system 200, the web servers 242 may also be provided by third parties and/or maintained outside of the contact center premise. The web servers 242 may also provide web pages for the enterprise that is being supported by the contact center system 200. Customers may browse the web pages and get information about the enterprise's products and services.

The web pages may also provide a mechanism for contacting the contact center via, for example, web chat, voice call, email, web real-time communication (WebRTC), etc. For example, widgets may be deployed on the websites hosted on the web servers 242. As used herein, a widget refers to a user interface component that performs some particular function. In some implementations, a widget may include a graphical user interface control that can be overlaid on a web page displayed on the Internet. The widget may show information, such as in a window or text box, and/or include buttons or other controls that allow the customer to access certain functionalities such as sharing or opening a file. In some implementations, a widget is a common looking user interface component having a portable portion of code that can be installed and executed within a separate web-based page without compilation. Some components can include corresponding and/or additional user interfaces and can access a variety of resources such as local resources (e.g., a calendar, contact information, etc. on the customer device) and/or remote network resources (e.g., instant messaging, electronic mail, social networking updates, etc.).

In addition, embodiments of the contact center system 200 may be configured to manage deferrable interactions or activities (also referenced simply as deferrable activities) and the routing thereof to human agents for completion. As should be understood, deferrable activities include back-office work that can be performed off-line, examples of which include responding to emails, letters, attending training, and other activities that do not entail real-time communication with a customer. To do this, the interaction (iXn) server 244 is configured to interact with the routing server 218 for selecting an appropriate agent to handle each of the deferable activities. Once assigned to a particular agent, the deferable activity is pushed to that agent, for example, appearing on the agent device 230 of the selected agent. As an example, the deferable activity appear in a workbin 232 as a task for the selected agent to complete. The functionality of the workbin 232 may be implemented via any conventional data structure, such as, for example, a linked list, array, etc. Each of the agent devices 230 may include a workbin 232, thus, workbins 232A, 232B, and 232C may be maintained in the agent devices 230A, 230B, and 230C, respectively. As an example, a workbin 232 may be maintained in the buffer memory of the corresponding agent device 230.

According to an embodiment, the contact center system 200 may include a universal contact server (UCS) 246, which is configured to retrieve information stored in the customer database 222 and direct information for storage therein. For example, the UCS 246 may be utilized as part of the chat feature to facilitate maintaining a history on how well chats for a particular customer were handled, which then may be used as a reference for future chat communications. The UCS 246 also may be configured to facilitate maintaining a history of customers' preferences regarding media channels, such as instances in which chat communications are acceptable and instances in which customers prefer alternate media channels. Additionally, the UCS 246 may be configured to record an interaction history for each customer, capturing and storing data regarding comments from agents, customer communication history, and the like. Each of these data types may be stored on the customer database 222 or on other modules as described functionality requires.

Example embodiments of the contact center system 200 may further include a reporting server 248 configured to generate reports from data aggregated by the statistics server 226. Such reports may include near real-time reports or historical reports concerning the state of resources, such as, for example, average wait time, abandonment rate, agent occupancy, etc. The reports may be generated automatically or in response to specific requests from a requestor (e.g., agent, administrator, contact center application, etc.).

According to an embodiment, the media services 249 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

According to an embodiment, the analytics module 250 may provide systems and methods for performing analytics on interaction data from a plurality of different data sources such as different applications associated with a contact center or an organization. Aspects of embodiments of the present invention are also directed to generating, updating, training, and modifying predictors or models 252 based on collected interaction data. The models 252 may include behavior models of customers or agents. The behavior models may be used to predict behaviors of, for example, customers or agents, in a variety of situations, thereby allowing embodiments of the present invention to tailor interactions based on the predictions or to allocate resources in preparation for predicted characteristics of future interactions, and thereby improving overall performance, including improving the customer experience. It will be appreciated that, while the analytics module 250 is depicted as being part of a contact center, such behavior models may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which may store data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). As discussed more below, the analytic module 250 may be further configured to retrieve data stored within the storage device 220 for use in developing and training algorithms and models 252, for example, by applying machine learning techniques.

One or more of the models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are not available or easily derived, it is generally preferred to build an empirical model based upon collected and stored data. To properly capture the relationship between the manipulated/disturbance variables and the controlled variables of complex systems, the models 252 preferably are nonlinear. This is because nonlinear models can represent curved rather than straight-line relationships between manipulated/disturbance variables and controlled variables, which are common to complex systems such as those discussed herein. Given the foregoing requirements, a neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. As stated, the models 252 preferably are a non-linear model. Accordingly, the optimizer 254 may be a nonlinear programming optimizer. However, it is contemplated that the present invention may be implemented by using, individually or in combination, a variety of different types of optimization approaches. These optimization approaches include, but not limited to, linear programming, quadratic programming, mixed integer non-linear programming, stochastic programming, global non-linear programming, genetic algorithms, and particle/swarm techniques.

According to exemplary embodiments, the models 252 and the optimizer 254 may together be used as an optimization system 255. For example, the analytics module 250 may utilize the optimization system 255 as part of an optimization process by which so aspect of contact center performance and operational is enhanced or optimized, for example, aspects related to the customer experience, the agent experience, routing, function of automated processes, etc.

The various components, modules, and/or servers of FIG. 2 (as well as the other figures included herein) may each include one or more processors executing computer program instructions and interacting with other system components for performing the various functionalities described herein. The computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As noted above, the contact center system 200 may operate as a hybrid system in which some or all components are hosted remotely, such as in a cloud-based or cloud computing environment.

Chat Systems

Figure 3:
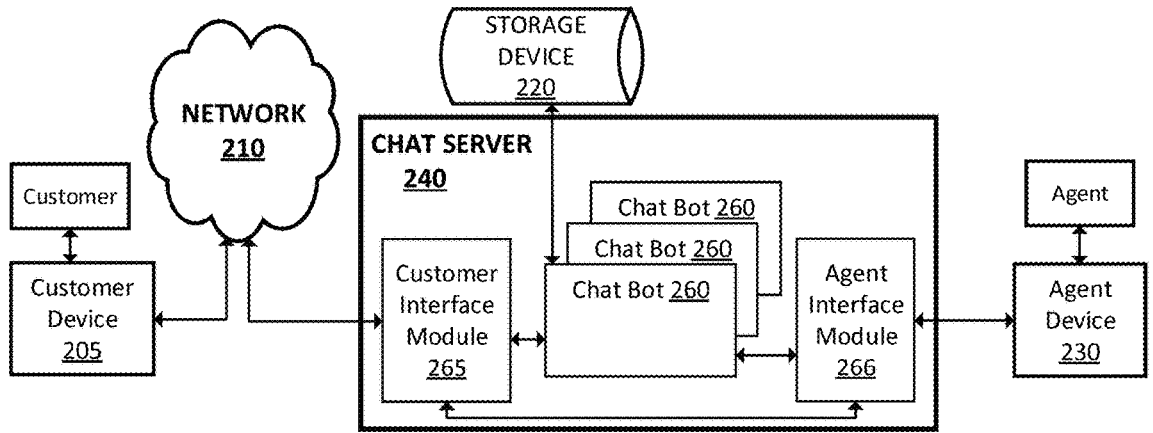
FIG. 3 is schematic block diagram showing further details of a chat server operating as part of the chat system according to embodiments of the present invention.
Figure 4:
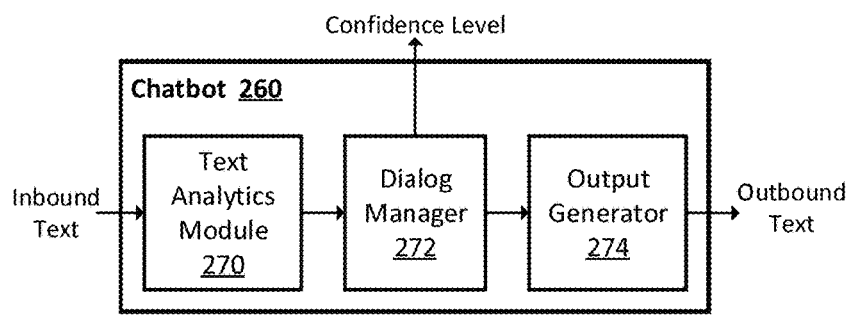
FIG. 4 is a schematic block diagram of a chat module according to embodiments of the present invention.
Figure 5:
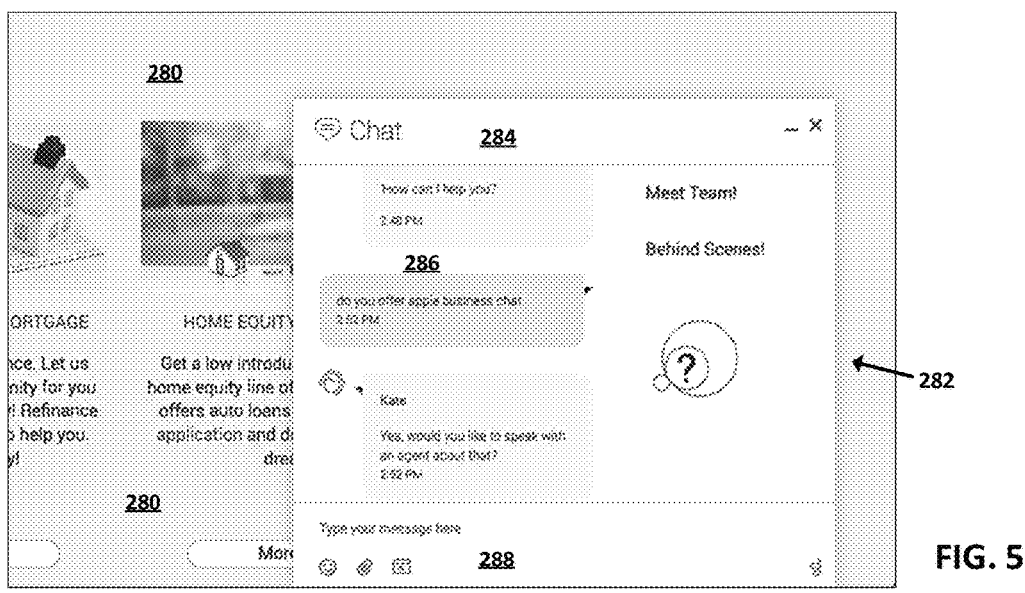
FIG. 5 is an exemplary customer chat interface according to embodiments of the present invention.

Turning to FIGS. 3, 4 and 5, various aspects of chat features and systems are discussed, as may be utilized in exemplary embodiments of the present invention. As will be seen, the present invention may include or be enabled by a chat feature by which textual messages are exchanged between different parties, where those parties may include live persons, such as customers and agents, as well as automated processes, such as bots or chatbots. In general, a bot (also known as an Internet bot, is a software application that runs automated tasks or scripts over the Internet. Typically, bots perform tasks that are both simple and structurally repetitive, at a much higher rate than would be possible for a human alone. A chatbot is a particular type of bot and, as used herein, is defined as a piece of software that conducts a conversation via auditory or textual methods. As will be appreciated, chatbots are often designed to convincingly simulate how a human would behave as a conversational partner. Chatbots are typically used in dialog systems for various practical purposes including customer service or information acquisition. Some chatbots use sophisticated natural language processing systems, but many simpler ones scan for keywords within the input, then pull a reply with the most matching keywords, or the most similar wording pattern, from a database. Chatbots can be classified into usage categories such as conversational commerce (e-commerce via chat), analytics, communication, customer support, social, travel, etc.

The chat features and systems are presented generally with reference to exemplary embodiments of a chat server, chatbot, and chat interface illustrated, respectively, in FIGS. 3, 4, and 5. While these examples are provided with respect to a chatbot implemented on the contact center side, it should be understood that such a chatbot may be modified toward implementation on the customer-side. Accordingly, as discussed more below, it should be appreciated that the exemplary chat systems of FIGS. 3, 4, and 5 may be modified by one skilled in the art for analogous use on the customer-side of interactions with contact centers. It will be appreciated that, as provided herein, chatbots may be utilized by voice communications via converting text-to-speech and/or speech-to-text.

Referring specifically now to FIG. 3, a more detailed schematic block diagram is provided of the chat server 240 introduced in relation to FIG. 2. As stated above, FIG. 3 is provided for background purposes and as an exemplary module for implementing a chat feature. The chat server 240 may be coupled to (e.g., in electronic communication with) a customer device 205 operated by the customer over a data communications network 210. The chat server 240 may be operated by a business or enterprise as part of a contact center system 200 (e.g., FIG. 2) for implementing and orchestrating aspects of chat conversations with the customers of the business, including both automated chats and chats with human agents. In regard to automated chats, the chat server 240 may host one or more chat automation modules or chatbots 260A-260C (collectively referenced as 260), which are configured with computer program instructions for engaging in automated chat conversations. Thus, generally, the chat server 240 implements chat functionality, including the exchange of text-based or chat communications between a customer device 205 and an agent device 230 as well as between a customer device 205 and a chatbot 260. As will be discussed more below, the chat server 240 may include a customer interface module 265 and an agent interface module 266 for generating particular UIs at the customer device 205 and the agent device 230, respectively, that are included within the chat functionality.

The chatbots 260 may operate, for example, as an executable program that can be launched according to demand for the particular chatbot. According to an embodiment, the chat server 240 may operate as an execution engine or environment for the chatbots 260, analogous to loading VoiceXML files to a media server for interactive voice response (IVR) functionality. Loading and unloading may be controlled by the chat server 240, analogous to how a VoiceXML script may be controlled in the context of an interactive voice response. The chat server 240 may provide a means for capturing and collecting customer data in a unified way, similar to customer data capturing in the context of IVR. Such data can be stored, shared, and utilized in a subsequent conversation, whether with the same chatbot, a different chatbot, an agent chat, or even a different media type. According to an embodiment, the chat server 240 is configured to orchestrate the sharing of data among the various chatbots 260 as interactions are transferred or transitioned over from one chatbot to another or from one chatbot to a human agent. According to an embodiment, the data captured during interaction with a particular chatbot may be transferred along with a request to invoke a second chatbot or human agent.

In exemplary embodiments, the number of chatbots 260 may vary according to the design and function of the chat server 240 and is not limited to the number illustrated in FIG. 3. For example, different chatbots may be created to have different profiles. The profile of a particular chatbot may be used to select a chatbot with expertise for helping a customer on a particular subject control, for example, how the chatbot communicates with a particular customer. Engaging chatbots with profiles that are catered to specific types of customers may allow more effective communication with such customers. For example, one chatbot may be designed or specialized to engage in a first topic of communication (e.g., opening a new account with the business), while another chatbot may be designed or specialized to engage in a second topic of communication (e.g., technical support for a product or service provided by the business), that is different from the first topic of communication. In another example, the chatbots may be configured to utilize different dialects or slang or may have different personality traits or characteristics. For example, the vocabulary of the different chatbots may be tailored to use the slang or diction of young people, elder people, people in a certain region of the country, and/or people having a certain language or ethnic background. The chat server 240 may also host a default chatbot that may be invoked at a beginning of a chat conversation if there is insufficient information about the customer to invoke a more specialized chatbot. For example, if a customer intent is unknown when the conversation initially ensues, the default chatbot may be invoked to ask questions about the customer intent. According to an embodiment, a chatbot may be customer selectable, for example, based on accent, appearance, age group, language, etc., by way of a user interface. Additionally, a chatbot may be assigned to a customer based on demographic information of the customer. According to an embodiment, a chatbot profile may be selected based on information learned from publicly available information (e.g., social media information) about a customer.

According to an embodiment, a profile of a chatbot 260 may be stored in a profile database hosted in the storage device 220. The chatbot's profile data may include, without limitation, the chatbot's personality, gender, demographics, areas of expertise, and the like. According to an embodiment, for a given subject, including receptionist and concierge services, and specialists on particular products or services (e.g., travel booking, opening accounts, etc.), there may be several different chatbots 260, each with their own personality or profile.

Each of the different chatbots 260 may be configured, in conjunction with the chat server 240, to learn and evolve their behavior and responses according to input by the customers. For example, in response to customers reacting negatively to certain words, phrases, or responses, the chatbots 260 may learn to use different words, phrases, or responses. Such learning may be supervised in order to prevent undesired evolution of the personalities or profiles of the chatbots 260. For example, changes to the personalities or profiles of the chatbots 260 may be first approved or validated by human supervisors, certain keywords or phrases may be identified or flagged, and customer feedback may be analyzed. According to an embodiment, different chatbots 260 may be configured to learn from each other, in addition to learning based on customer feedback or agent feedback. For example, different chatbots 260 may be configured to communicate and exchange data with each other. In exemplary embodiments, the different chatbots 260 may operate as a neural network for deep learning and self-learning capabilities, by exchanging data with one another.

As mentioned, the chat server 240 may include a customer interface module 265 and an agent interface module 266. The customer interface module 265 may be configured to generating user interfaces (UIs) for display on the customer device 205 that facilitate chat communication between the customer and the chatbots 260 and the customer and human agents. The chat server 240 may include an agent interface module 266 for generating particular UIs on the agent device 230 that facilitate chat communication between an agent operating an agent device 230 and a customer operating a customer device 205. The agent interface module 266 may also generate UIs on the agent device 230 that allow an agent to monitor aspects of an ongoing chat between a chatbot 260 and a customer. The customer interface module 265 and the agent interface module 266, thus, may operate to facilitate the exchange of chat communications between the customer device 205 and one of the chatbots 260 and/or one of the agent devices 230. For example, the customer interface module 265 may transmit signals to the customer device 205 during a chat session that are configured to generated particular UIs on the customer device 205. As will be seen, those UIs generated on the customer device 205 may include the text messages sent from chatbots 260 or human agents as well as other non-text graphics that are intended to accompany the text messages, such as, emoticons or animations, for display therewith. Likewise, the agent interface module 266 may transmit signals to the agent device 230 during a chat session that are configured to generated particular UIs on the agent device 230. As will be seen, those UIs generated on the agent device 230 may include the text messages sent from customer device 205. The UIs generated on the agent device 230 also may include an interface that facilitates the selection of non-text graphics by the agent that are to accompany an outgoing text message to the customer.

According to an embodiment, the chat server 240 may be implemented in a layered architecture, with a media layer, a media control layer, and the chatbots executed by way of the IMR server 216 (similar to executing a VoiceXML on an IVR media server).

As depicted in FIG. 2, the chat server 240 may further be configured to interact with the knowledge management server 234 to query the server for knowledge information. The query, for example, may be based on a question received from the customer during a chat. Responses received from the knowledge management server 234 may then be provided to the customer as part of a chat response.

According to an embodiment, the chat server 240 may run on the same computer as the other servers of the contact center system 200 depicted in FIG. 2. The chat server 240 may also run on a separate computer equipped with a processor, which executes program instructions and interacts with other system components to perform various methods and operations according to embodiments of the present invention. The chat server 240 may also run on the cloud or serverless architecture. The chat server 240 may include a memory, which operates as an addressable memory unit for storing software instructions to be executed by the processor. The memory may be implemented using any suitable memory device, such as a random access memory (RAM), and may additionally operate as a computer readable storage medium having non-transitory computer readable instructions stored therein that, when executed by the processor, cause the processor to control and manage an automated chat communication between the chat server 240, the customer device 205, and/or the agent device 230.

Referring specifically now to FIG. 4, a more detailed block diagram is provided of an exemplary chat automation module or chatbot 260. As stated, FIG. 4 is provided for background purposes and as an exemplary implementation of a chatbot. As would be understood by one of ordinary skill in the art, aspects of chatbot 260 may be used or modified for use with embodiments of the present invention. In the illustrated embodiment, the chatbot 260 includes a text analytics module 270, a dialog manager 272, and an output generator 274. The text analytics module is configured to analyze and understand natural language. In this regard, the text analytics module may be configured with a lexicon of the language, a syntactic/semantic parser, and grammar rules for breaking a phrase provided by the customer device 205, into an internal syntactic and semantic representation. According to an embodiment, the configuration of the text analytics module depends on the particular profile associated with the chatbot. For example, certain slang words may be included in the lexicon for one chatbot but excluded from another chatbot.

In operation, the dialog manager 272 receives the syntactic and semantic representation from the text analytics module 270 and manages the general flow of the conversation based on a set of decision rules. In this regard, the dialog manager 272 maintains history and state of the conversation, and generates an outbound communication based on the history and state. The communication may follow the script of a particular conversation path selected by the dialog manager 272. As described in further detail below, the conversation path may be selected based on an understanding of a particular purpose or topic of the conversation. The script for the conversation path may be generated using any of various languages and frameworks conventional in the art, such as, for example, artificial intelligence markup language (AIML), SCXML, or the like.

During the chat conversation, the dialog manager 272 selects a response deemed to be appropriate at the particular point of the conversation flow/script, and outputs the response to the output generator 274. According to an embodiment, the dialog manager 272 may also be configured to compute a confidence level for the selected response and provide the confidence level to the agent device 230. According to an embodiment, every segment, step, or input in a chat communication may have a corresponding list of possible responses. Responses may be categorized based on topics (determined using a suitable text analytics and topic detection scheme) and suggested next actions are assigned. Actions may include, for example, responses with answers, additional questions, assignment for a human agent to assist (e.g., by disambiguating input from the customer), and the like. The confidence level may be utilized to assist the system with deciding whether the detection, analysis, and response to the customer input is appropriate or sufficient, or whether a human agent should be involved. For example, a threshold confidence level may be assigned to invoke human agent intervention, based on one or more business rules. According to an embodiment, confidence level may be determined based on customer feedback. For example, in response to detecting a negative reaction from a customer to an action or response taken by the chatbot, the confidence level may be reduced. Conversely, in response to detecting a positive reaction from a customer, the confidence level may be increased.

According to an embodiment, the response selected by the dialog manager 272 may include information provided by the knowledge management server 234. The information may be, for example, a link to a knowledge article that the chatbot may want to recommend to the customer in response to a question posed by the customer.

In exemplary embodiments, the output generator 274 takes the semantic representation of the response provided by the dialog manager 272, maps the response to a chatbot profile or personality (e.g., by adjusting the language of the response according to the dialect, vocabulary, or personality of the chatbot), and outputs an outbound text to be displayed at the customer device 205. The output text may be intentionally presented such that the customer interacting with a chatbot is unaware that it is interacting with an automated process as opposed to a human agent. As will be seen, in accordance with other embodiments, the output text may be linked with visual representations, such as emoticons or animations, integrated into the customer's user interface.

Brief reference will now be made to FIG. 5, in which a webpage 280 having an exemplary implementation of a chat feature 282 is presented. The webpage 280, for example, may be associated with a business or enterprise website and intended to initiate interaction between prospective or current customers visiting the webpage and a contact center associated with the enterprise. As will be appreciated, the chat feature 282 may be generated on any type of customer device 205, including personal computing devices such as laptops, tablet devices, or smart phones, to name a few non-limiting examples. Further, the chat feature 282 may be generated as a window within a webpage or implemented as a full-screen interface. As in the example shown, the chat feature 282 may be contained within a defined portion of the webpage 280 and, for example, may be implemented as a widget via the systems and components described above and/or any other conventional means. As will be appreciated, the chat feature 282 may include an exemplary way for customers to enter text messages for delivery to a contact center associated with a particular organization or enterprise.

As an example, the webpage 280 may be accessed by a customer via a customer device, which provides a communication channel for interacting or chatting with bots or live agents. In exemplary embodiments, as shown, the chat feature 282 includes an interface generated on a screen of the customer device, such as customer device 205. This user interface of the chat feature 282 may be referred to herein as a customer chat interface 284. The customer chat interface 284, for example, may be generated by a customer interface module of a chat server, as already described. The customer interface module may send signals to the customer device that are configured to generate a desired customer chat interface 284 in accordance with the content of a chat message issued by a chat source, which as depicted is a chatbot named "Kate". The customer chat interface 284 may be contained within a designated area or window, with that window covering a designated portion of the webpage 280. The customer chat interface 284 also may be a text display area 286, which is the area dedicated to the display of received and sent text messages. and a text input area 288, which facilitates the customer's input of text messages. Though this may be achieved in other ways, the chat interface of FIG. 5 illustrates one manner by which text messages may be entered by customers for communicating with an agent or chatbot of a contact center.

Before proceeding further with the description of the present invention, an explanatory note will be provided in regard to referencing system components—e.g., modules, servers, and other components—that have already been introduced in the previous figures. Whether or not a subsequent reference includes the corresponding numerical identifiers of FIGS. 1-5, it should be understood that the reference incorporates the previously discussed examples and, unless otherwise specifically limited, may be implemented in accordance with those examples and/or using other conventional technology capable of fulfilling the desired functionality, as would be understood by one of ordinary skill in the art. Thus, for example, subsequent mention of a "contact center" should be understood as referring to the exemplary "contact center system 200" of FIG. 2 and/or other conventional technology for implementing a contact center. As additional examples, a subsequent mention below to a "customer device", "agent device", "chat server", "computing device", "chatbot", or "customer interface module" should be understood as referring to the exemplary "customer device 205", "agent device 230", "chat server 240", "computing device 200", "chatbot 260", or "customer interface module 265", respectively, of FIGS. 1-5, as well as conventional technology for fulfilling the same functionality.

Personalized Customer Automation Systems

Turning now to FIGS. 6 through 14, embodiments of the present invention include systems and methods for automating and augmenting customer actions during various stages of interaction with a customer service provider or contact center, with those various interaction stages being classified as pre-contact, during-contact, and post-contact stages (or pre-interaction, during-interaction, and post-interaction stages). Additionally, embodiments of the present invention include systems and methods related to personalized customer profiles and automated routing.

Figure 6:
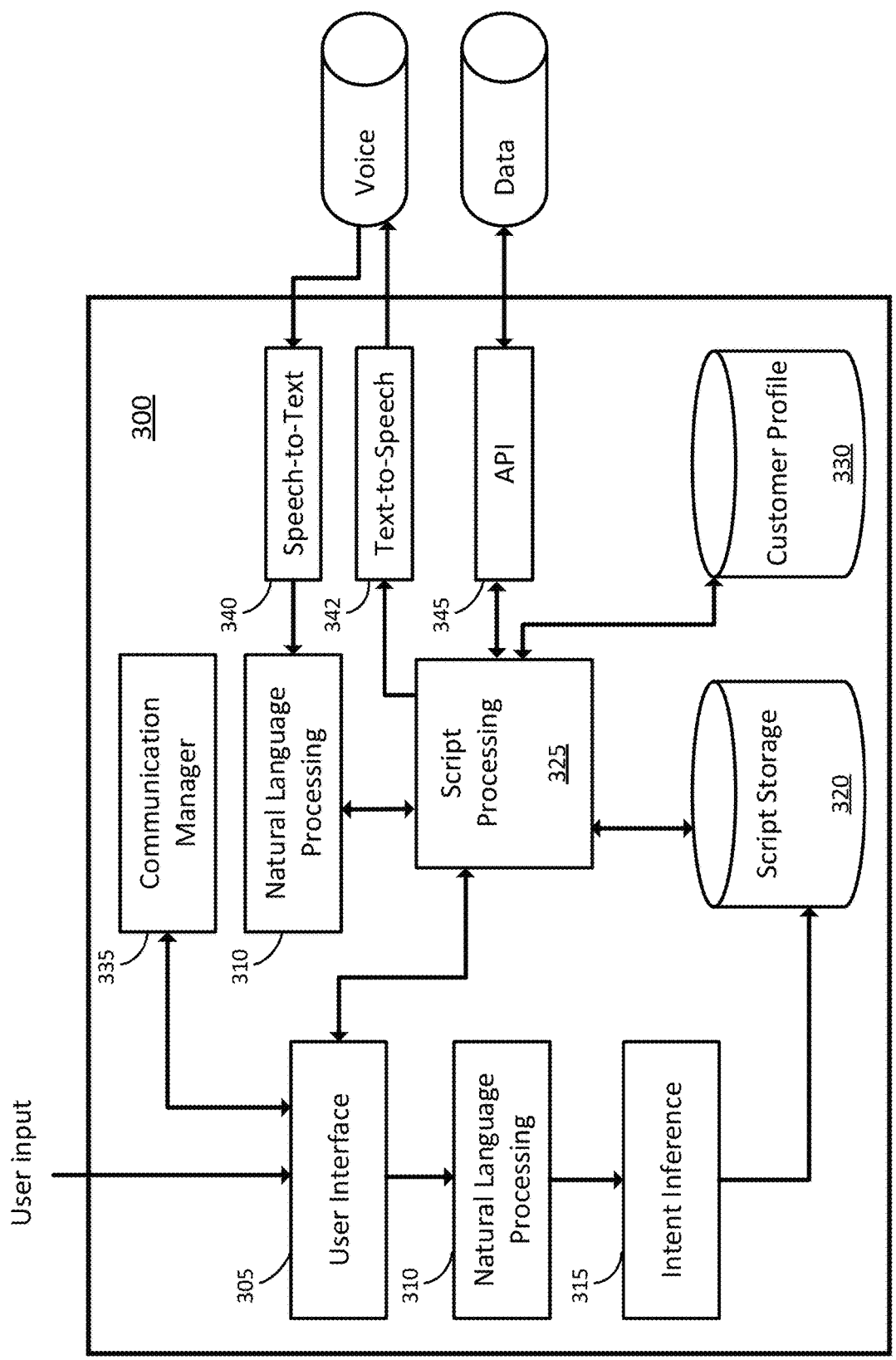
FIG. 6 is a block diagram of a customer automation system according to embodiments of the present invention.

With specifically reference now to FIG. 6, an exemplary customer automation system 300 is shown which may be used in methods and systems of the present invention. To better explain how the customer automation system 300 functions, reference will also be made to FIG. 7, which shows a flowchart 350 of an exemplary method for automating customer actions when interacting with contact centers. Additional information related to customer automation and related systems and methods are provided in U.S. application Ser. No. 16/151,362, filed on Oct. 4, 2018, entitled "System and Method for Customer Experience Automation", the content of which is incorporated herein by reference. As will be seen, the customer automation system 300 may be used as part of an automated personal assistant (or "personal bot") 405, which is introduced in the discussion related to FIG. 8.

The customer automation system 300 of FIG. 6 represents a system that may be generally used for customer-side automations, which, as used herein, refers to the automation of actions on behalf of a customer in interactions with customer service providers or contact centers [.] Such interactions may also be referred to as "customer-contact center interactions" or simply "customer interactions". Further, in discussing such customer-contact center interactions, it should be appreciated that reference to a "contact center" or "customer service provider" is intended to generally refer to any customer service department or other service provider associated with an organization or enterprise (such as, for example, a business, governmental agency, non-profit, school, etc.) with which a user or customer has business, transactions, affairs or other interests.

In exemplary embodiments, the customer automation system 300 may be implemented as a software program or application running on a mobile device or other computing device, cloud computing devices (e.g., computer servers connected to the customer device 205 over a network), or combinations thereof (e.g., some modules of the system are implemented in the local application while other modules are implemented in the cloud. For the sake of convenience, embodiments of the present invention may be primarily described in the context of implementation via an application running on the customer device 205. However, it should be understood that present embodiments are not limited thereto.

The customer automation system 300 may include several components or modules. For example, as shown, the customer automation system 300 may include a user interface 305, a natural language processing (NLP) module 310, an intent inference module 315, a script storage module 320, a script processing module 325, a customer profile database or module (or simply "customer profile") 330, a communication manager module 335, a text-to-speech module 340, a speech-to-text module 342, and an application programming interface (API) 345, each of which will be described with more particularity with reference also to flowchart 350 of FIG. 7. It will be appreciated that some of the components of and functionalities associated with the customer automations system 300 may overlap with the chatbot systems described above in relation to FIGS. 3, 4, and 5. In cases where the customer automation system 300 and such chatbot systems are employed together as part of a customer-side implementation—such as in the example of the personal bot 405 of FIG. 8—it is anticipated that such overlap may include the sharing of resources between the two systems.

Figure 7:
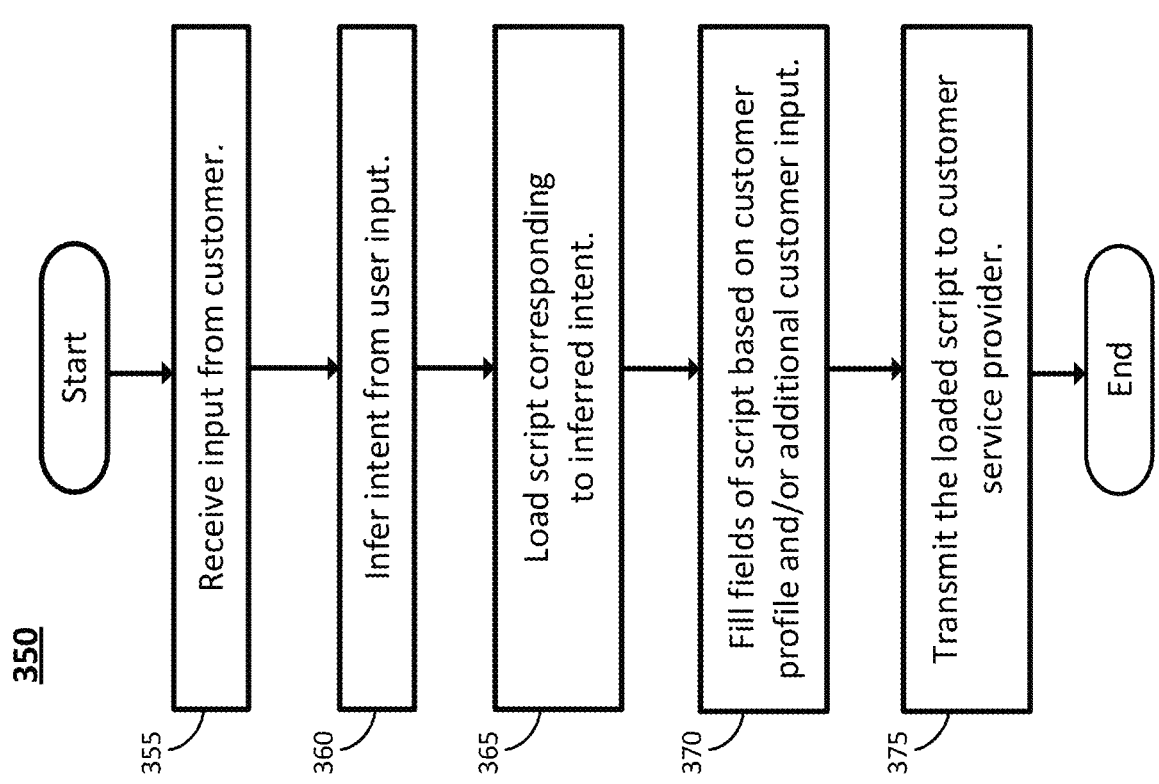
FIG. 7 is a flowchart of a method for automating an interaction on behalf of a customer according to embodiments of the present invention.

In an example of operation, with specific reference now to the flowchart 350 of FIG. 7, the customer automation system 300 receives input at an initial step or operation 355. Such input may come from several sources. For example, a primary source of input may be the customer, where such input is received via the user interface 305 on the customer device (e.g., customer device 205). The input also may include data received from other parties, particularly parties interacting with the customer through the customer device. For example, information or communications sent to the customer from the contact center may provide aspects of the input. In either case, the input may be provided in the form of free speech or text (e.g., unstructured, natural language input). Input also may include other forms of data received or stored on the customer device.

Continuing with the flow diagram 350, at an operation 360, the customer automation system 300 parses the natural language of the input using the NLP module 310 and, therefrom, infers a customer intent using the intent inference module 315. That is, the customer's intent is determined given the input. For example, where the customer input is provided as speech, the speech may be transcribed into text by a speech-to-text system (such as a large vocabulary continuous speech recognition or LVCSR system) as part of the parsing by the NLP module 310. The transcription may be performed locally on the customer device 205 or the speech may be transmitted over a network for conversion to text by a cloud-based server. In certain embodiments, for example, the intent inference module 315 may automatically infer the customer's intent from the text of the customer input using artificial intelligence or machine learning techniques. These artificial intelligence techniques may include, for example, identifying one or more keywords from the customer input and searching a database of potential intents corresponding to the given keywords. The database of potential intents and the keywords corresponding to the intents may be automatically mined from a collection of historical interaction recordings. In cases where the customer automation system 300 fails to understand or completely understand the intent from the customer's input, a selection of several intents may be provided to the customer in the user interface 305. The customer may then clarify his/her intent by selecting one of the alternatives or may request that other alternatives be provided.

After the customer's intent is determined, the flowchart 350 proceeds to an operation 365 where the customer automation system 300 loads a script associated with the given intent. Such scripts, for example, may be stored and retrieved from the script storage module 320. As will be appreciated, the script may include a set of commands or operations, pre-written speech or text, and/or fields of parameters or data (also "data fields"), which represent data that is expected to be required in automating an action for the customer. For example, the script may include commands, text, and data fields that will be required to complete an interaction with a contact center in order to resolve the issue specified by the customer's intent. Scripts may be specific to a particular contact center (or a particular organization) and, in exemplary embodiments, may be further tailored to resolving a particular issue. Scripts may be organized in a number of ways. In exemplary embodiments, the scripts are organized in a hierarchical fashion, such as where all scripts pertaining to a particular organization are derived from a common "parent" script that defines common features. An example of common features might be common templates for authentication steps (e.g., account numbers and verification codes), where "child" scripts include templates for the different types of issues to be resolved (e.g., double billing, requests for reductions in price, service pausing, service plan modification, service cancellation, and the like). In exemplary embodiments, rather than a hierarchical relationship, the scripts are assembled from common tasks, such as combining "authentication" templates for authenticating with various service providers and "issue" templates for resolving common issues that may be associated with multiple providers.

The scripts may be produced via mining data, actions, and dialogue from previous customer interactions. Specifically, the sequences of statements made during a request for resolution of a particular issue may be automatically mined from a collection of historical interactions between customers and customer service providers. Systems and methods may be employed for automatically mining effective sequences of statements and comments, as described from the contact center agent side, are described in U.S. patent application Ser. No. 14/153,049 "Computing Suggested Actions in Caller Agent Phone Calls By Using Real-Time Speech Analytics and Real-Time Desktop Analytics," filed in the United States Patent and Trademark Office on Jan. 12, 2014, the entire disclosure of which is incorporated by reference herein.

With the script retrieved, the flowchart 350 proceeds to an operation 370 where the customer automation system 300 processes or "loads" the script. This action may be performed by the script processing module 325, which performs it by filling in the data fields of the script with appropriate data pertaining to the customer. More specifically, the script processing module 325 may extract customer data that is relevant to the anticipated interaction, with that relevance being predetermined by the script selected as corresponding to the customer's intent. According to preferred embodiments, the data for some or most of the data fields within the script may be automatically loaded with data retrieved from customer data stored within the customer profile 330. As will be appreciated, the customer profile 330 may store particular data related to the customer, for example, the customer's name, birth date, address, account numbers, authentication information, and other types of information relevant to customer service interactions. The data selected for storage within the customer profile 330 may be based on data the customer has used in previous interactions and/or include data values obtained directly by the customer. In case of any ambiguity regarding the data fields or missing information within a script, the script processing module 325 may include functionality that prompts and allows the customer to manually input the needed information.

Referring again to the flowchart 350, at an operation 375, the loaded script may be transmitted to the customer service provider or contact center. As discussed more below, the loaded script may include commands and customer data necessary to automate at least a part of an interaction with the contact center on the customer's behalf. In exemplary embodiments, the API 345 is used so to interact with the contact center directly. Contact center may define a protocol for making commonplace requests to their systems, which is provided for in the API 345. Such APIs may be implemented over a variety of standard protocols such as Simple Object Access Protocol (SOAP) using Extensible Markup Language (XML), a Representational State Transfer (REST) API with messages formatted using XML or JavaScript Object Notation (JSON), and the like. Accordingly, the customer automation system 300 may automatically generate a formatted message in accordance with a defined protocol for communication with a contact center, where the message contains the information specified by the script in appropriate portions of the formatted message.

Personal Bot

Figure 8:
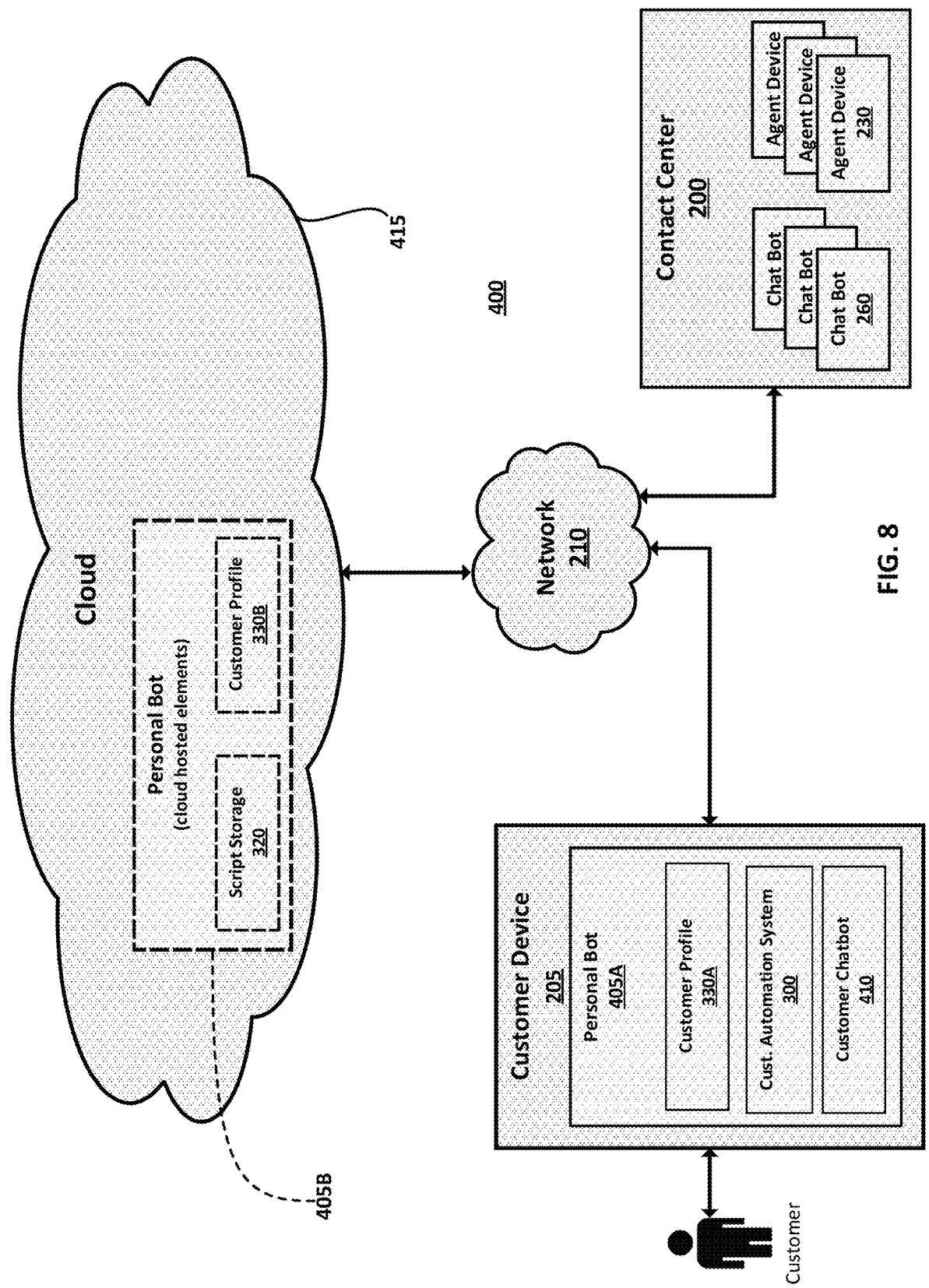
FIG. 8 is a block diagram of an automated personal bot for a customer according to embodiments of the present invention.

With reference now to FIG. 8, an exemplary system 400 is shown that includes an automated personal assistant or, as referred to herein, personal bot 405. As will be seen, the personal bot 405 is configured to automate aspects of interactions with a customer service provider on behalf of a customer. As stated above, present invention relates to systems and methods for automating aspects of the customer-side of the interactions between customers and customer service providers or contact centers. Accordingly, the personal bot 405 may provide ways to automate actions that customers are required to perform when contacting, interacting, or following up with contact centers.

The personal bot 405, as used herein, may generally reference any customer-side implementation of any of the automated processes or automation functionality described herein. Thus, it should be understood that, unless otherwise specifically limited, the personal bot 405 may generally employ any of the technologies discussed herein—including those related to the chatbots 260 and the customer automation system 300—to enable or enhance automation services available to customers. For example, as indicated in FIG. 8, the personal bot 405 may include the functionality of the above-described customer automation system 300. Additionally, the personal bot 405 may include a customer-side implementation of a chatbot (for example, the chatbot 260 of FIGS. 4 and 5), which will be referred herein as a customer chatbot 410. As will be seen, the customer chatbot 410 may be configured to interact privately with the customer in order to obtain feedback and direction from the customer pertaining to actions related to ongoing, future, or past interactions with contact centers. Further, the customer chatbot 410 may be configured to interact with live agents or chatbots associated with a contact center on behalf of the customer.

As shown in FIG. 8, in regard to system architecture, the personal bot 405 may be implemented as a software program or application running on a mobile device or personal computing device (shown as a customer device 205) of the customer. For example, the personal bot 405A may include locally stored modules, including the customer automation system 300, the customer chatbot 410, and elements of the customer profile 330A. The personal bot 405 also may include remote or cloud computing components (e.g., one or more computer servers or modules connected to the customer device 205 over a network 210), which may be hosted in a cloud computing environment or cloud 415 (see cloud hosted elements of the personal bot 405B). For example, as shown in the illustrated example, the script storage module 320 and elements of the customer profile 330B may be stored in databases in the cloud 415. It should be understood, however, that present embodiments are not limited to this arrangement and, for example, may include other components being implemented in the cloud 415.

Accordingly, as will be seen, embodiments of the present invention include systems and methods for automatically initiating and conducting an interaction with a contact center to resolve an issue on behalf of a customer. Toward this objective, the personal bot 405 may be configured to automate particular aspects of interactions with a contact center on behalf of the customer. Several examples of these types of embodiments will now be discussed in which resources described herein—including the customer automation system 300 and customer chatbot 410—are used to provide the necessary automation. In presenting these embodiments, reference is again made to previously incorporated U.S. application Ser. No. 16/151,362, entitled "System and Method for Customer Experience Automation", which includes further background and other supporting materials.

Pre-Interaction Automation

Embodiments of the present invention include the personal bot 405 and related resources automating one or more actions or processes by which the customer initiates a communication with a contact center for interacting therewith. As will be seen, this type of automation is primarily aimed at those actions normally occurring within the pre-contact or pre-interaction stage of customer interactions.

For example, in accordance with an exemplary embodiment, when a customer chooses to contact a contact center, the customer automation system 300 may automate the process of connecting the customer with the contact center. For example, present embodiments may automatically navigate an IVR system of a contact center on behalf of the customer using a loaded script. Further, the customer automation system 300 may automatically navigate an IVR menu system for a customer, including, for example, authenticating the customer by providing authentication information (e.g., entering a customer number through dual-tone multi-frequency or DTMF or "touch tone" signaling or through text to speech synthesis) and selecting menu options (e.g., using DTMF signaling or through text to speech synthesis) to reach the proper department associated with the inferred intent from the customer's input. More specifically, the customer profile 330 may include authentication information that would typically be requested of customers accessing customer support systems such as usernames, account identifying information, personal identification information (e.g., a social security number), and/or answers to security questions. As additional examples, the customer automation system 300 may have access to text messages and/or email messages sent to the customer's account on the customer device 205 in order to access one-time passwords sent to the customer, and/or may have access to a one-time password (OTP) generator stored locally on the customer device 205. Accordingly, embodiments of the present invention may be capable of automatically authenticating the customer with the contact center prior to an interaction.

In addition, the customer automation system 300 may facilitate a customer contacting a contact center via multiple channels for communication, such as, call (e.g., voice and/or video), chat, or e-mail. In exemplary embodiments, the communication channels may include calling, chatting, and leaving a message. Estimated wait times for interactions with a live agent (e.g., call or chat) may also be shown to the customer. For example, if the customer chooses to call and speak with a live agent, the customer may be offered several options. These options might include to wait (e.g., "dial now and wait"), select a callback (e.g., "dial now and skip waiting"), or schedule a call for a given time (e.g., "schedule a callback"). In exemplary embodiments, if the customer selects to schedule a call for a given time by opting for "schedule a callback," for example, the customer automation system 300 may access the customer's calendar (stored/accessible on the same customer device 205) and offer suggestions for free times in the customer's calendar. The customer automation system 300 may determine that the customer is free at particular times over the next two days. These times may be automatically presented to the customer for selection thereby. The customer may also choose to schedule the call at another time and input this into the user interface 305. Certain embodiments of the present invention may enable callback scheduling even when contact centers do not directly support such a feature. For example, assuming that the customer has scheduled a callback for 10:00 am, the system may automatically determine the approximate wait time during the time periods leading up to 10:00 am. This might be based on historical data captured from other customers contacting this particular organization or it may be based on wait time data published by the contact center. Thus, in accordance with exemplary embodiments, the customer automation system 300 automatically connects to the contact center at a time prior to the scheduled call back time, based on the expected wait time, and supplies the set of information provided to the customer automation system 300 in accordance with the script in order to be placed on hold by the contact center. For example, the customer automation system 300 may automatically determine that the expected wait time at 09:15 is 45 minutes, and therefore initiates communication with the contact center at 09:15 in order have an agent available to speak to the customer at around 10:00. When the customer automation system 300 is connected to a live contact center agent (e.g., by detecting a ringing on the contact center end of the communication channel or by detecting a voice saying "hello"), an automatic notification may be sent to the customer (e.g., by ringing at the customer device 205) and then the customer may be connected to the live agent.

In accordance with other embodiments, the customer automation system 300 may automate a process for preparing an agent before a call from a customer. For example, the customer automation system 300 may send a request that the agent study certain materials provided by the customer before the live call happens.

During-Interaction Automation

Embodiments of the present invention further include the personal bot 405 and related resources automating the actual interaction (or aspects thereof) between the customer and a contact center. As will be seen, this type of automation is primarily aimed at those actions normally occurring within the during-contact or during-interaction stage of customer interactions.

For example, the customer automation system 300 may interact with entities within a contact center on behalf of the customer. Without limitation, such entities may include automated processes, such as chatbots, and live agents. Once connected to the contact center, the customer automation system 300 may retrieve a script from the script storage module 320 that includes an interaction script (e.g., a dialogue tree). The interaction script may generally consist of a template of statements for the customer automation system 300 to make to an entity within the contact center, for example, a live agent. In exemplary embodiments, the customer chatbot 410 may interact with the live agent on the customer's behalf in accordance with the interaction script. As already described, the interaction script (or simply "script") may consist of a template having defined dialogue (i.e., predetermined text or statements) and data fields. As previously described, to "load" the script, information or data pertinent to the customer is determined and loaded into the appropriate data fields. Such pertinent data may be retrieved from the customer profile 330 and/or derived from input provided by the customer through the customer interface 305. According to certain embodiments, the customer chatbot 410 also may be used to interact with the customer to prompt such input so that all of the necessary data fields within the script are filled. In other embodiments, the script processing module 325 may prompt the customer to supply any missing information (e.g., information that is not available from the customer profile 330) to fill in blanks in the template through the user interface 305 prior to initiating a communication with the contact center. In certain embodiments, the script processing module 325 may also request that the customer confirm the accuracy of all of the information that the customer automation system 300 will provide to the contact center.

Once the loaded script is complete, for example, the interaction with the live agent may begin with an initial statement explaining the reason for the call (e.g., "I am calling on behalf of your customer, Mr. Thomas Anderson, regarding what appears to be double billing."), descriptions of particular details related to the issue (e.g., "In the previous three months, his bill was approximately fifty dollars. However, his most recent bill was for one hundred dollars."), and the like. While such statements may be provided in text to the contact center, it may also be provided in voice, for example, when interacting with a live agent. In regard to how such an embodiment may function, a speech synthesizer or text-to-speech module 340 may be used to generate speech to be transmitted to the contact center agent over a voice communication channel. Further, speech received from the agent of the contact center may be converted to text by a speech-to-text converter 342, and the resulting text then may be processed by the customer automation system 300 or customer chatbot 410 so that an appropriate response in the dialogue tree may be found. If the agent's response cannot be processed by the dialogue tree, the customer automation system 300 may ask the agent to rephrase the response or may connect the customer to the agent in order to complete the transaction.

While the customer automation system 300 is conducting the interaction with the live agent in accordance with the interaction script, the agent may indicate his or her readiness or desire to speak to the customer. For the agent, readiness might occur after reviewing all of the media documents provided to the agent by the customer automation system 300 and/or after reviewing the customer's records. In exemplary embodiments, the script processing module 325 may detect a phrase spoken by the agent to trigger the connection of the customer to the agent via the communication channel (e.g., by ringing the customer device 205 of the customer). Such triggering phrases may be converted to text by the speech-to-text converter 342 and the natural language processing module 310 then may determine the meaning of the converted text (e.g., identifying keywords and/or matching the phrase to a particular cluster of phrases corresponding to a particular concept).

As another example, the customer automation system 300 may present automatically generated "quick actions" to the customer based on the customer's inferred intent and other data associated with the ongoing interaction. In some circumstances, the "quick actions" require no further input from the customer. For example, the customer automation system 300 may suggest sending an automatically generated text or email message to the contact center directly from a main menu screen, where the message describes the customer's issue. The message may be generated automatically by the script processing module based on a message template provided by the script, where portions of the template that contain customer-specific and incident-specific data are automatically filled in based on data collected about the customer (e.g., from the customer profile) and that the customer has supplied (e.g., as part of the initial customer input). For example, in the case where the customer input references a question about a possible double billing by a particular service provider, the script processing module 325 can reference previous billing statements, which may be stored as part of the customer profile 330, to look for historical charges. The customer automation system 300 infers from these previous billing statements that the amount charged for the period in question was unusually high. In such cases, the system may automatically generate a message which may contain the information about the customer's typical bills and the problem with the current bill. The customer can direct the customer automation system 300 to send the automatically generated message directly to the contact center associated with the service provider. In exemplary embodiments, the script may provide multiple templates, and the customer may select from among the templates and/or edit a message prior to sending, in order to match the customer's personality or preferred tone of voice.

In other exemplary embodiments, the personal bot 405 may automate processes that augment a current or ongoing interaction between the customer and a contact center (e.g., between the customer and either a chatbot or a live agent of the contact center). While the personal bot 405 may not handle the interaction in such embodiments, the personal bot may work behind the scenes to facilitate the customer's interaction with a contact center, so to increase the likelihood of a desirable outcome for the customer. In such embodiments, once the interaction has been initiated with a live agent, meta-data regarding the interaction may be displayed to the customer in the user interface 305. This may be done throughout the interaction, with the information being update based on the progression of the ongoing interaction. Examples of such information might include, but not be limited to, name of the contact center, name of the department reached, reason for the call, name of the contact center agent, name of other agents who were on the call, etc. According to exemplary embodiments, this type of information may include a transcript of the ongoing call so that the customer can easily look back at previous statements. In addition, the customer automation system 300 may display other types of information to the customer that is found pertinent given, for example, the recognition of certain key words within the transcript of the ongoing conversation. That is, the customer automation system 300 may push relevant content from a knowledge base (e.g., the knowledge system 238 of FIG. 2) to the customer given the content of the transcript of the interaction.

The customer automation system 300 also may enable the customer and agent to share relevant content with each other throughout the interaction. For example, in one embodiment, the agent or customer may share screens, documents (contracts, warranties, etc.), photos, and other files with each other. Other files may also be shared, such as screenshots of content captured by one of the parties during the conversation, a current view from a camera, links, photographs of broken or failed products, screenshots of error messages, copies of documents, proofs of purchase, or any other supporting file. The customer automation system 300, thus, may provide functionality that facilitates the customer supplying or sharing additional or augmenting material to an agent of the contact center that is relevant to an ongoing interaction. To do this, for example, a supplemental communication channels (e.g., a data channel) is established in parallel to the primary communication channel (e.g., a voice communication channel or a text communication channel) to transfer the augmenting information between the customer and the contact center agent. In certain embodiments, these documents may be provided along with an automatically generated "quick actions" message. For example, such quick action messages may prompt the customer to take a photo of the broken part, for inclusion in the shared material.

In accordance with other embodiments, the communication manager 335 monitors conditions for a customer based on specified intents and automatically generates notifications to be presented to the customer through the user interface 305. For example, based the previous activity of the customer (for example, the customer's billing statements, which may be stored in the customer profile 330, and communications from different contact centers), the communication manager 335 may automatically generate notifications which might be of interest to the customer. Examples of a notification generated by the communication manager may include a reminder about the upcoming expiration of a deal, an offer of a new deal, actions for the customer, and the like. For example, the notification may offer quick actions that can be performed directly from the notification screen, such as how to get a specific deal, call a contact center about a specific deal, search for more deals, cancel a service, etc. The communication manager 335 may customize notifications to the customer based on the customer's previous deals, billing statements, crowd-sourced information about how similar customers reacted to deals, personal preferences, and the like. The communication manager 335 may provide such functionality through the user interface 305 for the customer to search for more deals based on their needs. Should the customer select this option, the customer automation system 300 may present some relevant deals that are identified from a database of deals.

In accordance with other embodiments, the customer automation system 300 may provide 'end of deal' notifications. In such cases, the customer is informed about the ending of deal, contract, business arrangement, or the like. For example, a customer may be notified about the ending of an internet package deal with their current internet service provider (ISP). The customer may be presented with the best deals offered by their current ISP and the best deals offered by other ISPs. Continuing with this example, the customer automation system 300 may offer specific deals without requiring communication with the contact center, such as a call-in to the relevant customer service department. Pricing may also be shown along with other comparisons relevant to the customer. For example, promotional offers may be compared to the average usage of the customer (e.g., based on the customer profile) and current pricing of their plan. Other suggested options that are specific to the customer intent in the notification may also be presented, such as a "cancel service" option and an option to "search more deals." Should the customer select the "cancel service" option, the customer automation system 300 may send a cancellation request to the contact center automatically. The customer automation system 300 may also search for more deals which fit the customer's needs and present these whether the customer has selected to cancel their service or just search for additional deals. These may also be presented to the customer.

According to other embodiments, the customer automation system 300 may monitor statements made by the contact center agent and automatically offers guidance to the customer in real-time. For example, the customer automation system 300 converts the contact center agent's speech to text using the speech-to-text converter 342 and processes the text using the natural language processing module 310. In exemplary embodiments, the natural language processing module 310 detects when the agent is making an offer and compares it to a database of other offers made by agents of the organization that the customer is speaking with. This database of other offers is crowdsourced from other customers. After identifying a corresponding matching offer in the database, the ranking of the offer compared to other offers is identified in order to determine whether the agent could make a better offer.

According to still other embodiments, the customer automation system 300 may present information to the customer about prior interactions with a particular contact center or organization. For example, such information may be retrieved during an ongoing interaction to show the current agent what other agents have said.

Customer Privacy Automation

Embodiments of the present invention further include the personal bot 405 and related resources functioning to automate aspects related to privacy for a customer. More particularly, the customer automation system 300 of the personal bot 405 may allow customers to manage privacy or data sharing with organizations and corresponding contact centers.

In accordance with exemplary embodiments, for example, the customer automation system 300 may facilitate the customer managing settings for privacy and data sharing (or simply "data sharing settings") globally, for example, across all providers and data types. The customer is enabled to manage data sharing settings on a per-organization basis by choosing which data type to share with each specific organization. As another example, the customer is enabled to manage data (e.g., data within a customer profile) according to data type. In such cases, the customer may choose which organization or which types of organizations to share each particular data type. In more detail, each field of data in the customer profile may be associated with at least one permission setting (e.g., in exemplary embodiments, each field of data may have a different permission setting for each provider). Further, user interfaces may be provided through the customer device 205 that allow the customer to adjusting data sharing settings and/or permission settings. Within such user interfaces, data sharing settings or permission settings may be made adjustable on a per data type, per organization basis, per type of organization basis, etc.

In accordance with exemplary embodiments, the customer automation system 300 may offer a plurality of levels for data sharing settings or permission settings. For example, in one embodiment, three different levels of permission settings are offered: share data, share anonymous data, and do not share any data. Anonymous data may include, for example, genericized information about the customer such as gender, zip code of residence, salary band, etc. Some aspects of embodiments of the present invention may enable compliance with the General Data Protection Regulation (GDPR) of the European Union (EU). In other embodiments, the customer automation system 300 provides functionality for a customer to exercise the "right to be forgotten" with all organizations (e.g., providers and/or business) that the customer has interacted with. In other embodiments, the customer can switch on/off the sharing of each of the data types. When selecting a specific data type, the customer can select to send this data in an anonymized form to the provider or to delete the previously shared data with a particular organization. Additionally, the customer can delete all data types that were previously shared with an organization, for example, by clicking on the 'trash' button provided in the customer interface. According to one embodiment of the present invention, the deletion of the data may include the customer automation system 300 loading an appropriate script from the script storage module 320 in order to generate a formal request to the associated organization to delete the specified data. As noted above, for example, the customer automation system 300 may be used to make such request by initiating a communication with a live agent of the organization or by accessing an application programming interface provided by the organization.

Post-Interaction Automation

Embodiments of the present invention include methods and systems for identifying outstanding matters or pending actions for a customer that need additional attention or follow-up, where those pending actions were raised during an interaction between the customer and a contact center. Once identified, other embodiments of the present invention include methods and systems for automating follow-up actions on behalf of the customer for moving such pending actions toward a resolution. For example, via the automation resources disclosed herein, the personal bot 405 may automate subsequent or follow-up actions on behalf of a customer, where those follow-up actions relate to actions pending from a previous interaction with a customer service provider. As will be appreciated, this type of automation is primarily aimed at those actions normally occurring within the post-contact or post-interaction stage of a customer interaction, however it also includes the automation of action that also can be characterized as preceding or prompting a subsequent customer interaction.

Figure 9:
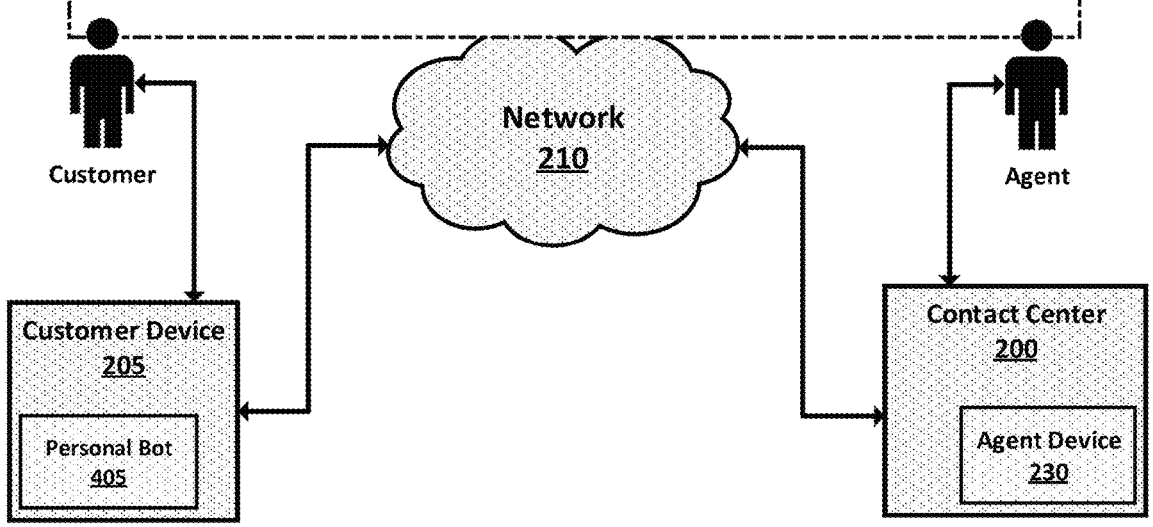
FIG. 9 is an example as to how a customer interaction is processed according to embodiments of the present invention.
Figure 10:
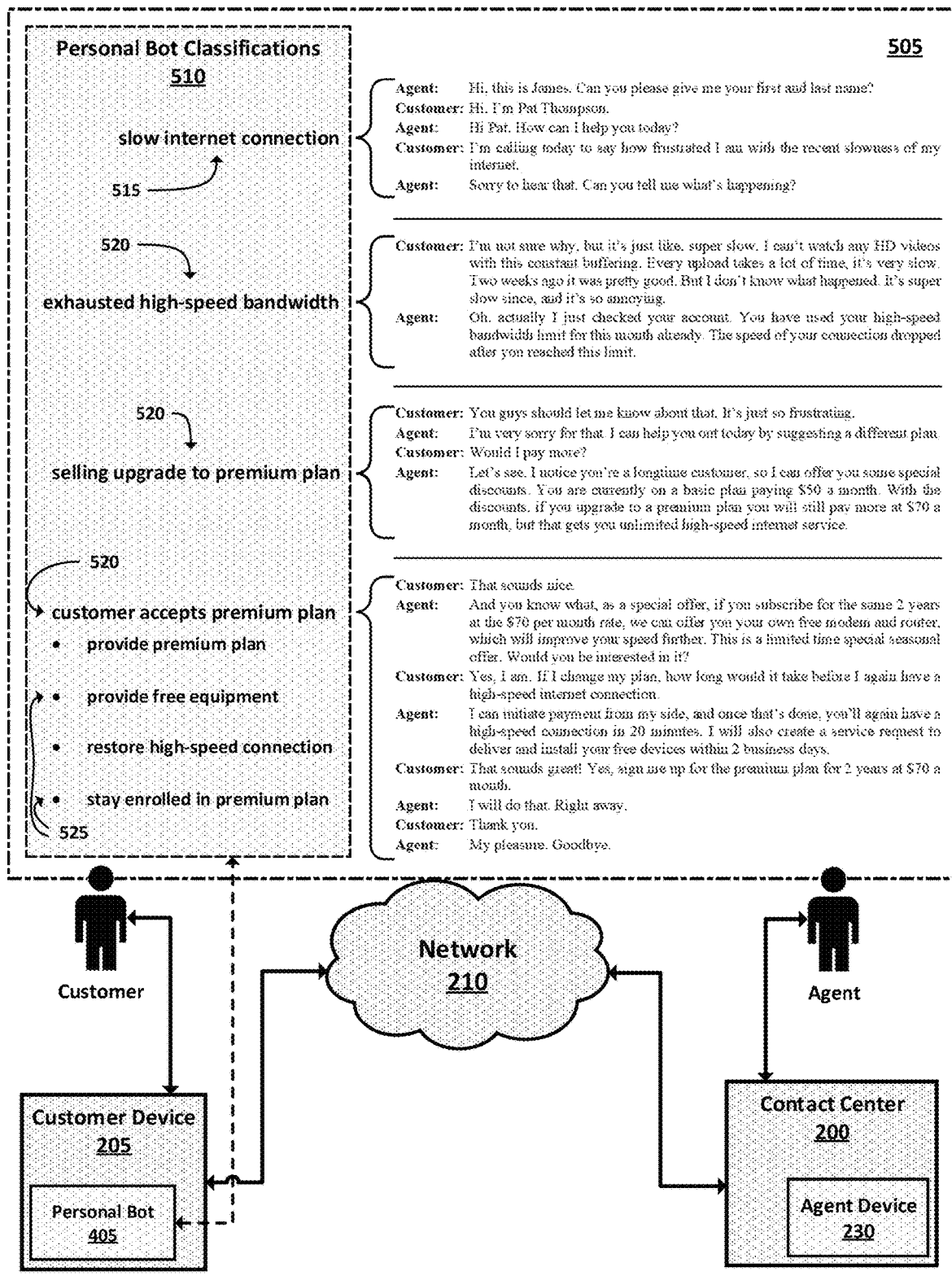
FIG. 10 is an example as to how a customer interaction is processed according to embodiments of the present invention.
Figure 11:
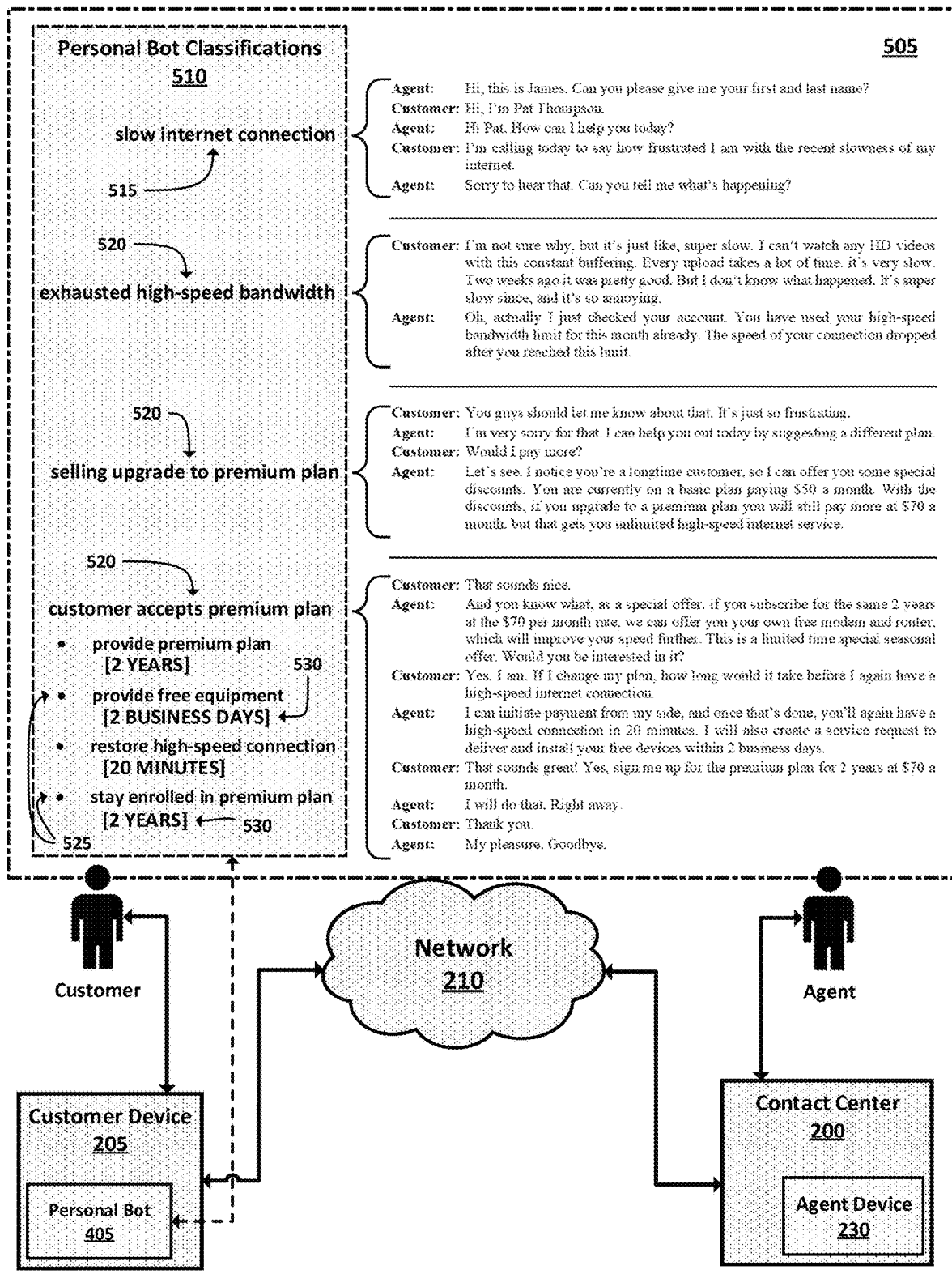
FIG. 11 is an example as to how a customer interaction is processed according to embodiments of the present invention.

With reference to FIGS. 9, 10 and 11, an exemplary interaction is illustrated of a conversation transcript between a customer and a contact center agent stemming from a call made by the customer to discuss his internet connection. Using this text, exemplary functionality is provided as to how the interaction may be processed by the personal bot 405 in order to identify unresolved or pending actions and/or take follow-up actions for the customer in relation thereto.

With specific reference to FIG. 9, text of the conversation between the customer and the agent is presented, which may be referred to as an interaction 505. It will be appreciated that, while the example includes the customer interacting with a live agent, the present functionality could also be used in situations in which the customer instead interacts with an automated process or chatbot. In the dialogue of the interaction 505, the customer is contacting the contact center to discuss a slow internet connection that he has been experiencing. The conversation progresses with the agent diagnosing the reason for the slow connection—the customer using his current plan's allotment of high-speed data—and then offering the customer an upgraded data plan that includes unlimited high-speed data. The agent tells the customer that the upgrade offer includes special discounts and free equipment if the customer agrees to enroll for a specified term. Toward the end of the interaction 505, the agent discusses with the customer several actions and time periods relevant to enrolling the customer in the upgraded plan and how long it will take for the customer to again have a high-speed data connection. The customer then agrees to enroll in the upgraded plan as offered by the agent.

It will be appreciated that, as the interaction 505 concludes, both parties to the conversation have agreed upon or suggested (or, as also used herein, "promised") a course of action that includes several actions being performed in the future. (Note: these actions, as already mentioned, will be referenced herein as "pending actions" and, generally, described as being "promised" by one of the parties in the interaction. It should be understood that the use of the term "promised" is intended broadly and may be used herein to described instances where a pending action is merely implied or recommended in a party's statements, as it may be desirable in certain embodiments to identify a pending action for follow-up where no express or binding promise is actually made.) For example, several actions have been promised by the agent (and, by extension, the business or organization the agent represents) that need to be fulfilled so that the customer, in fact, is enrolled in the upgraded plan and the high-speed data connection is delivered to him in the manner promised. As will now be discussed, embodiments of the present invention may effectuate through customer automation the performance of these pending actions.

In accordance with exemplary embodiments, once an interaction has concluded, example embodiments of the present invention (for example, via functionality associated with the personal bot 405 and/or customer automation system 300) may record and document the interaction for a customer, e.g., storing data related thereto in the customer profile 330. For example, different aspects related to the communication may be recorded and stored, including text, voice, and/or video. The customer automation system 300 may further document the interaction by storing and indexing any messages, documents, files, and other media involved or shared during in the interaction and, thereby, provide a customer with the ability to later search this material. As an example, a customer may search for keywords spoken by an agent in order to retrieve saved audio that was spoken near the keywords. As another example, after conducting a technical support call, a customer may have the ability to recall and view an image that was shared and annotated by an agent when explaining how to set up a particular piece of equipment. A customer may then be able to view specific details of an interaction, such as the timing of particular spoken lines in the conversation and what files were being shared at the time.

In relation to the example interaction 505 of FIG. 9, the personal bot 405 may save the conversation as a transcript or recording. If saved as a recording, the recording may later be transformed to text via voice-to-text transcription. In any case, an interaction transcript of the interaction 505 may be created and saved within a database, where that database is accessible to the personal bot 405. As will now be discussed, the personal bot 405 may include analysis tools that, when applied to the interaction transcript, facilitate customer-side automation.

With specific reference to FIG. 10, the results of a first type of analysis are presented. In this case, the personal bot has analyzed the transcript from the interaction 505 and, from that analysis, recognized, inferred, and/or classified an overall "context" of the interaction and identified "intents" (i.e., the meaning or intention behind spoken phrases or word groupings), which, as will be seen, then may be used to identify pending actions. In performing this analysis, any of the methods and systems disclosed herein may be used, including the use of conventional technologies, as would occur to one of ordinary skill in the art. For example, the personal bot may have a machine learning or artificial intelligence (AI) engine that is trained with predefined set of intents that are segregated by context. Thus, the personal bot may first determine a reason or context of the customer query, i.e., the context. Upon determining the context, the analysis may proceed with segmenting and classifying the interaction transcript in accordance with a predefined set of intents that correspond to that particular context. The results of this step in the analysis are presented in FIG. 10 in a personal bot classifications 510 section, which is provided as an annotation to the interaction transcript 505.

More specifically, in relation to the example conversation of the interaction 505, the analysis of the personal bot may begin by determining a context 515, which often is found in an initial segment of the exchange in a customer's response to an agent asking the reason for the call. A trained model may be used to do this. For example, a training data set (e.g., a data set including data pertaining to prior interactions between customers and contact centers) may be used to train an NLP algorithm or model—which also may be referred to as a "context recognizer model"—and, once trained, the model may be used to recognize the context of the interaction 505. In the example provided, because the customer has called to express his frustration with his internet connection being slow, the analysis determines that the context 515 is a "slow internet connection".

As a next step of the analysis, the personal bot may retrieve a predefined list of intents that corresponds to the context, i.e., "slow internet connection". In accordance with the list of intents, the personal bot may segment the conversation and classify the segments by those intents. That is, the analysis continues with personal bot chunking or segmenting the conversation based on, for example, keywords and topics covered within particular portions or sections of the exchange. As shown, one of the segments is the one in which the context 515 of the interaction is found, with the other segments being primarily devoted to different topics within the context 515. Based on the topic or subtopics covered in each of these other segments, the personal bot then may classify each with an intent 520 selected from the predefined list. As an example, a trained model may be used to do this. For example, a training data set (e.g., a data set including data pertaining to prior interactions between customers and contact centers) may be used to train an NLP algorithm or model-which also may be referred to as a "intents recognizer model"—and, once trained, the model may be used to recognize an intent for each of the other segments. As shown in the example of FIG. 10, the intents 520 inferred for the remaining segments are referred to as "exhausted high-speed bandwidth", "selling upgrade to premium plan", and lastly, "customer accepts premium plan".

These intents 520 then may be used to identify any unresolved, outstanding, or, as referred to herein, pending actions 525. As used therein, a "pending action" is defined as any action that is agreed upon, promised, or otherwise suggested by one of the parties during an interaction, where the action is to be performed or completed after the interaction has ended. In regard to the relationship between intents and pending actions, an intent may refer to a broader action or objective, while a pending action within that intent may refer to specific actions necessary to make that broader objective happen. Thus, as will be discussed more below, one of the intents identified in FIG. 10 refers a customer's desire to enroll in a new upgraded plan. To make this intent happen, several actions must be taken, some of which may be taken care of during the interaction, with others requiring action after interaction has concluded. These actions—which have to be completed after the interaction is concluded—are the ones that present embodiments may classify as pending actions 525.

As will be appreciated, certain pending actions may regularly appear in relation to certain intents. According to example embodiments, some intents may have a predefined list of pending actions. Like the predefined list of intents that correspond to a particular context, the predefined list of pending actions may result in more accurate recognition of pending actions when a particular intent is identified.

Within an interaction, pending actions may be found in statements made by either the customer or agent, which may include chatbot representatives in place of each, and may make either party responsible for completing the action. It should be appreciated that, in the case of an agent, a pending action may be identified for actions that will be completed by other representatives or agents (i.e., not just the agent himself). That is, a pending action may be identified when the agent suggests or promises an action that will be handled by another representative of the contact center and/or enterprise, business, or organization associated with the contact center. For example, a statement by an agent saying that the agent will call the customer back at a later time creates an identifiable pending action, which is a future act performed by the agent of calling the customer back. As another example, a statement by an agent promising a service call by a technician on an upcoming day creates an identifiable pending action, which is the future act performed by the technician of completing the service call. As mentioned, customer statements can also create pending actions. For example, if the customer suggests that he will do something in the future, such as tells an agent that he will forward certain documents to the agent later in the day, this creates an identifiable pending action for the customer.

Returning to the specific example of FIG. 10, the results of the analysis demonstrate that the exemplary embodiments does not identify any pending actions 525 in the "exhausted high-speed bandwidth" intent segment. Similarly, none is identified in the "selling upgrade to premium plan" intent segment. As will be appreciated, these results generally stem from the fact that, in each case, neither the customer nor agent make statements that can be reasonably construed as suggesting or promising the completion of a specified action in the future. However, as will now be discussed, present embodiments may be configured to identify several such pending actions 525 in the "customer accepts premium plan" intent segment.

As illustrated, a first identified pending action 525 is referenced as "provide premium plan." As will be appreciated, with the customer accepting the upgrade to the premium plan, the agent's statements about what comes with the premium plan substantially creates a promise to actually provide those services. Such promised future actions may be classified as pending actions.

As further illustrated, a second identified pending action 525 is referenced as "provide free equipment". In this case, the agent makes statements regarding one or more actions that will be taken after the interaction is completed in order to provide the customer with certain free equipment (i.e., a modem and router). These statements are made contingent on the customer upgrading to the premium plan. Once the customer agrees to the upgrade, the agent's statements effectively become a promise, and the future actions related to providing the equipment becomes classified as a pending action.

A third identified pending action 525 is referenced as "restore high-speed connection". In this case, the agent makes statements regarding one or more future actions that will be taken in regard to restoring the customer's high-speed connection once the customer agrees to the premium plan upgrade. When the customer accepts the upgrade, the agent's statements effectively become a promise, and the future actions required to restore the customer's high-speed connection is classified as a pending action.

A fourth such pending action 525 is referenced as "stay enrolled in premium plan". In this case, the pending action is on the customer-side of the interaction. That is, once the customer has accepted the upgrade, he has agreed to provide payment for the services, as necessary, over the term of the agreement. Thus, once the customer accepts the upgrade, the future action of paying for those services and staying enrolled becomes classified as a pending action.

With reference now to FIG. 11, with several pending actions 525 identified, embodiments of the present invention may proceed with identifying corresponding target timeframes 530. As used herein, a target timeframe 530 is a time period or deadline associated with the performance or fulfilment of the pending action 525 to which it corresponds. As discussed more below, once identified, a target timeframe 530 may be used to orchestrate the timing of automated follow-up actions by the personal bot on behalf of the customer.

The analysis for identifying a target timeframe may include natural language processing via a trained model or neural network, which may include key word or phrase spotting, particularly within the portion of the transcript in which the corresponding pending action 525 is identified. In example embodiments, however, the present invention may include a target timeframe recognizer model that recognizes relevant timeframe language associated or used in conjunction with the pending actions 525. For example, the interaction transcript may be analyzed by a target timeframe recognizer model, with the model outputting a target timeframe 525 for each previously identified pending action 525. In accordance with an exemplary embodiment, a training data set (e.g., a data set including data pertaining to prior interactions between customers and contact centers) is used to train the target timeframe recognizer model.

The present system and methods used to identify target timeframes may be configured to recognize several different types, allowing for the necessary flexible for consistent use across a variety of situations. As will now be discussed, these categories may include: a) definite target timeframes; b) deducible target timeframes; and c) indefinite target timeframes.

In regard to the category of definite target timeframes, this classification includes those timeframes that are stated in the interaction transcript a straightforward or direct or non-ambiguous way. Examples of these types of target timeframes are found in the following statements:

"Your request will be processed within 24 hours."
"Your payment will be credited in the next 6 hours."
"All our technical experts are currently busy, but we can assign someone to call you back within the next 2 hours."
"We are still working on the problem and will probably get back to you in another hour."
"It will take us about 2 hours to verify your documents."
"Your complaint is already filed, and it will be resolve it in the next 2 business days."

In each of these examples, a distinct and specific timeframe is mentioned in relation to the performance of some action in the future. System and methods of the present invention may be trained to recognize and decipher these types such timeframes so that a target timeframe is assigned to each identified pending action.

In regard to the next category, deducible target timeframes, as used herein, are those timeframes that become clear and distinct with some additional information. In such cases, the pending action may be clear stated, but the target timeframe is not expressed in a clear or numerical way, as in the example above. That is, some further learned intelligence must be applied in these cases to determine an appropriate target timeframe for the pending action. Examples of these types of timeframes are found in the following statements:

"Please check back during business hours."
"I can check if there are better deals for you during Thanksgiving holidays."
"Christmas week is the right time for you to check back regarding this."
"The issue needs one of our skilled technical experts. You can expect a positive update after the holidays."

In these examples, while the exact timeframe may not be stated directly, it may be deduced if the input text is syntactically handled correctly and/or additional information is acquired. For example, in the first example, the personal bot may need to search and find the relevant "business hours" information and, once this is known, the target timeframe for calling back can be known. In the next three examples, the personal bot may pinpoint a specific target timeframe once the dates for the referenced holidays are known.

In regard to the category of indefinite timeframes, as used herein, these are those timeframes that are defined in accordance with less definitive or vague language. That is, statements made in the interaction reference to a timeframe, however the language used to describe that timeframe is open to some interpretation. Examples of these types of are found in the following statements:

"The item will be on stock in few days."
"This whole week is crazy, but just give me more time and I will get it done."
"The product is currently not in stock. You should call us back later."
"I will check with my manager and get back to you soon."

In regard to these examples, the target timeframe recognizer model may be trained to infer an approximate timeframe or deadline for completing a pending action given an analysis of the interaction script. In training the model, the system may analyze similar contexts to predict appropriate ranges for such indefinite timeframes. Such models may be further improved when input is received from the customer to confirm assumptions made by the model. That is, the customer may be asked to confirm the timing of a follow-up action by the personal bot. The customer may choose to modify the deduced timeframe. The modified timeframe may then be used to update the target timeframe recognizer model so that the model learns and adepts. This may be done on a per customer basis or applied more globally. In ambiguous cases, the target timeframe for a pending action may be confirmed via a prompt and question to the customer via the customer device.

Returning to the specific example of FIG. 11, the analysis results in identifying target timeframes 530 for each of the pending actions 525. Thus, in regard to the first pending action 530—entitled "provide premium plan"—the target timeframe 520 is identified as "2 YEARS". This two-year period reflects the time the internet provider has promised to provide the customer with unlimited high-speed data per the premium plan. In regard to the second pending action 530—entitled "provide free equipment"—the target timeframe 530 is identified as "2 BUSINESS DAYS". This period reflects the time in which the agent promised delivery and installation of the free modem and router. In regard to the third pending action 530—entitled "restore high-speed connection"—the target timeframe 530 is identified as "20 MINUTES". This period reflects the time the agent stated it would take for the customer to again have a high-speed connection if he signed up for the premium plan. And, finally, in regard to the fourth pending action 530—entitled "stay enrolled in premium plan"—the target timeframe 530 is identified as "2 YEARS". This period reflects the time that the customer promised to stay enrolled in the premium plan.

According the exemplary embodiments, the personal bot 405 may use the identified pending actions and target timeframes to automate the performance of follow-up actions on behalf of the customer. The follow-up actions may be actions intended or anticipated to help move a pending action toward a resolution or completion. In some embodiments, the personal bot may develop a follow-up workflow in which one or more follow-up actions are scheduled in relation to the target timeframe.

For example, in accordance with present embodiments, the follow-up action may take the form of a reminder, notification, inquiry, or offer to help made to the customer pertaining to a promise made to the customer by the agent during a previous interaction. As an example, the personal bot may provide a voice or text message to the customer stating: "John, Walmart said it would be calling you back today regarding the return request of your previous order."

The personal bot may present this type of reminder with other automated follow-up actions that the customer can then decide to use. First, the personal bot may offer to automate the process of connecting to the customer to the enterprise, for example, "John, do you want me to start this interaction with Walmart for you now?" Second, the personal bot, when possible, may offer to handle the entire interaction for the customer, for example, "John, would you like me to handle this interaction with Walmart for you?" Third, the personal bot may simply provide a link with the initial question that, when activate by the customer, calls or otherwise contacts the enterprise to begin an interaction that the customer then handles, for example, "Activate the following link [CHAT LINK] to begin a chat session with Walmart" or "Activate the following link [PHONE NUMBER LINK] to place a call to Walmart."

As another example, in accordance with present embodiments, the follow-up action may take the form of a reminder, notification, inquiry, or offer to help made to the customer pertaining promises made by the customer to an agent during a previous interaction. Thus, when the customer has mentioned an action for himself in an interaction, the personal bot can help by later reminding him of this. For example, the personal bot may provide a voice or text message to the customer stating: "John, you told American Express you would get back to them today in regard to your expired credit card." As another example, "John, you needed to send your address proofs to Y bank within 24 hours. Shall we send it now? Or should I remind you later?" As with the above, the personal bot may present this type of reminder with offers relating to other automated follow-up actions that the customer can then decide to use.

Now, with specific reference again to FIG. 11, when this type of functionality is applied to the example interaction 505, several types of notifications and offers to help may be communicated to the customer.

For example, after 20 minutes has passed since the end of the interaction 505, the personal bot may remind the customer that his high-speed connection should be restored and then inquire whether this has happened yet. If it has not happened, other follow-up actions facilitating another or subsequent interaction with the contact center may be suggested and then performed by the personal bot once permission to do so is received from the customer to do so.

As another example, after two business days have passed since the end of the interaction 505, the personal bot may remind the customer that his free equipment should have been delivered and installed and then inquire as to whether this has taken place yet. If it has not happened, other follow-up actions facilitating another or subsequent interaction with the contact center may be suggested and then performed by the personal bot once permission to do so is received from the customer.

As another example, near the end of the two-year enrollment term for the premium plan, the personal bot may remind the customer that the end of the term is nearing and inquire as to any actions the customer may want to take, e.g., provide notice terminating the plan at the end of the specified term, consider other service options that the personal bot could present to the customer, etc. On the other side, the personal bot, when appropriate, may remind the customer about his obligations under the premium plan once he accepted it. These may include reminders regarding the due date of the monthly fee or, if the customer began researching a new internet provider, remind him of the term remaining on his current premium plan and/or advise him as to any applicable fees or penalties for early termination. In this way, the follow-up actions of the present invention may serve to both remind the customer of pending actions from previous interactions and facilitate the fulfilment of the underlying promised actions.

Personalized Customer Profiles

Figure 12:
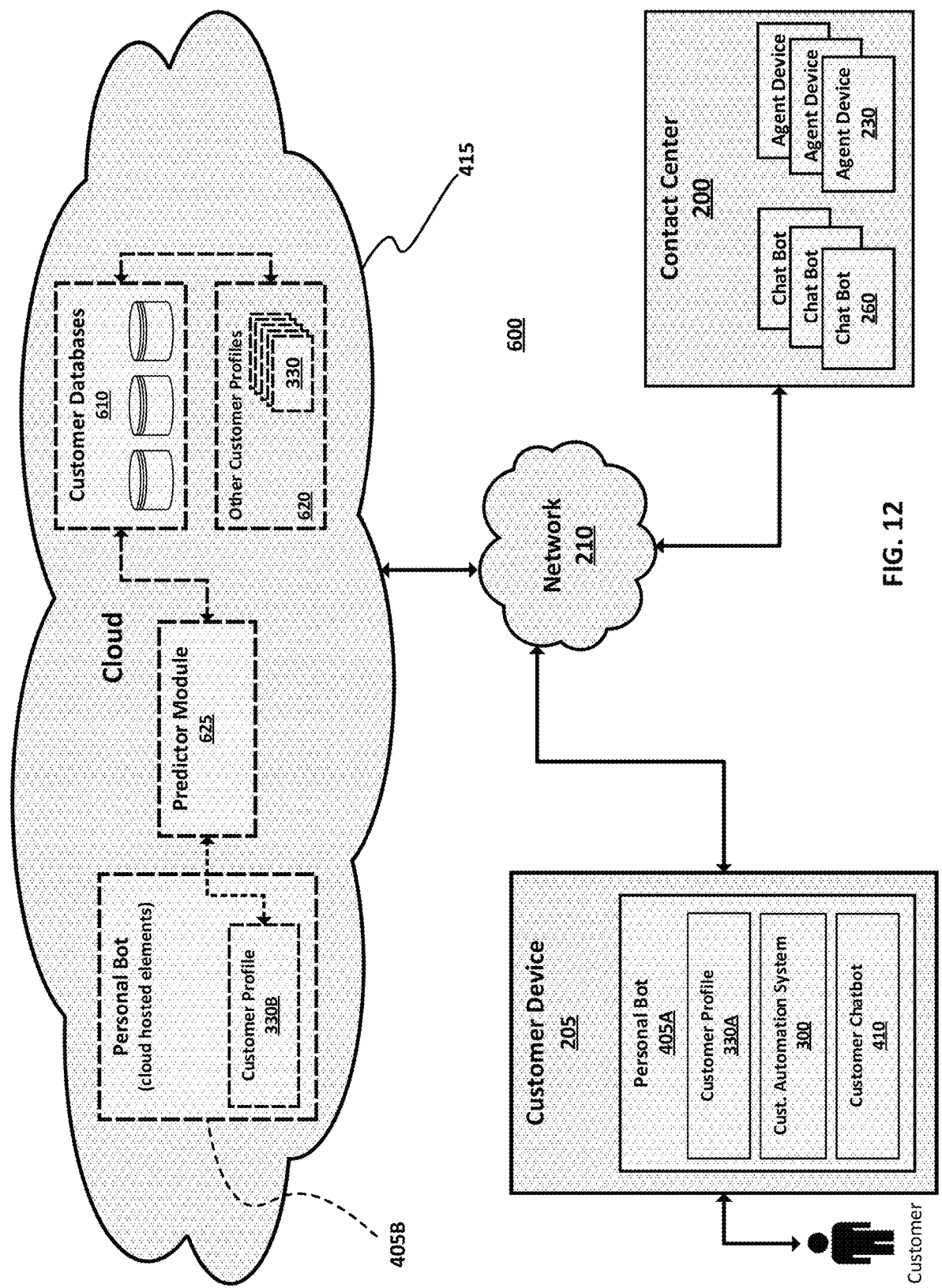
FIG. 12 is a schematic representation of an exemplary system including a personal bot and personalized customer profile in accordance with the present invention.
Figure 13:
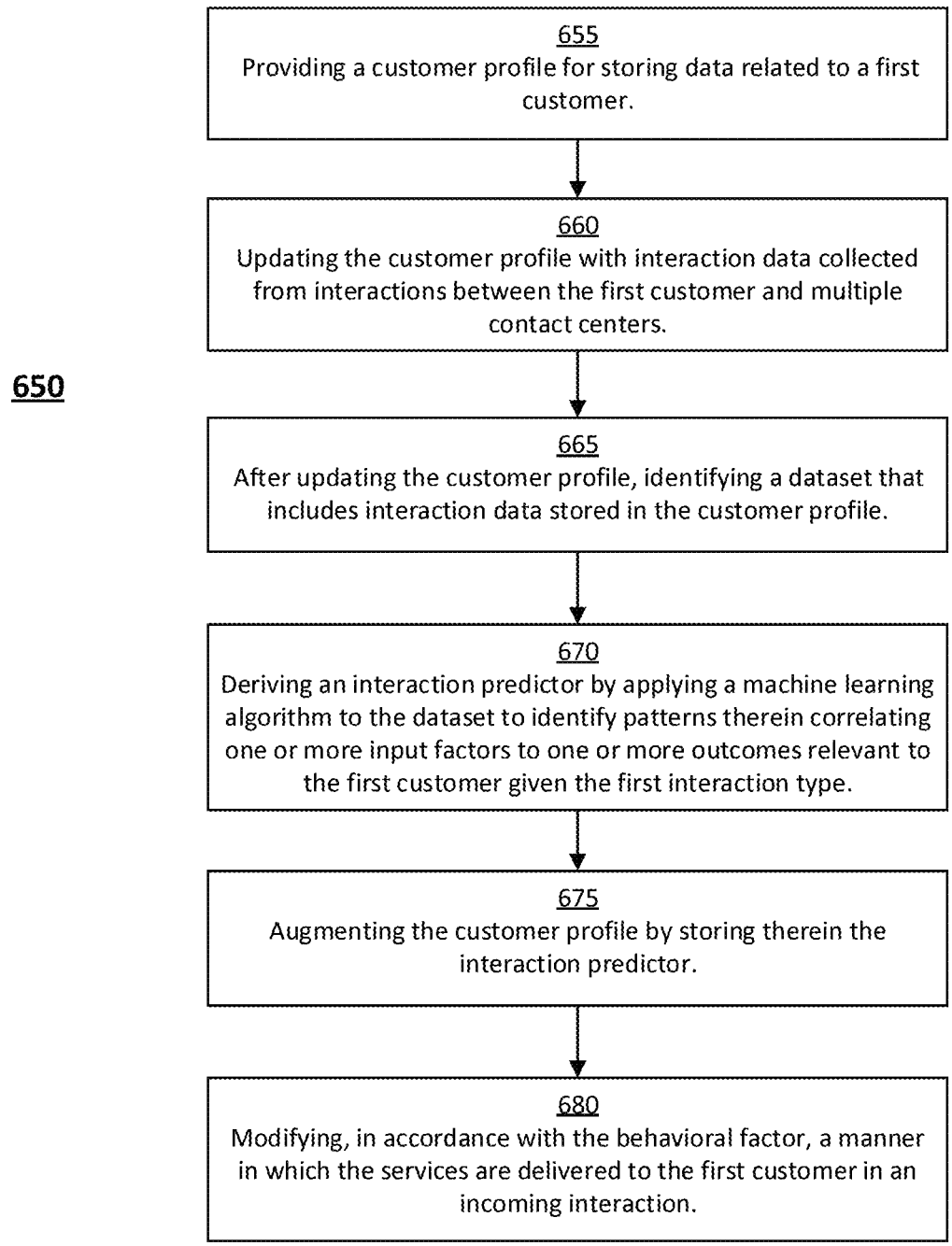
FIG. 13 is a process related to personalized customer profile in accordance with the present invention.

With reference now to FIGS. 12 and 13, attention will now focus on aspects of the present invention aimed at gathering, maintaining, analyzing, and using customer data and profiles. For example, systems and methods are disclosed for building highly personalized customer profiles that facilitate the mining and use of customer data. As will be seen, the customer profiles of the present invention may be used in several ways, including implementing personalized customer services aimed at improving the customer experience.

By way of background, customer service providers or contact centers have long maintained data on customers, with data pertaining to a particular customer often being stored in a customer profile. Once stored, this data then may be used by the contact center to manage certain aspects of the customer relationship. For example, contact centers may use customer profiles to facilitate aspects of incoming interactions. However, conventional customer profiles are often limited in scope, for example, including only basic information about customers, with perhaps some partial history and preferences. Further, conventional customer profiles have been structure and utilized in ways that have constrained customer-oriented advances. In several ways, which will now be touched on, conventional systems and methods associated with customer data and profiles have proved inadequate at providing the level of personalization required to deliver advanced customer-oriented functionality.

First, conventional customer profiles are overly static. That is, in conventional systems, customer profiles are not regularly updated and, thus, generally ill-equipped at providing helpful real-time clues as to a particular customer's present situation. What's more, conventional systems are often not configured to take into account the most current or relevant customer data, and this deficiency undermines the usefulness of customer behavior models and other analytics.

Second, while advances in data collection and analysis have increased the amount and variety of data being collected about customers and interactions with contact centers, conventional systems have failed to leverage this new data abundance into customer centric features. For example, large repositories of customer interaction data could be analyzed to determine predictive insights useful at providing personalized customer services, yet conventional systems continue to emphasize the use of such data toward improving contact center performance, virtually ignoring the customer experience.

Third, conventional systems also fail to properly aggregate data sources. As will be appreciated, opportunities to make cross-category data insights are impeded when different types of customer data are maintained in separate databases. Further, incomplete customer profiles degrades the ability of the enterprise to respond to and service customers according to particular needs.

As a result of these and other issues, current data systems related to the maintenance, analysis, and use of customer data and profiles have been unsuccessful at promoting customer-oriented advances in the field. This failure is particularly apparent in those instances where the delivery of new services involves recognizing or predicting a customer's current status or emotional state.

To address this situation, the present invention discloses improved systems and methods for gathering, maintaining, analyzing, and using customer data and profiles. For example, systems and methods are disclosed for building highly personalized customer profiles that facilitate the analysis and mining of customer data. From there, the customer profiles of the present invention may be used in several ways, including implementing personalized customer services aimed at improving the customer experience and/or removing the interaction "friction" that normally occurs between customers and contact centers. On the customer side of the interaction, for example, routing strategies can become more personalized in accordance with specific customer preferences and a present emotional state, thereby making routing more customer centric. On the contact center side of the interaction, the present customer profiles also may be used toward improving contact center operations, such as, for example: making call forecasting more context oriented and reliable; improving handle time predictions and queue optimization; improving outbound campaigns (e.g., by targeting customers who are more likely to see value in and respond positively to a particular offer); improving agent assists or automated processes with more customer personalization (e.g., by anticipating customer needs to reduce the steps needed to complete an interaction and/or alleviate need for customer to provide information during an interaction); and improving customer communications through greater personalization.

Before proceeding, several terms will first be presented and defined in accordance with their intended usage. As used herein, "customer experience" generally refers to the experience a customer has when interacting with a customer service provider and, more specifically, refers to the experience a customer has during an interaction, i.e., as he interacts with a contact center. As used herein, "customer data" refers to any information about a customer that can be gathered and maintained by a customer service provider. As provided below, such customer data may be categorized with reference to several different information types. In discussing how such data is stored, reference may be made to a "customer profile" (such as customer profile 330), which, as used herein, refers a collection or linking of data elements relevant to a particular customer. Reference may also be made to "customer databases" (such as customer databases 610), which, as used herein, refers to a collection or linking of data elements relevant to or gathered from a large population of customers (or "customer population"). Further, as stated, reference may be made interchangeably to contact center or customer service provider. It should also be understood that, unless otherwise specifically limited, reference to a contact center includes reference to the associated organization or enterprise on behalf of which the customer services are being provided. This includes arrangements in which the associated organization or enterprise is providing the customer services through an inhouse contact center as well as arrangements in which a third-party contact center contracts with the organization or enterprise for providing such services.

With specific reference to FIG. 12, an exemplary system 600 is shown that includes a personal bot 405 running on a customer device 205, where the personal bot 405 facilitates the creation and maintenance of a personalized customer profile database or module (or simply "customer profile") 330. As shown in the example, the customer profile 33 may include elements 330A local to the customer device 205 as well as remote or cloud hosted elements 330B. The system 600 may further include customer databases 610, other customer profiles 620, and a predictor module 625. (Note that further information in regard to the system 600 of FIG. 12 may be found above in relation to the system 400 of FIG. 8, which includes several similar features that are not described again here for brevity's sake.)

For the sake of an example, a customer may have a mobile device or smart phone on which is running an application implementing local aspects of the personal bot 405. In setting up a customer profile 330, the personal bot 405 may serve as a means for the customer to input information. For example, the personal bot 405 may prompt and accept direct input of information from the customer by voice or text. The customer may also upload files to the personal bot 405 or provide the personal bot 405 with access to pre-existing databases or other files from which information about the customer may be obtained.

The personal bot 405 also may gather information about the customer by monitoring customer behavior and actions through the customer's use of the device 205. For example, the personal bot 405 may collect data that relates to other activities that the customer performs through the device, such as email, text, social media, internet usage, etc. The personal bot 405 also may monitor and collect data from each of the interactions the customer has with customer service providers, such as a contact center system 200, through the customer device 205. In this way, data may be collected from interactions occurring with many different contact centers.

In use, at the conclusion of each interaction, the personal bot 405 of the present invention may update the profile of the customer in accordance with data gleamed from that interaction. Such interaction data may include any of the types of data described herein. As discussed more below, once the profile is updated, it will include data associated with that most recent interaction as well as data from other past interactions. This updated or current dataset then may be analyzed in relation to one or more customer databases 610, which, as used herein, are data repositories housing customer data, such as interaction data relating to past interactions, from a large population of other customers. The analysis may be performed with the predictor module 625, which may include a machine learning algorithm that is configured to find data driven insights or predictors (or, as used herein, "interaction predictors").

As used herein, the interaction predictors represent a behavioral factor attributable to the customer given the first interaction type. As will be seen, the behavioral factor of the interaction predictor may include an emotional state, behavioral tendency, or preference for a particular customer given a type of interaction (also "interaction type"). The interaction predictor may be generated and applied in real time, for example, by the predictor module 625. Alternatively, the interaction predictors may be determined and stored in the customer profile 330 of a given customer as a way to augment or further personalize the profile. Such stored interaction predictors then may be applied in future interactions involving the customer when found relevant thereto. The predictor module 625 may be a module within the personal bot 405 or, as illustrated, may be a separate module that communicates with the personal bot 405.

Thus, in general, a personal bot 405 may gather relevant information as a customer interacts with contact centers on his mobile device. The personal bot 405 may gather other types of information, as described above, and then may aggregate that data to build a highly personalized customer profile 330. As will be appreciated, when a customer profile is created and maintained by a contact center, it is generally limited to data pertaining to past interactions occurring between a customer and a particular contact center. In the present invention, with the customer profile 330 being created and maintained on the customer-side of the interaction, the collection of data is not so limited. Instead data may be gathered from any of the interactions involving the customer, which will typically result in a much richer set of data as it reflects a wider spectrum of interactions.

The system of FIG. 12 may include a collection of data that is referred to other customer profiles 620. As will be appreciated, when versions of the personal bot 405 are used by many customers, data may be anonymously gleaned from the many corresponding customer profiles 330 (as shown within the other customer profiles 620) so to create rich repositories of customer data. For example, such data repositories may include information taken from a multitude of past interactions covering a wide spectrum of both customers and customer service providers. As indicated, this data may be parsed and aggregated into the customer databases 610 so to provide particular datasets that facilitate machine learning and other data driven analytics.

While the customer profiles 330 of the present invention may include any type of customer data, exemplary embodiments may include several primary categories of information. These categories include: biographic personal data (or simply "personal data"); past interaction data (or simply "interaction data"); feedback data; and choice data. As will also be seen, present systems and methods may predict or infer certain behavior traits, preferences, or tendencies about a customer through data analytics. Such predictions—which are introduced above as "interaction predictors"—may also be stored within a customer profile 330 and then utilized in subsequent interactions as a way of enhancing personalization and facilitating other customer centric features. Alternatively, the interaction predictors may be generated contemporaneously and used in relation to an incoming interaction.

It should be appreciated that, while the data stored within the customer profile 330 may be discussed in categories, the customer profile 330 of the present invention may be structured to include an aggregated collection of information that may be analyzed as a whole. Further, it should be understood that the data within a customer profile 330 may be stored locally on a customer device 204, remotely in the cloud, or some combination thereof. Present systems and methods may further include functionality that protects a customer's data from unwanted disclosure. In general, the data stored within the profile of a customer is controlled by the customer, with the customer deciding what information is to be shared during each interaction with an outside organization or enterprise. Thus, before any customer profile data is shared with an outside entity, such as a contact center or other organization, present systems and methods may first seek to confirm with the customer that such sharing is intended. Additional functionality may enable the partial sharing and use of customer information in ways that maintain a customer's anonymity.

In regard to the types of data stored within a customer profile 330, a first category is referred to herein as personal data. This type of data may include general information about the customer that is generic to all interactions with customer service providers, for example, name, date of birth, address, Social Security number, social media handles, etc. This type of data may also include biographical information, such as education, profession, family, pets, hobbies, interest, etc. This category of data may also include data that is specific to particular contact centers. For example, data related to authentication information specific to the different companies that the customer does business with, including usernames and passwords, may be included. Such personal data may be added to a customer profile 330 when a customer is registering with or setting up the mobile application, i.e., personal bot 405, on his mobile device. For example, a prompt by the personal bot 405 may be provided that initiates input of the necessary information. When setting up the mobile application, the customer may be asked via a user interface generated on his customer device for certain information. Once gathered, the personal data of the customer may be made part of the customer's profile. The customer may update this information at any time. As will be seen, aspects of the personal data may be used to find similarities with other customers, which may be used when making predictions about the customer.

The customer profile 330 of the present invention further may include a category of information referred to herein as past or historical interaction data (or simply "interaction data"). As used herein, this refers to data pertaining to or measuring aspects of previous customer interactions. Accordingly, such data may include a complete historical record of data reflecting all past interaction between a customer and any contact center. Interaction data may include any of the types of information described herein relating to interactions, including type or intent of the interaction, information associated with the dialogue between the agent and customer, such as a recording or transcript, information related to the agent, including agent type and other characteristics, information about results of the interaction, notes provided by the customer or the agent, files shared during the interaction, length of the interaction, call transfers or holds that took place during the interaction, emotional state of the customer, and others. The customer profile 330 may be updated after each new interaction with such interaction data taken therefrom. The interaction data may further include feedback data and choice data, which are discussed below.

The customer profile 330 of the present invention further may include feedback data, which, as used herein, refers to feedback received from a customer that relates to a particular interaction with a contact center. As will be appreciated, feedback and survey responses may provide a valuable indication as to what went right or wrong in an interaction. Often such feedback is provided by customers at the end of an interaction in response to surveys or ratings requests. In accordance with the present invention, any type of feedback, including customer satisfaction score or ratings, provided by a customer at the conclusion of an interaction is saved within a customer profile 330 as feedback data. Systems and methods of the present invention may include functionality wherein the personal bot 405 gathers such feedback data for storage within the customer profile 330. The personal bot 405 may do this via passively recording such feedback when provided by the customer in response to a query initiated by an outside entity, such as a contact center. The personal bot 405 also may actively prompt for such feedback at the end of an interaction and record any responses provided by the customer.

Another type of feedback data may include what will be referred to herein as "conclusory statement data". Conclusionary statement data may include data related to statements made by a customer as the interaction is concluding, where the meaning of the statements is extracted by natural language processing. Conclusory statement data, thus, may be seen as a type of inferred feedback, i.e., feedback inferred from statements made while the interaction is concluding.

For example, the personal bot 405 may gather such conclusory statement data by analyzing statements or comments made by the customer at the conclusion of an interaction and, where appropriate, inferring customer feedback from the analysis of those statements. Specifically, such conclusory statements by the customer may be extracted and analyzed via natural language processing and, when the customer's statements are clear enough to infer feedback with sufficient confidence, the inferred feedback may be gathered for storage within the customer profile 330 as a type of feedback or interaction data. As such statements are often highly relevant as to how the customer feels at the conclusion of an interaction, such inferences can prove useful, particularly where no other rating or survey response is provided by the customer for a given interaction. According to exemplary embodiments, for example, such feedback data may be used to assist contact centers in deciding on the level of service that a customer should receive in a next interaction.

The customer profile 330 of the present invention further may include choice data, which, as used herein, refers to data that relates to a selection or choice made by the customer in selecting an agent. More specifically, choice data refers to automatically learned preferences of the customer that are based on the customer's manual selection of one agent or type of agent over another agent or type of agent. For example, the present invention may include functionality that permits customers to manually choose their own agent from alternatives provided to them via the customer's computing device. Thus, a customer may be allowed to review a collection of agent profiles of available agents and then prompted to select one of those agents to handle the customer's present or incoming interaction. Alternatively, instead of being presented with a choice between individual agents, the customer may be prompted to select from different categories or types or agents. The categories, for example, may describe personality types of the agents. After the customer makes several such selections, systems and methods of the present invention could begin to learn what type of agent a customer most and least prefers. In example embodiments, such learning can be bolstered by cross-referencing interaction data that describes the actual outcomes of those interactions and/or subsequent feedback provided by the customer. In certain cases, this type of analysis may produce insights into preferences that even the customer is not fully aware of having, which may be leveraged to improve predictive routing for that customer in future interactions.

The data stored within the customer profile 330 of the present invention may further include interaction predictors. As used herein, an interaction predictor is defined as a behavioral characteristic, preference, tendency, or other customer trait that, because of correlations or patterns found to exist within a dataset of relevant customer information, can be inferred upon or attributed to a given customer. As will be seen, some interaction predictors may be used to predict broad traits, behaviors, or tendencies that are common to many other customers, while other interaction predictors are highly contextual and specific to particular type of interaction, such as, for example, interactions involving a particular intent, emotional state, or contact center. As will be appreciated, the interaction predictors of the present invention offer a way to add detail to a customer profile 330 with assumed characteristics that then may be used to personalize services and facilitate interactions.

In deriving the interaction predictors, any of the systems and methods described herein may be used. In exemplary embodiments, as shown in FIG. 12, the personal bot is configured to communicate with a predictor module 625 that includes an artificial intelligence or machine learning algorithm. As will be appreciated, the machine learning algorithm may be applied to a dataset of customer information and, therefrom, learn knowledge in the form of data patterns correlating one or more input factors to one or more outcomes, with those correlations forming the basis of the interaction predictors. For example, the machine learning algorithm in the predictor module 625 may extract such patterns based on monitored customer actions and associated outcomes. Once such knowledge is acquired, it may be put to use in the form of the present interaction predictors to predict outcomes when new inputs are encounters, such as those presented in an incoming interaction.

Any one or more existing machine learning algorithms may be invoked to do such learning, including without limitation, linear regression, logistic regression, neural network, deep learning, Bayesian network, tree ensembles, and the like. For example, linear regression assumes that there is a linear relationship between input and output variables, whereas, in the case of neural networks, the learning is done via a backward error propagation where the error is propagated from an output layer back to an input layer to adjust corresponding weights of inputs to the input layer.

For the sake of providing examples as to how such interaction predictors may be derived for a given customer, reference will now be made to an exemplary customer "Adam". To begin the process, the machine learning algorithm of the predictor module 625 may be configured to monitor a given dataset. This dataset may be obtained from any of the several sources of data described herein. For example, one or more data sources may be derived from data maintained within Adam's own customer profile (i.e., customer profile 330). The machine learning algorithm may have access to and monitor several of the types of data stored within Adam's customer profile, e.g., the personal data, interaction data, feedback data, and/or choice data.

For example, to gain insights on what works best for Adam during interactions, the machine leaning algorithm could monitor (i.e., use as a training dataset) Adam's interaction data and identify particular factors that consistently correlate with more successful outcomes. As a more specific example, the machine learning algorithm of the predictor module 625 may monitor the choice data within Adam's customer profile—i.e., the agents that Adam selects when given a choice—to identify patterns relating to the type of agents Adam prefers. Once identified, such a pattern could become the basis for an interaction predictor, which the predictor module 625 would then cause to be stored within the Adam's customer profile. When circumstances later arise that are relevant to the interaction predictor, the interaction predictor could be recalled from Adam's customer profile and used to facilitate choices as to how best to provide services to Adam. Specifically, for example, the interaction predictor could be used to predict which agent out of those available would be most preferable to Adam, as will be discussed more below in relation to FIG. 14.

In accordance with other aspects of the present invention, the machine learning algorithm of the predictor module 625 may also monitor and derive datasets from one or more customer databases 610, which, as used herein, refer to a collection of customer data gathered from "other customers". For example, the customer databases 610 may include data gathered from a large customer population. Such customer databases 610 may store any of the customer data types discussed herein and include a multitude of samples collected from a customer population. As an example, one of the customer databases 610 may include data aggregated from the personalized customer profiles of the present invention, where those customer profiles 330 correspond to customers within a customer population (with those customer profiles 330 being represented by those depicted within the other customer profiles 620).

In accordance with an exemplary embodiment, the machine learning algorithm may monitor or derive training datasets from the customer databases 610, such as a dataset that includes interaction data taken from previous interactions between customers within the customer population and different contact centers. The machine learning algorithm may then analyze the data within this database to identify patterns in which particular factors consistently correlate with certain outcomes. As before, such patterns or correlations may then become the basis for identifying interaction predictors. Thus, based on similarities found to exist between Adam and the other customers within the customer population, the predictor module 625 may cause one or more interaction predictors to be applied to or used in connection with Adam.

When identified from a large database of customer information, interaction predictors may be found to be predictively relevant to the customer population as a whole or to a group or subpopulation defined within the customer population. Thus, in accordance with the present invention, the applicability of such interaction predictors to any particular customer, such as Adam, may be predicated on a degree of similarity found to exist between Adam and a given subpopulation. Thus, the predictor module 625 may attribute such an interaction predictor to Adam only after determining that a sufficient degree of similarity exists between Adam and the customers within the corresponding subpopulation or, put another way, whether Adam is determined to be member of that subpopulation. Upon determining that a sufficient level of similarity exists between Adam and that subpopulation, the predictor module 625 may add the particular interaction predictor to Adam's customer profile, where it will remain until further machine learning makes necessitates its modification or removal.

As a general example, a customer database 610 that stores interaction data may include data collected from interactions between a customer population and many different contact centers. A predictive correlation or other data driven insight—generally referred to herein as an interaction predictor—is then identified via the machine learning algorithm of the predictor module 625 by monitoring and analyzing the customer database 610. Through this analysis, it may further be determined that the identified interaction predictor is only applicable to a particular subpopulation within the customer population. In accordance with the present invention, the interaction predictor then is selectively applied to a particular customer if it is determined that the customer is a member of the given subpopulation or, at least, sufficiently similar to another customer within the given subpopulation.

Whether gleamed from the customer's own past behavior, based on the past behavior of other similar customers, or some combination thereof, once determined, the interaction predictors may be applied to a particular customer (for example, saved within his customer profile 330) and then used to make certain insights or predictions about that customer in order to enhance aspects of customer service. As will be appreciated, the interaction predictors stored within a customer profile 330 may be dynamically updated as needed so that those currently stored reflect changes, updates, or additions to the underlying datasets. For example, in an interaction that just concluded, customer Adam made an agent selection that significantly modifies the choice data stored in his customer profile. According to exemplary embodiments, the machine learning algorithm may continue to monitor Adam's customer profile (and choice data included therein) and modify the interaction predictors in Adam's customer profile as needed given the modification to the underlying dataset (i.e., the dataset as modified by his recent interaction).

Changes to data within the customer databases 610 may also modify how interaction predictors are applied to Adam. For example, the addition of new interaction data within a customer database may modify interaction predictors that are identified therein. To the extent the modification impacts any of the interaction predictors found applicable to Adam, Adam's customer profile would be updated to reflect that. As another example, if Adam inputs new personal information, such as a change in professional status or where he lives, existing similarities between Adam and certain groups within the customer population may be altered. As those similarities change, the interaction predictors that are attributed to Adam or used in interactions involving Adam will be updated to reflect the changed similarities.

With the data and the interaction predictors stored in a given customer profile 330, aspects of the present invention may be used to facilitate the personalized delivery of customer services related to a present or incoming interaction. For example, contextual information or factors related to the incoming interaction may be identified and, based on those identified factors, predictions can be made about the customer by determining which of the stored interaction predictors are applicable. Alternatively, it should also be understood that such predictions about the customer may be made contemporaneously with the incoming interaction via the machine learning algorithm (or models developed therefrom) finding similarities in the contextual information around the incoming interaction and past interactions experienced by the customer and/or other similar customers within the customer databases 610. In either case, one or more interaction predictors applicable to the incoming interaction may be used to facilitate the delivery of services to the customer during the incoming interaction.

In accordance with exemplary embodiments, the relevant interaction predictors along with any other relevant information from the customer profile 330 may be packaged within an interaction profile and then delivered to a contact center for use thereby. As will be seen, the contact center may then use this package data or interaction profile to facilitate decisions as to the nature of services that should be provided to the customer during the incoming interaction. Embodiments will now be discussed covering exemplary implementations as to how this information may be used. For the sake of these example, reference again may be made to customer Adam.

In accordance with a first example, systems and methods of the present invention may be used to predict a customer's emotional state in the incoming interaction. For example, based on the series of interactions that Adam has experienced, interaction predictors may be developed that relates such interactions to a pattern of emotional states, which may be gleaned from analyzing interaction transcripts for language indicative of particular emotional states. A customer's emotional state, for example, may vary in accordance with a predictable pattern that relates to factors such as: intent of the interaction; recent unsuccessful efforts to resolve the same issue; unfavorable history with a certain enterprise; etc. By learning these patterns using the systems and methods disclosed above, it now becomes possible to make predictions as to the emotional state that the customer is likely to exhibit in the next incoming interaction.

For example, Adam calls Best Buy to enquire about an online order that he placed last week for an iPhone. Best Buy, as a retailer, answer Adam's question, but tells him that the order was placed with Apple. Best Buy gives Adam with an order identification number and redirects him to a customer service provider associated with Apple. Adam, now connected with Apple, is told by an agent that his order has been fulfilled and sent to FedEx for shipment. The Apple agent further provides a reference shipping number for tracking the order. With this new information, Adam goes to the FedEx webpage, however he finds that the tracking information fails to provide any information about his order. Adam now calls FedEx to inquire about it. After being on hold for several minutes, a FedEx agent finally informs Adam that FedEx has not received the requested order from Apple and that the tracking number he has been provided is incorrect. Adam now instigates another interaction—referred to as an incoming interaction for the sake of describing functionality—with Apple. Each of these interactions are done through a customer device of Adam that has a personal bot 405 in accordance with the present invention.

The personal bot 405 of the present invention may be tracking the interactions Adam has instigated with the customer service providers associated with Best Buy, Apple, and FedEx. Using systems and methods described herein, Adam's customer profile may be updated with each of these interactions as they happen and, through natural language processing of transcripts and other available information relating to the interactions, the personal bot 405 may become aware that: a) the situation involves several interactions relating to common subject matter (i.e., the same problem); b) that Adam has already initiated several recent interactions with different enterprises in an effort to resolve that problem; and c) Adam has so far been unsuccessful and the issue remains unresolved.

To continue the example, the predictor module 625 may have gleamed several interaction predictors that are relevant to this situation. As described above, these may have been determined via analyzing (e.g., by using a machine learning algorithm) data associated with Adam's own past behavior and/or the behavior of a population or group of other customers that are similar to Adam in ways found to be predictively relevant. The applicable interaction predictors, for example, may predict that the situation is one that likely would induce a particular emotional state for the customer, such as negative emotions like anger or frustration. Thus, by using information stored within the Adam's customer profile and recognizing the number and subject matter of Adam's recent interactions, a prediction can be made as to Adam's emotional state coming into the incoming interaction that Adam just initiated with Apple. Specifically, it can be predicted that Adam will likely be angry or frustrated. This type of insight then can be used in several ways to tailor the service Adam receives once he connects with Apple. For example, as will be discussed more below, this prediction may be used to select an agent that is more adept at handling interactions with frustrated or angry customers.

Related to the above example, systems and methods of the present invention can also be used to facilitate a proactive engagement by a customer service provider or contact center. That is, given the above-described pattern of recent interactions logged within Adam's customer profile, the personal bot 405 of the present invention can predict not only that Adam is angry or frustrated, but also that the issue remains unresolved and that Adam will soon be contacting Apple again as he tries to find a resolution. With these types of predictions, the personal bot 405 can also include functionality whereby a particular enterprise (Apple in this case) is notified that Adam's issue remains unresolved and Adam will likely be trying to contact Apple again. This type of information could then prompt Apple to proactively initiate the next interaction before Adam does. As will be appreciated, this type of proactive step by an enterprise would go long way toward repairing a customer's negative feelings, while also facilitating a resolution to an ongoing issue. Which is to say, if it can be predicted that a customer's issue remains unresolved and the customer is likely to instigate another interaction soon, it may be very favorable from a customer relationship perspective for the enterprise to be the party that instigates that next interaction. With personal bot's extensive customer data covering multiple enterprises and multiple intents, these predictions on upcoming interactions can be made and the given enterprises conveniently notified.

Taking further advantage of the systems and methods disclosed herein, the personal bot 405 may be able to compute a severity rating for an incoming interaction. As used herein, a severity rating for an interaction is a prediction as to how serious or important an interaction is to a customer. Conventional contact centers typically predict a severity or importance for an incoming interaction based upon the intent of the interaction. For example, for any incoming interaction with an intent determined to be "stolen credit card", a severity rating of "high severity" (i.e., high level of importance) is allocated. As another example, for an incoming interaction with an intent determined to be "forgotten password", a severity rating of "moderate severity" (i.e., moderate level of importance) is allocated.

Similar to the process described above in relation to predicting emotional state, present systems and methods may learn to personalize severity ratings for particular customers based on the pattern of interactions stored in the customer profile 330 and interaction data for similar customers. As before, learned interaction predictors may apply specifically to a particular customer, such as Adam. Along with intent, such interaction predictors may take into account other factors, such as, for example, time of the day, type of enterprise, recent interactions, and the emotional state of the customer. With this information, the personal bot 405 can tailor severity ratings for incoming interactions for particular customers. As will be appreciated, different customers may view the same type of interaction with varying levels of importance. With the present invention, these varying levels may be determined, and service levels varied accordingly.

The systems and methods of the present invention also may be used in similar ways to make other useful predictions related to incoming interactions, which then may enable improved customer service. As discussed more below, a first of these include using the customer profile 330 of the present invention to personalize routing decisions for customers.

As another example, based on the customer profile 330 (and interaction predictors stored therewithin) as well as the intent and other contextual factors related to the incoming interaction, the personal bot 405 can make predictions regarding the likelihood of success of upselling and/or cross-selling opportunities available to the given enterprise or contact center. As an example, certain customers may be determined to be more approachable than others with upselling or cross-selling offers. As another example, a customer's emotional state could be a factor that is found to correlate with the success of upselling or cross-selling opportunities. Specifically, an angry or frustrated state may negatively impact the likely success of attempts to upsell or cross-sell a customer. Indeed, it may be found that, in certain situations, the attempt to upsell or cross-sell such customer only serves to make the customer angrier or more frustrated. It will be appreciated that contact centers could apply such insights toward making more productive routing decisions. For example, those incoming interactions that rate well in regard to upselling or cross-selling opportunities could be steered to agents that perform better in this area.

As another example, the present systems and methods may be used to predict a preferred communication channel for an incoming interaction, with the preferred communication channel being the channel offering the best chance for successful resolution given the customer. As before, based on the customer profile 330 (and interaction predictors stored therewithin) as well as the intent and other contextual factors related to the incoming interaction, the personal bot 405 can predict a preferred communication channel for initiating an interaction with the contact center. As another example, if a customer has reached out to his bank about a forgotten password, the personal bot 405 could redirect the interaction to a self-service portal which is configured to instantly resolve this kind of interaction. In this way, the customer can avoid the wait to be connected with agent that is unnecessary.

With reference now to FIG. 13, a method 650 is shown for personalizing a delivery of services to a customer (which, for clarity, will be referred to as a "first customer") via a personalized customer profile. The first customer may have a communication device, such as a smart phone, through which interactions with several contact centers are conducted.

As an initial step 655, the method 650 includes the step of providing a customer profile for storing data related to the first customer.

At a next step 660, the method 650 includes the step of updating the customer profile via performing a data collection process to collect interaction data related to the interactions between the first customer and contact centers. The data collection process may be performed repetitively so to update the customer profile after each successive one of the interactions. Described in relation to an exemplary first interaction between the first customer and a first contact centers, the data collection process may include the steps of: monitoring activity on a communication device of the first customer and, therefrom, detecting the first interaction with the first contact center; identifying data relating to the first interaction for collecting as the interaction data; and updating the customer profile to include the interaction data identified from the first interaction. The contact centers involved in the interactions from which the interaction data is collected may include multiple different contact centers.

At a next step 665, the method 650 includes the step of identifying a dataset for deriving an interaction predictor. The dataset may be based, at least in part, from the data stored within the customer profile. More specifically, the dataset may include the interaction data stored in the customer profile.

At a next step 670, the method 650 includes the step of deriving an interaction predictor by applying a machine learning algorithm to the dataset to identify patterns therein correlating one or more input factors to one or more outcomes relevant to the first customer given a particular type of interaction, which, for the sake of clarity, will be referenced as a "first interaction type". As explained more above, the interaction predictor may be based on knowledge acquired by using a machine learning algorithm to "learn" a set of data or dataset. The knowledge may relate to a behavioral factor attributable to the first customer when encountering the first interaction type. According to exemplary embodiments, the behavioral factor of the interaction predictor is defined as an emotional state, behavioral tendency, or preference. Though other types of machine learning algorithms may also be used, exemplary embodiment include a neural network.

At a next step 675, the method 650 includes the step of augmenting the customer profile of the first customer by storing therein the interaction predictor. The storage of the interaction predictor may include linking the behavioral factor to the first interaction type to facilitate real time retrieval, for example, when for use in relation to a subsequent or incoming interaction that is the same as the first interaction type.

At a next step 680, the method 650 includes the step of modifying, in accordance with the behavioral factor, a manner in which services are delivered to the customer in an incoming interaction. For example, an incoming interaction instigated by the first customer may be detected as being the same as the first interaction type. In response this detection, the derived interaction predictor may be retrieved from the customer profile of the first customer, and, upon being retrieved, the relevant behavioral factor can be identified. The manner in which services are delivered to the first customer in the incoming interaction may be modified pursuant to the behavior factor. More specifically, once identified, the behavior factor may be transmitted to the contact center involved in the incoming interaction. The contact center may then use the insight provided by the behavior factor to modify the way it delivers services to the first customer in the incoming interaction.

The method 650 may be performed in accordance with several additional or alternative steps, which provide a range of functionality. Further, significant terminology of the process may be defined so to the basic methodology yields interaction predictors covering a range of applications. Examples of these alternatives will now be discussed.

In accordance with exemplary embodiments, the steps of the data collection process may be performed by an automated assistant software program or application, which will be referred simply as "automated assistant". The automated assistant may operate on the communication device of the first customer. In example embodiments, the automated assistant is the personal bot described above. Further, the customer profile may be stored in cloud-hosted databases, which are updated by the automated assistant in accordance with the data collection process. As an example, the automated assistant may transmit the collected interaction data over a network to the cloud-hosted databases.

In exemplary embodiments, the behavioral factor of the interaction predictor is an emotional state attributable to the first customer given the first interaction type. The emotional state may be represented by at least one descriptor representative of either a negative emotional state or a positive emotional state. For example, the emotional state may be simple indicate a satisfied emotional state or an unsatisfied one. Other examples include positive emotional states, such as happy, calm, or thankful, and negative emotional states, such as angry, frustrated, confused, sad, or impatient. The interaction data included in the dataset may include data from the interactions evidencing the negative and positive emotional states. For example, the interaction data may include feedback data related to an evaluation, survey, or satisfaction score provided by the first customer after a termination of the interaction. The interaction data may include conclusory statement data related to statements made by the first customer as the interaction is concluding. As described earlier, this type of data may constitute an inferred type of feedback data. The meaning of such statements may be extracted by natural language processing.

When deriving the interaction predictors, the way in which the behavioral factor and first interaction type are defined may be varied in accordance with a desired functionality. For example, continuing with the behavioral factor being defined as an emotional state, the first interaction type may be defined as interactions having a particular intent. In such an embodiment, the resulting interaction predictor becomes a customer-specific prediction relating to an emotional state of the first customer for an incoming interaction having the particular intent. As another example, the first interaction type may be defined as interactions involving a particular contact center. In this type of embodiment, the resulting interaction predictor becomes a customer-specific prediction relating to an emotional state of the first customer for an incoming interaction involving the particular contact center. Related to this embodiment, the process for generating the interaction predictors may be repeated after successive iterations of the data collection process. This repetition may be done until the customer profile includes the interaction predictors predicting the emotional state of the first customer for interactions involving each of the contact centers that the first customer regular interacts with.

In accordance with exemplary embodiments, the characteristics attributed to the first customer via the interaction predictors may be accessed and modified by the first customer. For example, the automated assistant may generate user interfaces on a display of the communication device of the first customer that shows the emotional state data for one or more of the contact centers. The display may further prompt the first customer for input modifying the emotional state in any of the interaction predictors stored within the customer profile. To continue the example, the automated assistant may receive input from the first customer modifying the emotional state of one of the interaction predictors. The automated assistant may then update the emotional state of the interaction predictor in accordance with the input received from the first customer.

In another example, the emotional state of the interaction predictor may comprise a severity rating, which as explained above, rates a level of importance the first customer places on the first interaction type. With such embodiments, the interaction data included in the dataset may include data from each interaction evidencing the level of importance the first customer placed on it. The level of importance, for example, may be based, at least in part, on an analysis of an interaction transcript in which usage of words indicative of a high level of emotionality and/or a low level of emotionality is evaluated. In this case, if the first interaction type is defined by a particular intent, the resulting interaction predictor becomes a customer-specific prediction relating to a severity rating the first customer places on an incoming interaction having the particular intent.

Alternatively, the behavioral factor of the interaction predictor may be defined as a behavioral tendency attributable to the first customer given the first interaction type. For example, the behavioral tendency may include an upselling/cross-selling opportunity rating, which rates a willingness of the first customer to consider an upselling or cross-selling offer given the first interaction type. In this embodiment, the interaction data included in the dataset may include data from interactions describing unsuccessful upselling or cross-selling offers, successful upsell or cross-selling offers, and/or service or products purchased by the first customer in relation to upselling or cross-selling offers. As will be appreciated, in this case, if the first interaction type is defined by a particular intent, the resulting interaction predictor becomes a customer-specific prediction relating to an upselling/cross-selling opportunity rating for the first customer in an incoming interaction having the particular intent.

As another example, the behavioral factor of the interaction predictor may be defined as a preference, e.g., an agent preference, attributable to the first customer given the first interaction type. As described more below, the agent preference may include a preferred agent characteristic for the first customer given the first interaction type. With such embodiments, the interaction data included in the dataset may include choice data, the choice data including preferred agent characteristics derived from selections the first customer makes in the interactions when allowed to select an agent from among a plurality of offered agents. As will be appreciated, in this case, if the first interaction type is defined by a particular intent, the resulting interaction predictor becomes a customer-specific prediction relating to a preferred agent characteristic for the first customer in an incoming interaction having the particular intent.

In alternative embodiments, the method may include providing one or more customer databases storing data relating to other customers, such as interaction data relating to interactions occurring between such other customers and contact centers. In such embodiments, the derivation of the interaction predictor applicable to the first customer may be completed in accordance with a different process. For example, the interaction predictors may be generated by a process that includes the steps of: identifying a dataset that includes the interaction data stored within the one or more customer databases; deriving the knowledge of the interaction predictor by applying a machine learning algorithm to the dataset to identify patterns therein correlating one or more input factors to one or more outcomes relevant to a type of customer given the first interaction type; and attributing the interaction predictor to the first customer based shared similarities between the first customer and the type of customer. As explained in more detail above, the "type of customer" is representative of a subgroup of the other customers, with the members of the subgroup having one or more common characteristics found to be predictively relevant by the machine learning algorithm in regard to the generated interaction predictor. Further, the step of attributing the interaction predictor to the first customer may include the steps of: after the customer profile is updated by a completed iteration of the data collection process, identifying data within the customer profile relevant to the one or more common characteristics; and confirming that the one or more common characteristics are possessed by the customer. For example, the one or more common characteristics may relate to one or more respective characteristics stored within the biographical personal data of the customer profile. Further, in the same way as described above, the manner in which the behavioral factor and first interaction type are defined may be varied to produce similar alternative embodiments.

Personalized Customer Routing

Figure 14:
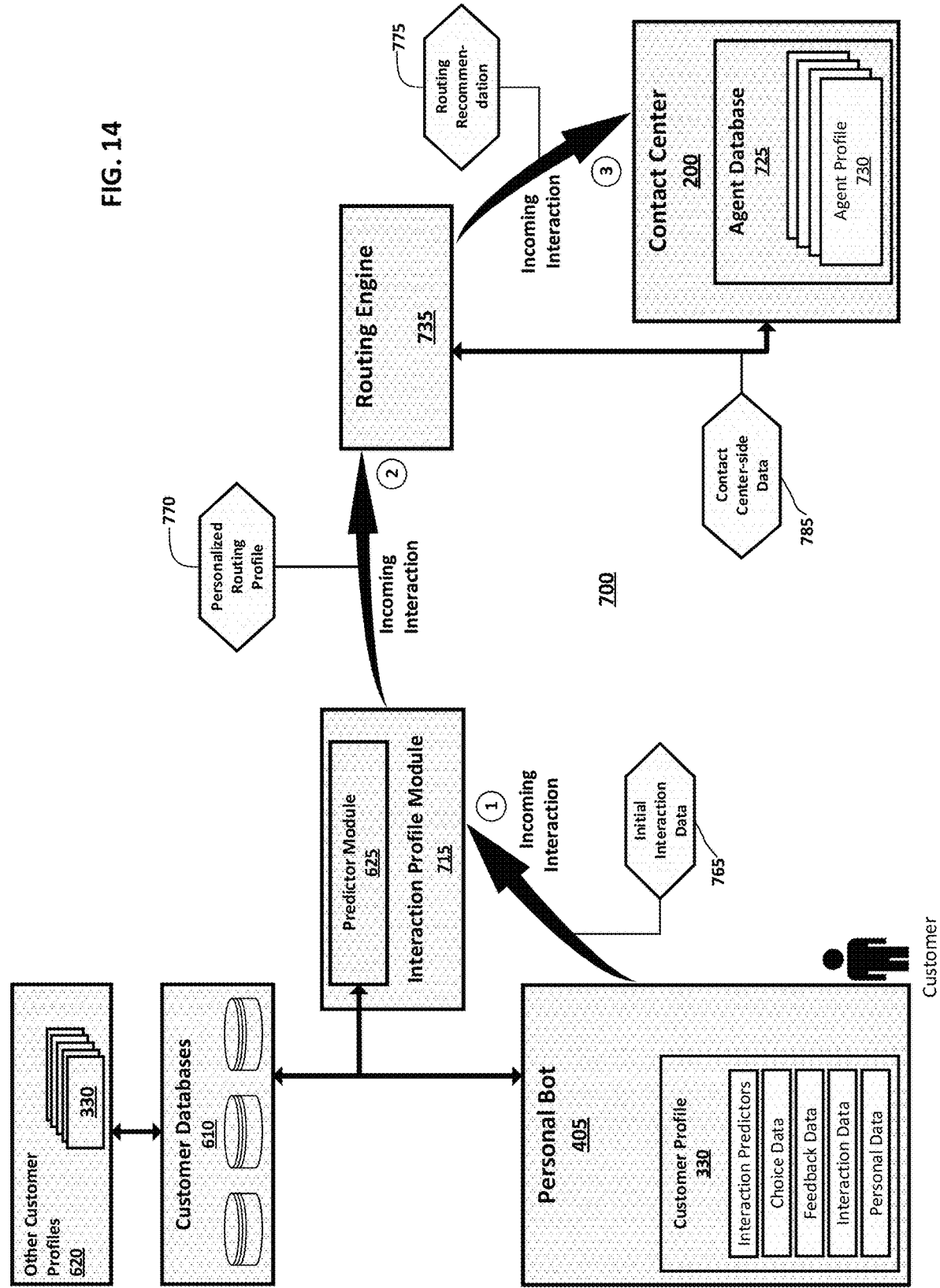
FIG. 14 is a schematic representation of an automated routing system in accordance with the present invention.
Figure 15:
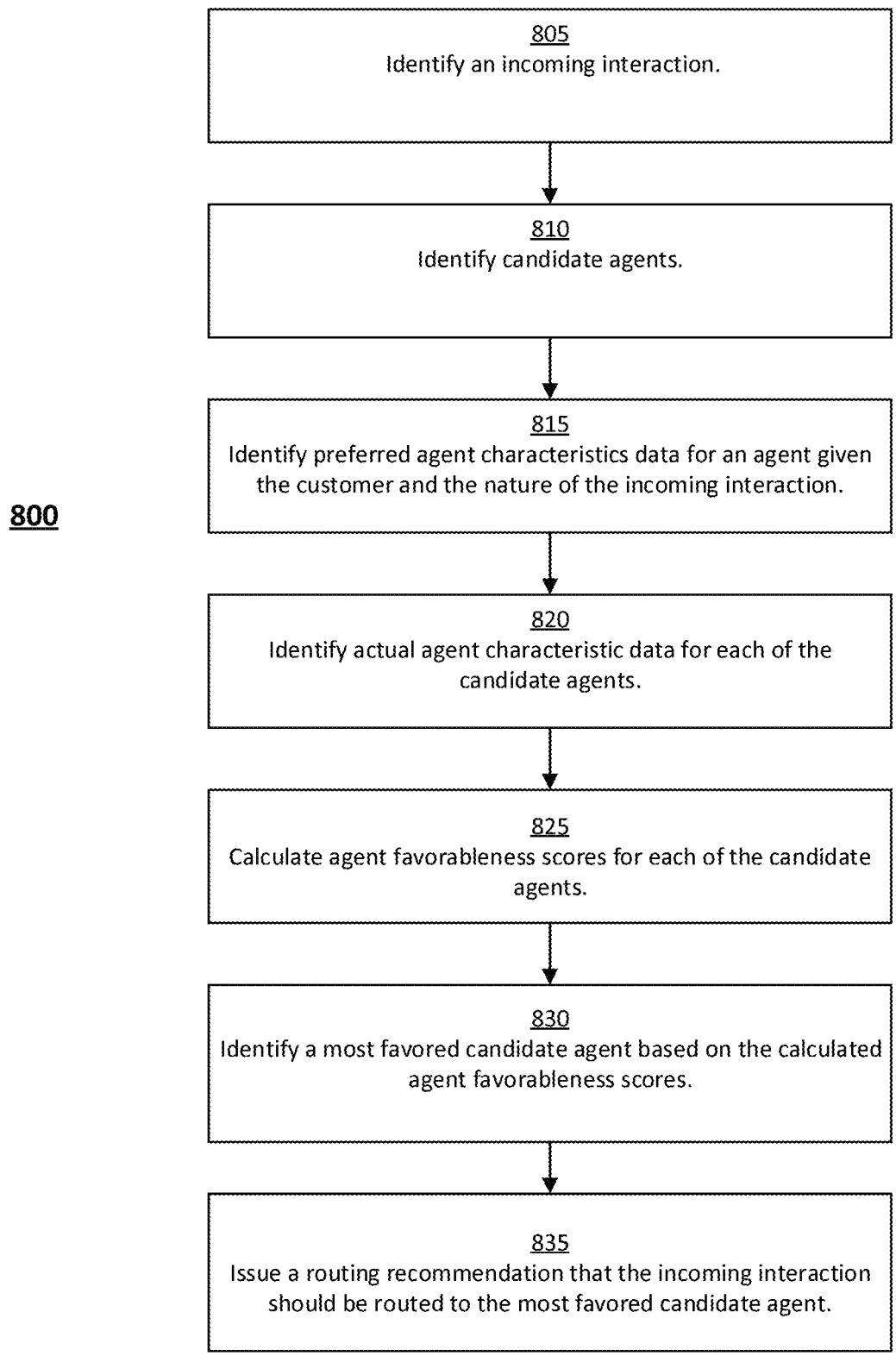
FIG. 15 is a routing process in accordance with the present invention.
Figure 16:
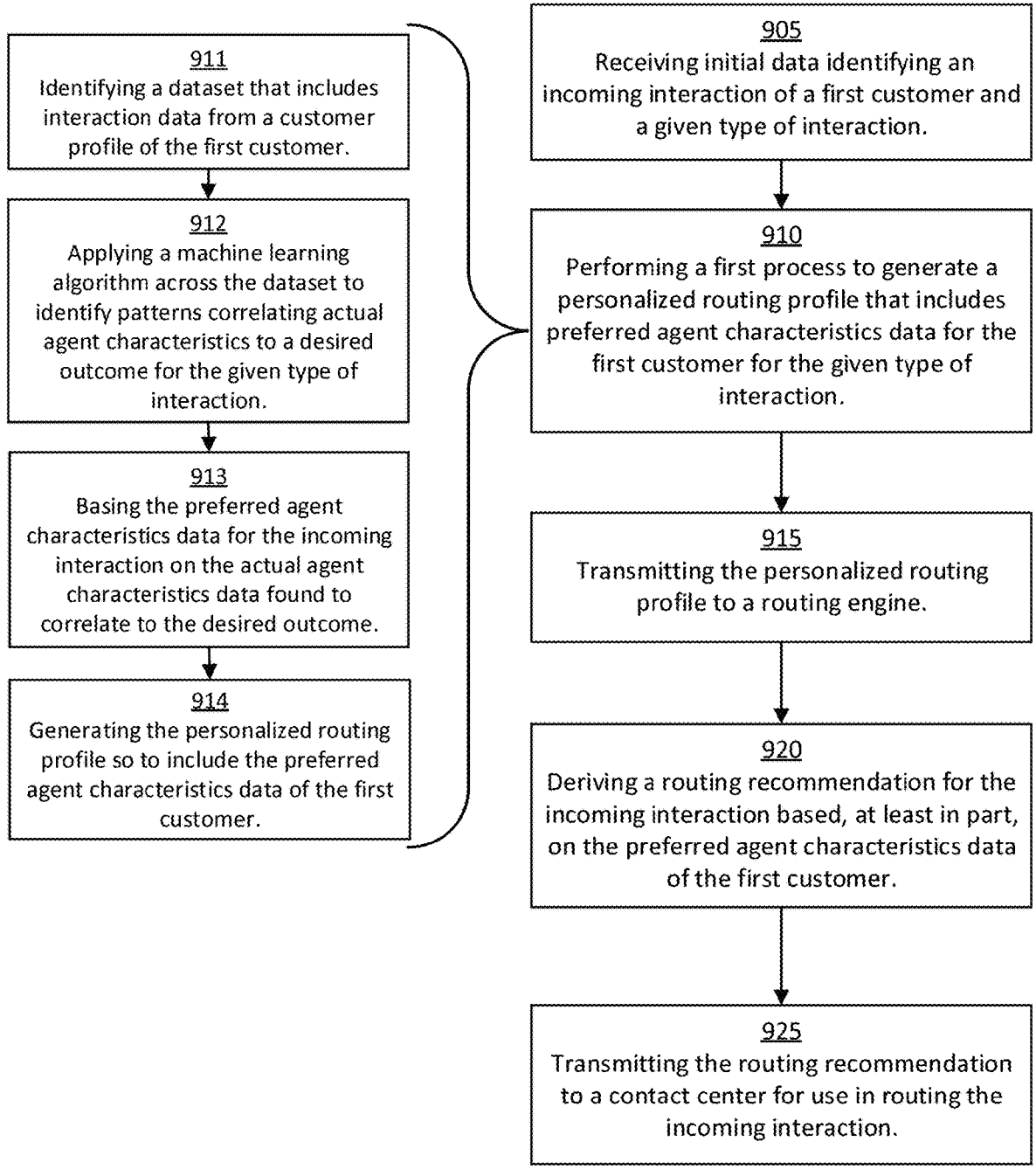
FIG. 16 is a routing process in accordance with the present invention.

With specific reference to FIGS. 14-16, attention will now focus on aspects of the present invention aimed at improving automated systems for routing incoming interactions at a customer service provider. Specifically, systems will be presented that further personalize routing decisions by leveraging aspects of the customer profile 330 disclosed above. In this way, customer preferences can be better understood and then used to facilitate agent routing selections.

By way of background, contact centers have long used automated systems to desirably route incoming interactions to particular agents. Early routing systems (or "routers") were primarily intent based. Such systems would simply match an incoming interaction to an available agent based on the intent of the query, with the intent being matched to a static description of an agent's skillset. Later, predictive routers were developed that used more sophisticated routing rules and models. In these systems, agents were rated in multiple performance categories, and those ratings were more regularly updated with results from recently handled interactions. The rating categories, for example, might include performance data such as first call resolution rate, average handle time, customer satisfaction rate, etc. An agent would be selected not only on the nature of the query and his skillset, but also on performance. While this represented an improvement in terms of routing calls to the best available agents, conventional routers still relied too often on stale data and largely ignore customer characteristics.

Customer profiles eventually were developed so that customer data was used in the routing process, but the data was limited, overly static, and ineffectively implemented. Advances in data collection soon increased the amount and variety of data being collected about customers and interactions. Such data could have proved valuable in finding insights that might prove useful in routing decisions. However, this new abundance of data has never been seriously applied in this way, as conventional routing systems remain focused on making routing decisions based on producing favorable business outcomes. In addition, conventional routing systems still do not sufficiently aggregate available data into routing models or use newly acquired data to regularly update customer profiles. When there is a lag between gathering and using customer data, customer models can no longer represent present conditions and prediction capabilities suffer. Conventional routers generally fail to take into account many factors associated with the customers that, otherwise, could be used to improve the routing and, thereby, the customer experience. For example, factors associated with a customer's emotional makeup and preferences as to agent personality have been largely ignored. As will be seen, the issues can be addressed by leveraging customer-side personalization to improve interaction routing.

With specific reference to FIG. 14, a system 700 is shown for using customer data to facilitate personalized routing decisions. As will be appreciated, the system 700 is similar to the previously discussed system 600 but has been further developed for use with predictive routers. The system 700 includes several previously discussed elements, including the personal bot 405, the customer databases 610, the other customer profiles 620, the predictor module 625, and the contact center system 200, which have been already described in detail. Thus, the present discussion will focus on describing how those elements may particularly function in relation to a routing implementation as well as introducing several new system components, which, as shown, include an interaction profile module 715, agent database 725, agent profiles 730, and a routing engine 735.

In accordance with exemplary embodiments, data driven analytics, such as machine learning, may be applied to particular datasets—for example, those described above in relation to the personalized customer profile 330 and the customer databases 610—in order to improve automated routing of incoming customer interactions. It should be understood that, unless otherwise specified, the routing systems of the present invention may be implemented with the same types of customer data presented above in relation to the customer profile 330, for example, personal data, interaction data, feedback data, and/or choice data. As will be seen, such aggregated and rich data sources may enable more accurate and reliable routing models and produce decisions that are personalized per individual customers.

As described in detail above, such data may be collected through the implementation of a personal bot 405 running on a customer device. According to exemplary embodiments, the personal bot 405 may gather information as the customer interacts with different contact centers, and newly acquired data may be used to dynamically update customer profiles 330 and customer databases 610 in real time.

The predictive routers of the present invention also may use the above-described interaction predictors to further personalize routing decisions. That is, the automated routing systems of the present invention may be enabled by a customer profile 330 having one or more interaction predictors. When utilized in the context of the interaction routing, interaction predictors may represent data driven insights about how contextual factors related to an incoming interaction affect a given customer's preferences in regard to selecting an agent. According to certain embodiments, for example, the interaction predictors may provide a score or rating that indicates how much each contextual factor of the incoming interaction affects a customer's agent preferences. As described more fully above, interaction predictors may be identified via the predictor module 625 monitoring a dataset associated with a customer profile 330 of a particular customer and customer databases 610 (which, at least in part, may include date derived from other customer profiles 620) for predictive correlations or data patterns. When gleamed from one of the customer databases 610, interaction predictors may be selectively applied to the particular customer based on similarities between that customer and the other customers represented in the customer database, where those similarities are shown to be predictively relevant.

Further, interaction predictors may be tailored to correspond to specific types of interactions with particular contextual factors and then selectively used during future interactions. For example, an interaction predictor may be identified from available data and then stored within a customer profile 330. The interaction predictor then may be recalled from the customer profile 330 and used in relation to an incoming interaction when it is determined to be applicable to the incoming interaction. Alternatively, interaction predictors also may be identified contemporaneously with an incoming interaction via the machine learning algorithm (or models developed therefrom) finding similarities in the contextual information around the incoming interaction and other past interactions experienced by the customer and/or other similar customers.

Accordingly, when used in relation to automated routing systems, an interaction predictor may relate to learned insights or knowledge about the customer that can be put to use as predictions about agent preferences, i.e., which agent the customer would rather handle an incoming interaction. To better illustrate how the present invention may be implemented in a predictive routing context, reference will now be made to both the system 700 of FIG. 14 as well as a method 800 of FIG. 15, which illustrates an exemplary routing process 800.

As indicated in the example shown in FIG. 14, the system 700 may be arranged such that the incoming interaction passes through three stages: the personal bot 405 initiates an incoming interaction and/or determines initial interaction data 765, which is transmitted (1) to the interaction profile module 715; the interaction profile module 715 then generates a personalized routing profile 770, which is transmitted (2) to a routing engine 735; and (3) the routing engine 775 generates a routing recommendation 775, which is transmitted (3) to a contact center system 200. Further aspects associated with these components are provided below.

The initial interaction data 765 may include data disclosing at least an intent of the incoming interaction and the contact center system 200 for which the interaction is intended. Using this information, the incoming interaction may be classified as being a particular type of interaction. For example, a type of interaction may be defined by a particular type of intent. This information may be used by the interaction profile module 715 to begin building the personalized interaction profile.

As used therein, the personalized routing profile is a collection of data specifically tailored to a particular interaction for a particular customer. The personalized routing profile, thus, may include specific data pertaining to the interaction and the customer that is used to facilitate the routing of interactions in accordance customer preferences. According to exemplary embodiments, the interaction profile module 715 builds the personalized routing profile according to preferred agent characteristics data for the first customer for the given type of interaction. The interaction profile module 715 may include (or at least may communicate with) the predictor module 625, which, as described above, has access to data stored in the customer profile 330 and/or the customer databases 610. The interaction profile module 715 may generate the personalized routing profiles consistent with the several embodiments discussed below.

The routing engine 735 is a logic engine that makes routing decisions based on stored algorithms, models, rules, equations or other logic. As further indicated, the routing engine 735 may be a hub that: a) receives data from the interaction profile module 715 that relates to the incoming interaction, which may be referred to generally as customer-side data or, specifically, as a personalized routing profile 770; b) receives data from the contact center system 200 that relates to the incoming interaction, which may be referred to as contact center-side data 785; and c) applies logic to the received data to calculate a routing recommendation 775. The routing engine 735 may then transmit the routing recommendation to the contact center system 200 for use in routing the incoming interaction to a particular agent.

As depicted in FIG. 14, the routing engine 735 is positioned in between the customer-side systems and the contact center system 200. This arrangement is consistent with exemplary embodiments in which the routing engine 735 is part of a customer-contact center intermediary platform (or simply "intermediary platform") and maintained as a separate entity from both the customer-side systems, like the personal bot 405 and the interaction profile module 715, and the contact center system 200. The intermediary platform 775 may represent a neutral arbitrator for arriving at a routing recommendation that balances customer-side preferences with contact center-side business objectives. Alternatively, the routing engine 735 can be integrated into the contact center system 200 or the customer-side systems. In each of these cases, it should be appreciated that, in determining the routing recommendation, the routing engine 735 takes into the consideration customer preferences.

With specific reference now to FIG. 15, a routing method 800 is provided for selecting an agent to handle an incoming interaction based on customer preferences. As will be appreciated, the routing method 800 represents the processes that primarily occur within a routing engine, such as routing engine 735, and not the processes that occur within the interaction prediction module 715, which will be discussed below with reference to FIG. 16. The routing process 800 includes some specific terminology, which will now be defined in accordance with intended usage:

"first customer" is a reference customer in an example incoming interaction;

"incoming interaction" is a present communication (i.e., just instigated) between the first customer and a contact center;

"candidate agents" are two or more agents of the contact center that are available and/or otherwise qualified to handle the incoming interaction;

"agent criteria" are a set of agent criterion, wherein each agent criterion defines a basis by which a characteristic of an agent can be rated or evaluated;

"preferred agent characteristics data" is data describing the preferences of the first customer in relation to the agent criteria;

"actual agent characteristics data" is data describing how a particular one of the candidate agents rates in relation to the agent criteria;

"agent favorableness score" is a score reflecting the favorableness of a particular one of the candidate agents based upon how closely the actual agent characteristics data, which rates the actual characteristics of the particular agent, matches the preferred agent characteristics data of the first customer;

"evaluation of candidate agents" is an evaluation wherein an agent favorableness score is calculated for each of the available agents and, from the relative values of the calculated agent favorableness scores, a most favored candidate agent is identified;

"favored agent routing recommendation" is a routing recommendation that the incoming interaction of the first customer be routed to the most favored candidate agent.

In an example of operation, the routing process 800 may begin at step 805 where an incoming interaction is identified. The incoming interaction represents a communication between a customer and the contact center system 200 that has been initiated, but not connected. For example, the incoming interaction may be a communication just instigated by a customer (referenced for the example as a "first customer") over any available communication channel. The incoming interaction may be identified by the interaction profile module 715 by initial interaction data 765 transmitted to it from the personal bot 405. The initial interaction data 765 may include data relating to the incoming interaction that is relevant to the building of the personalized routing profile 770. For example, the initial interaction data 765 may include data about the first customer and data about the interaction, such as the intent and other contextual factors related to the incoming interaction. Alternatively, the initial interaction data 765 may include very limited information, with additional information being retrieved by the interaction profile module 715 from connected databases, customer profiles, etc.

The routing process 800 continues at step 810 where candidate agents are identified. As used herein, candidate agents are two or more agents of the contact center that are available and/or otherwise qualified to handle the incoming interaction. In exemplary embodiments, the candidate agents may be identified by the contact center system 200 after a prompt is provided. Such prompt may be provided by the routing engine 735 upon identifying the incoming interaction (for example, upon receiving the personalized routing profile 770 from the interaction predictor module. Such prompt may include information that is necessary for the contact center system 200 to identify the candidate agents, such as, the intent of the incoming interaction.

The routing process 800 continues at step 815 where the preferred agent characteristics data for an agent is identified for the first customer. As used herein, preferred agent characteristics data is information describing the preferences of the first customer in relation to the agent criteria. As stated in the definitions above, the agent criteria are a set of agent criterion, where each criterion defines a basis by which a characteristic of an agent can be rated or evaluated. For example, an agent criterion may evaluate an aspect of an agent's personality, such as whether the agent is more playful or more serious. The preferred agent characteristics data may reflect that, for the incoming interaction, the first customer prefers a more playful agent.

In accordance with exemplary embodiments, the preferred agent characteristics data may be included within the data transmitted by the interaction profile module 715 in the personalized interaction profile. As discussed more below, the preferred agent characteristics data may be determined by the interaction profile module 715 and may include predictions as to the preferences of the first customer. With access to data relating to each of the first customer's past interactions and other activities performed via the first customer's mobile device, the customer-side systems (e.g., the personal bot 405, interaction profile module 715, and the predictor module 625) are well-positioned to make data driven inferences that provide the basis for such predictions. As will be seen, such predictions may be based on the intent of the incoming interaction and/or other contextual factors relating to the incoming interaction. For example, such predictions may be based on the applicability of one or more interaction predictors stored within the customer profile, such as those related to an emotional state of the customer or severity rating of the interaction.

The routing process 800 continues at step 820 where the actual agent characteristics data for each of the candidate agents is identified. As used herein, actual agent characteristics data is data describing how a particular candidate agent rates in relation to the agent criteria. As will be appreciated, the actual agent characteristics data for each of the agents may be stored within agent profiles 730 maintained in the agent database 725 of the contact center system 200. The actual agent characteristics data may be part of the contact center-side data 785 that is transmitted by the contact center system 200 to the routing engine 735.

The routing process 800 continues by evaluating the candidate agents. As described more below, the evaluation of the candidate agents may include two steps: a) calculating an agent favorableness score for each of the available agents (step 825); and b) identifying, from the relative values of the calculated scores, a most favored candidate agent (step 830).

Thus, at step 825, the routing process 800 proceeds by calculating agent favorableness scores for each of the candidate agents. An agent favorableness score is a score reflecting the favorableness of particular one of the candidate agents based upon how closely the actual agent characteristics data, which describes the actual characteristics of the particular agent, matches the preferred agent characteristics data of the first customer. As will be appreciated, this may be accomplished using a variety of different scoring systems and algorithms. In general, the candidate agents will be scored via the agent criteria, with the score for each being indicative of how closely the actual agent characteristics data satisfies the preferred agent characteristics data of the first customer. For example, the agent favorableness score may be a cumulative score that reflects how well a particular agent scores in regard to all of the agent criteria. As another example, the scoring system may be a weighted one that places greater importance to certain agent criterion over others. In such cases, the weights applied to each category may be the same for all customers. Alternatively, the way the weights are applied could be varied between customers and, thus, be used as another mechanism to express different customer preferences.

At step 830, as stated above, the routing process 800 proceeds by identifying a most favored candidate agent based on the calculated agent favorableness scores. As will be appreciated, this step may be performed by comparing the relative values of the calculated agent favorableness scores and determining which is the best and, thus, reflective of a most favored agent given the first customer's preferences.

The routing process 800 then continues at step 835 where a routing recommendation is issued. As will be appreciated, the routing recommendation may be that the incoming interaction is routed to the most favored candidate agent. As shown in FIG. 14, this step may include the routing engine 735 transmitting the routing recommendation 775 to the contact center system 200.

With continued reference to routing processes and concepts introduced above in relation to FIGS. 14 and 15, attention will turn to several routing examples, which, in accordance with the present invention, are personalized pursuant to interaction predictors, contextual factors, and other data stored within a customer profile 330. These examples will reference example customers "Jane" and "Betty". It should be appreciated that these examples have been simplified so to clearly illustrates intended functionality.

A first example involves a case where the routing decision is personalized, at least in part, pursuant to personal data maintained in the customer profiles 330. Jane is a business class passenger with Delta. Jane initiates an interaction with Delta and is connected to speak with "Agent Dave". Jane has initiated the interaction via using a mobile application on her smart phone, which includes the above-described personal bot 405. The topic of the interaction is Jane's frequent flyer miles, which Jane has noticed were wrongly updated in her account. From Jane's perspective, the conversation she has with Agent Dave goes exceedingly well. Agent Dave rates as having average proficiency in terms of being knowledgeable and efficient in handling customer issues, but is rated as being funny, playful, and easy to talk with. The conversation goes so well that Jane completely forgets about the original mistake that prompted her to make the call and, indeed, is receptive to making an additional (upsell) purchase that was suggested by Agent Dave. Specifically, after noting how well the conversation had progressed, Agent Dave points out that if Jane purchases more frequent flyer miles during an ongoing Delta promotion, she would receive a free companion ticket and be promoted to a higher level in the Delta's frequent flyer program. All the information related to this interaction is gathered by the personal bot 405 and stored with Jane's customer profile. The information may also be anonymously used in the customer databases 610.

A new interaction is later initiated by a different customer "Betty", who is also a business class passenger, but for United. Betty is calling for a similar reason as Jane related to a discrepancy with her frequent flyer miles.

Betty's customer profile has limited interaction data that is relevant to the intent of this incoming interaction. However, the predictive module has found sufficient similarities between the personal data of Betty and that the personal data of a group of other customers within the customer database, which includes Jane, that previous routing successes associated with those customers are determined as likely being instructive in how to route Betty's incoming interaction.

Thus, for example, aspects of Jane's previous interaction may be used to create an interaction predictor that is implemented within Betty's customer profile and used to facilitate a routing decision in Betty's incoming interaction. The interaction predictor, for example, may predict that Betty should be routed to an agent who is similar to Agent Dave of Delta (i.e., funny, playful, etc.). An additional interaction predictor may be applied in which the upselling opportunity for Betty's incoming interaction is predicted. For example, generally, when a customer is calling about an issue, the upselling opportunity may be deemed as poor. However, in relation to this interaction, the interaction predictor for upselling may be rate the opportunity as better than would be generally anticipated based, at least in part, on the successful upsell that occurred in Jane's previous interaction with Agent Dave. With such interaction predictors gleamed from specific customer profiles and included within a personalized routing profile, the routing engine would score some agents better than others and, thereby, arrive at a routing recommendation that is likely to improve the overall experience for Betty as well as the potential business outcome for the airline.

A second example involves a case where the routing decision is personalized, at least in part, pursuant to interaction data maintained in the customer profiles 330. As previously described, with all the past interactions between different customers and various enterprises, the personal bot 405 and/or predictor module 625 of the present invention could mine the customer databases 610 to determined predictive correlations that are instructive as to a customer's present expectations and needs. With this "learned" knowledge, a level of service could then be delivered that is anticipated to satisfy the expectations of a customer related to an incoming interaction. Also, such knowledge could provide customer service providers with the ability to reach out to customers and fill expectations or needs proactively.

For example, consider another example involving Jane and Betty. Jane has an interaction with Delta, wherein it is learned that she is travelling to Barcelona. Jane also has an interaction with a hotel in Barcelona, which is a Marriott, in which she books a room. The data from these past interactions may be monitored and recorded by the personal bot 405 and saved within Jane's customer profile. Such interaction data may be mined by the personal bot 405 and added to the general customer database 610 and/or implemented as an interaction predictor within Betty's customer profile based, as in the example above, on similarities between Betty and Jane/other similar customers within the customer database.

Now, when Betty initiates an incoming interaction, and it is determined that, like Jane, Betty is a business class traveler who is travelling to Barcelona and looking to book a hotel, several interaction predictors may be used to personalize the routing. For example, an interaction predictor may be used to recommend an agent type for Betty based on an agent that was successful in handling Jane's booking. As another example, an interaction predictor may be used to recommend an agent type who is knowledgeable in a range of hotels that includes ones similar to the Marriott that Jane booked. Further, given the knowledge acquired about Betty's intent, Marriott and/or hotels similar to Marriott may be allowed to reach out to Betty proactively, for example, to inform her about upcoming booking deals in Barcelona.

A third example involves a case where the routing decision is personalized, at least in part, pursuant to feedback data maintained in the customer profiles 330. As previously described, the personal bot 405 of the present invention may collect feedback and survey details whenever provided by customers. The personal bot can understand if a customer is satisfied with a resolution provided by an agent not only by a customer satisfaction score, but also through data driven models trained to automatically infer such feedback from the statements made by the customer at the end of the interaction. Such feedback provides valuable data on whether the agent works well with this type of customer profile 330, which can be mined so that better routing decision can be achieved for further interaction involving similar customers, similar contexts, and/or similar agents.

For example, consider another example involving Jane and Betty. Jane has spoken with Delta about a family emergency requiring her to cancel a flight that she had booked already. To do this, Jane is again connected with a funny and playful agent, like Agent Dave, who takes too long to get to the point and is too playful given Jane's present agitated and worried mood. For this particular interaction given the contextual factors, the choice of agents has led to a frustrating experience for Jane. Jane later provides feedback as to this experience, which is added to Jane's customer profile. As before, the feedback may be mined by the personal bot 405 and added to general customer database and/or implemented as an interaction predictor within Betty's customer profile based, as in the examples above, on similarities between Betty and Jane as well as other similar customers.

Later a new interaction is instigated by Betty, who is calling for a similar reason as Jane involving a change in travel plans due to a family emergency. In a manner similar to the other examples, the predictive correlations gleamed from Jane and other customers may be applied to Betty based on similarities found to predictive between Betty and Jane/other customers. Thus, at least in part, useful feedback provided by Jane may be used in determining a routing recommendation for Betty. One or more interaction predictors may be implemented in the routing of Betty's incoming interaction that, for example, recommend a greater likelihood of success with a routing to an agent who is more serious, understanding, and direct or "to the point".

A fourth example involves a case where the routing decision is personalized, at least in part, pursuant to "choice data" maintained in the customer profiles 330. Generally, when dealing with a contact center, customers do not have the ability to choose an agent or type of agent for their interaction. For example, customers are not allowed to review a group of agent profiles and select the one that seems most appealing. As will be appreciated, if this were allowed, the choice data reflecting the choices made by a customer would provide valuable insight as to the type of agents a customer prefers. Such insights could be applied to other customers based on similarities found predictively relevant.

In accordance with embodiments of the present invention, the personal bot 405 can provide agent summary profiles to a customer and allow the customer to select. The agent summary profiles may include certain information gleaned from the agent profiles 730 maintained at the contact center system 200, which may be transmitted to the personal bot

405 upon request. For example, an agent summary profile may include a picture of the agent and a short description of the agent's personality.

Initially, the choice data acquired from a customer's choices may provide a greater level of understanding as to particular preferences in an agent. As time goes by, though, predictions in regard to a particular customer may be made even when contextual factors to an interaction are new, for example, a new intent or when dealing with a new enterprise. Further, choice data for one customer may be used to make predictions about other customer base on similarities therebetween. Specifically, the predictions based on the choice data of a group of customers may be found applicable to another customer based on similarities found between the group and the other customer. As such customer choice data is obtained and updated in customer profiles 330, it may provide the basis for determining interaction predictors, which ultimately may be used within the personalize routing profiles to calculate agent favorableness ratings and influence subsequent routing decisions.

For example, if Jane constantly chooses to speak with a funny or entertaining agent for retail queries, the accumulated choice data can be used to influence not only the routing of Jane's future interactions, but also the routing of similar interactions of similar customers, such as Betty.

As will be appreciated, the present invention may include many different kinds of interaction predictors, which are applicable to specific interactions and contexts and helpful in personalizing routing decisions for individual customers. These interaction predictors include those that were just discussed in relation to the "Jane" and "Betty" examples but may also include those discussed above in the "Adam" examples of FIG. 12 that introduced personalized customer profiles. As will be recalled, that discussion provided details relating to interaction predictors involving emotional state, severity rating, and upselling/cross-selling opportunity. These will be touched on again in the context of predictive routing.

By analyzing the pattern of the interactions made by the customer across different contact centers, the systems of the present invention may be able to predict an emotional state of a customer coming into an incoming interaction and/or a severity rating for an interaction. For example, in an accident situation, a customer may have placed several previous calls to emergency services and insurance providers. Using the systems and methods already described, these previous interactions may be recognized by the personal bot 405 and used to predict an emotional state for the customer. Further, the personal bot 405 may be able to predict a severity rating for the interaction (i.e., how important the interaction is to the customer). As will be appreciated, in this case the severity rating would be predicted as being high or very severe. In either case, one or more interaction predictors could provide these predictions to a routing engine for use in the routing of the next interaction instigated by the customer. For example, in this case, the one or more interaction predictors used in building a personalized interaction profile may recommend that incoming interaction be routed to an agent who is serious, understanding, and adept at handling emotional customers.

In similar fashion, other interaction predictors can be used to provide contextual insights that produce better routing decisions. For example, interaction predictors may be configured to provide insights as to upselling or cross-selling opportunities. In this case, if the systems and methods described herein predict that the upselling or cross-selling opportunity of an incoming interaction is good, the interaction may be steered toward agents that are skilled in this area.

With reference now to FIG. 16, a method 900 is shown for personalizing the routing of an interaction initiated by a particular customer, which, again, will be referenced as a "first customer". In accordance with exemplary embodiments, the method 900 facilitates such routing in accordance with customer preferences. In presenting this aspect of the present invention, continued reference is made to FIGS. 13 and 15, as the method 900 draws on several of the ideas and concepts introduced above in relation to the methods 650 and 800, respectively. Further, continued reference is made to FIG. 14, which includes exemplary systems and components for performing the steps of methods, such as the one shown in FIG. 16.

The method 900 may begin at step 905 by receiving initial data identifying an incoming interaction initiated by the first customer. According to exemplary embodiments, the initial interaction data 765 may include data disclosing at least an intent of the incoming interaction and the contact center system 200 for which the interaction is intended. Using this information, the incoming interaction may be classified as being a particular type of interaction, which is referred to generally herein as a given type of interaction or interaction type. For example, a type of interaction may be defined by a particular type of intent. In regard to the exemplary system 700 of FIG. 14, the initial interaction data 765 may be sent by the personal bot 405 and received by the interaction profile module 715.

At a next step 910, the method 900 proceeds by generating a personalized routing profile that includes preferred agent characteristics data for the first customer for the given type of interaction. As described, this step may be performed by the interaction profile module 715, which includes (or at least communicates with) a predictor module 625 in communication with or having access to data stored in the customer profile 330 and/or the customer databases 610. According to exemplary embodiments, the performance of step 910 may include several actions, which are indicated in FIG. 16 as the broken-out subprocess of steps 911-914. This subprocess—which will be referred to as a "first process" and discussed more below—may include the following steps. At a step 911, the first process beings by identifying a dataset that includes interaction data from the customer profile of the first customer. At a step 912, the first process includes applying a machine learning algorithm across the dataset to identify patterns correlating actual agent characteristics to a desired outcome for the given type of interaction. At a step 913, the first process includes basing the preferred agent characteristics data for the incoming interaction on the actual agent characteristics data found to correlate to the desired outcome. And, at a step 914, the first process concludes by generating the personalized routing profile so to include the preferred agent characteristics data of the first customer.

Once the first process is performed, the method 900 proceeds to a step 915, which, as shown in FIG. 14, includes transmitting the personalized routing profile 770 to a routing engine 735. From there, the method 900 proceeds to a step 920, where a routing recommendation for the incoming interaction is derived based, at least in part, on the preferred agent characteristics data of the first customer. Finally, as also shown in FIG. 14, at a step 925, the method 900 concludes by transmitting the routing recommendation 775 to a contact center system 200 for use in routing the incoming interaction.

The method 900 may be performed in accordance with several additional or alternative steps, which, as will now be discussed, provide a range of functionality. Further, as with the method 650 of FIG. 13, the terminology used in describing the method 900 may be defined in accordance with several alternative uses to cover a range of different applications, as provided in the following examples.

As already described, the first process is the process by which the personalized routing profile is generated. According to exemplary embodiments, the personalized routing profile is a profile specifically tailored to a particular interaction for a particular customer. The personalized routing profile, thus, may include specific data pertaining to the interaction and the customer that may be used to facilitate the routing of interactions in accordance with one or more preferences of the first customer. With this in mind, the first process may generally include the steps of: a) accessing data from a database that includes at least a first customer profile storing data relating to the first customer; b) based on the accessed data and the intent of the first incoming interaction, determining preferred agent characteristics data of the first customer for the first incoming interaction; and c) generating the personalized routing profile so to include the preferred agent characteristics data of the first customer. Within this general methodology, several other specific embodiments of the first process will now be described.

As a first embodiment, the data used by the first process includes interaction data relating to past interactions that occurred between the first customer and a plurality of the contact centers. With this embodiment, the first process includes the steps of: a) identifying, from the past interactions of the first customer, qualifying examples in which an intent matches the intent of the first incoming interaction, and a desired outcome is achieved; b) determining one or more consistencies across the actual agent characteristics data of the agents in the qualifying examples of the past interactions; and c) basing the preferred agent characteristics data for the first incoming interaction on the one or more consistencies across the actual agent characteristics data.

As a second embodiment, the data used by the first process again includes interaction data relating to past interactions that occurred between the first customer and a plurality of the contact centers. With this embodiment, the first process include the steps of: a) applying a machine learning algorithm across the interaction data from the past interactions to identify patterns correlating one or more factors to a desired outcome for a given type of interaction, wherein, in performing this step: the one or more factors may be defined as the actual agent characteristics data of the agents in the past interactions; the desired outcome may be defined as ones of the past interactions receiving positive customer feedback or achieving a successful resolution; the type of interaction is defined as an interaction having an intent that matches the intent of the first incoming interaction; and b) basing the preferred agent characteristics data for the first incoming interaction on the actual agent characteristics data found to correlate to the desired outcome. As with other embodiments, the machine learning algorithm may include a neural network.

A third embodiment may include the first customer and a plurality of other customers (or "other customers"). The data used by the first process may further include one or more customer databases that include interaction data relating to past interactions that occurred between the other customers and a plurality of the contact centers. With this embodiment, the first process includes the steps of: a) identifying, from the past interactions of the other customers, qualifying examples in which an intent matches the intent of the first incoming interaction; a desired outcome is achieved; and a predetermined similarity is found to exist between the first customer and a particular one of the other customers involved in the past interaction; b) determining one or more consistencies across the actual agent characteristics data of the agents in the qualifying examples of the past interactions; and c) basing the preferred agent characteristics data for the first incoming interaction on the one or more consistencies across the actual agent characteristics data.

In a fourth embodiment, the first process may again use data derived from one or more customer databases that include interaction data relating to past interactions that occurred between the other customers and a plurality of the contact centers. With this embodiment, the first process includes the steps of: a) applying a machine learning algorithm across the interaction data from the past interactions to identify patterns correlating one or more factors to a desired outcome relevant to a type of customer given the type of interaction, wherein, in performing this step: the one or more factors is defined as the actual agent characteristics data of the agents in the past interactions; the desired outcome is defined as ones of the past interactions receiving positive customer feedback or achieving a successful resolution; the type of interaction is defined as an interaction having an intent that matches the intent of the first incoming interaction; and the type of customer is defined as one that shares one or more common characteristics with the first customer; and b) basing the preferred agent characteristics data for the first incoming interaction on the actual agent characteristics data found to correlate to the desired outcome. In addition, the customer profile and the one or more customer databases may store biographical personal data relating to the first customer and the other customers, respectively. The one or more common characteristics may include one or more characteristics stored within the biographical personal data.

In a fifth embodiment, the interaction data of the other customers may include feedback data, with the feedback data including an evaluation provided by a particular one of the other customers in relation to a particular one of the past interactions. With this embodiment, the first process includes the steps of: a) applying a machine learning algorithm across the interaction data from the past interactions to identify patterns correlating one or more factors to a desired outcome relevant to a type of customer given a type of interaction, wherein, in performing this step: the one or more factors is defined as the actual agent characteristics data of the agents in the past interactions; the desired outcome is defined as ones of the past interactions wherein the feedback data is classified as being positive; the type of interaction is defined as an interaction having an intent that matches the intent of the first incoming interaction; and the type of customer is defined by a shared similarity with the first customer; and b) basing the preferred agent characteristics data for the first incoming interaction on the actual agent characteristics data found to correlate to the desired outcome. The feedback data may include feedback inferred from one or more statements made by the other customers within a concluding portion of the past interactions, which is also discussed above as conclusory statement data.

In a sixth embodiment, the interaction data of the other customers may include choice data, with the choice data including data relating to selections the other customers make when allowed to select an agent (or "selected agent") from a plurality of offered agents. With this embodiment, the first process includes the steps of: a) applying a machine learning algorithm across the interaction data from the past interactions to identify patterns correlating one or more factors to a desired outcome relevant to a type of customer given a type of interaction, wherein, in performing this step: the one or more factors is defined as the actual agent characteristics data of the selected agents; the desired outcome is defined as ones of the past interactions receiving positive customer feedback or achieving a successful resolution; the type of interaction is defined as an interaction having an intent that matches the intent of the first incoming interaction; and the type of customer is defined as one that shares a predetermined similarity with the first customer; and b) basing the preferred agent characteristics data for the first incoming interaction on the actual agent characteristics data found to correlate to the desired outcome.

In a seventh embodiment, the first process may include the steps of: determining one or more contextual factors relating to the incoming interaction by finding relationships between the initial data and data stored within the customer profile of the first customer; and based on the one or more contextual factors, determining an interaction predictor, the interaction predictor comprising a prediction applicable to the first customer for the incoming interaction. In this case, the determination of the preferred agent characteristics data of the first customer for the first incoming interaction is also based on the interaction predictor. The interaction predictor may include a predicted upselling/cross-selling opportunity rating. The predicted upselling/cross-selling opportunity rating is defined as a receptiveness of the first customer to considering offers made by the agent in relation to upselling or cross-selling during the first incoming interaction. Alternatively, the interaction predictor may include a severity rating. The severity rating predicting a level of importance that the first customer ascribes to the first incoming interaction. As another alternative, the interaction predictor may include a predicted emotional state. In this case, for example, the one or more contextual factors may include a minimum number (e.g., at least two) of the past interactions of the first customer being instigated by the first customer within a predetermined lookback period (e.g., less than 6 hours). The predetermined lookback period may be measured from when the first customer instigates the first incoming interaction. The past interactions instigated by the first customer within the predetermined lookback each may include: a subject matter that matches a subject matter of the first incoming interaction; and an unsuccessful attempt at resolving a customer problem relating to the subject matter. In such cases, the predicted emotional state may include a negative emotional state.

Though not necessary to practice aspects of the present invention, certain embodiments include the performance of additional or downstream steps whereby the personalized routing profile, as generated by the first process, is utilized in some way. Several of these alternatives will now be presented in which these downstream steps will be reference as a "second process".

For example, the present invention may include a second process that simply includes deriving the routing recommendation based on the preferred agent characteristics data of the first customer. As an alternative, the personalized routing profile may be transmitting the to a routing engine for use in deriving a routing recommendation for the first incoming interaction. In another example, the second process includes the steps of: a) deriving the routing recommendation for the first incoming interaction based on the preferred agent characteristics data of the first customer; and b) transmitting the routing recommendation to a contact center for routing the first incoming interaction in accordance therewith.

Another exemplary embodiment includes a second process that generates a routing recommendation based on the personalized routing profile. In this case, the second process may include the steps of: receiving data identifying candidate agents, the candidate agents comprising at least two of the agents of the first contact center that qualify for handling the incoming interaction; receiving actual agent characteristics data for each of the candidate agents; calculating an agent favorableness score for each of the candidate agents, the agent favorableness score comprising a mathematical representation indicative of how closely a match is between the actual agent characteristics data for a particular one of the candidate agents and the preferred agent characteristics data of the first customer; identifying a most favored candidate agent as a one of the candidate agents producing the agent favorable score indicating a closest match between the actual agent characteristics data and the preferred agent characteristics data; and generating a routing recommendation that recommends routing the first incoming interaction to the most favored candidate agent. The second process may further include the step of causing the first incoming interaction to be routed in accordance with the routing recommendation. Alternatively, the second process may further include the step of transmitting the routing recommendation to the first contact center for use thereby in routing the first incoming interaction.

In other exemplary embodiments, the second process includes receiving information from the contact center to generate the routing recommendation. For example, in this case, the second process may include the steps of: a) receiving contact center-side data from the first contact center relating to the first incoming interaction, the contact center-side data disclosing at least: candidate agents, the candidate agents comprising at least two of the agents of the first contact center that qualify for handling the incoming interaction; actual agent characteristics data for each of the candidate agents; and preferred agent characteristics data of the first contact center, the preferred agent characteristics data comprising data that describes preferences of the first contact center in relation to the agent criteria based on a contact center performance objective; b) generating combined preferred agent characteristics data by combining via a weighted average the preferred agent characteristics data of the first customer and the preferred agent characteristics data of the first contact center; c) calculating an agent favorableness score for each of the candidate agents, the agent favorableness score comprising a mathematical representation indicative of how closely a match is between the actual agent characteristics data for a particular one of the candidate agents and the combined preferred agent characteristics data; d) identifying a most favored candidate agent as a one of the candidate agents producing the agent favorable score indicating a closest match between the actual agent characteristics data and the combined preferred agent characteristics data; e) generating the routing recommendation that recommends routing the first incoming interaction to the most favored candidate agent; and f) transmitting the routing recommendation to the first contact center.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A computer-implemented method for personalizing a delivery of services to a first customer, the first customer having a communication device through which the first customer conducts interactions with contact centers, the method comprising:
    providing a customer profile that stores data related to the first customer;
    updating the customer profile via performing a first subprocess to collect interaction data related to the interactions between the first customer and the contact centers, the first subprocess being performed repetitively so to update the customer profile after each successive one of the interactions, a plurality of the steps of the first subprocess being performed by an automated assistant operating on the communication device of the first customer, wherein, described in relation to an exemplary first interaction between the first customer and a first contact center, the first subprocess includes the steps of:
        monitoring activity on the communication device and, therefrom, detecting the first interaction with the first contact center;
        identifying data relating to the first interaction for collecting as the interaction data; and
        updating the customer profile to include the interaction data identified from the first interaction;
    generating an interaction predictor, the interaction predictor comprising knowledge about the first customer derived, at least in part, from the interaction data stored within the customer profile, the knowledge comprising a behavioral factor attributable to the first customer given a first interaction type; and
    augmenting the customer profile by storing therein the interaction predictor, the storage of the interaction predictor linking the behavioral factor to the first interaction type to facilitate real time retrieval when detecting an incoming interaction of the first interaction type;
    detecting the incoming interaction that comprises the first interaction type;
    in response to detecting the first interaction type, retrieving the interaction predictor and identifying the behavioral factor corresponding thereto; and
    modifying, in accordance with the behavioral factor, a manner in which the services are delivered to the first customer in the incoming interaction;
    wherein the contact centers involved in the interactions from which the interaction data was collected include multiple different ones of the contact centers; and
    wherein the customer profile comprises one or more cloud-hosted databases that are updated, in accordance with the first subprocess, via the automated assistant transmitting the collected interaction data over a network to the one or more cloud-hosted databases.

2. The computer-implemented method according to claim 1, further comprising the step of:
    transmitting the behavioral factor to a one of the contact centers involved in the incoming interaction for use thereby in modifying the manner in which the services are delivered to the first customer in the incoming interaction;
    wherein the behavioral factor of the interaction predictor is defined as an emotional state, behavioral tendency, or preference attributable to the first customer given the first interaction type.

3. The computer-implemented method according to claim 1, wherein the interaction predictor is generated by a second subprocess that includes the steps of:
    after the customer profile is updated by a completed iteration of the first subprocess, identifying a dataset that includes the interaction data stored in the customer profile; and
    deriving the knowledge of the interaction predictor by applying a machine learning algorithm to the dataset to identify patterns therein correlating one or more input factors to one or more outcomes relevant to the first customer given the first interaction type.

4. The computer-implemented method according to claim 3, wherein the behavioral factor of the interaction predictor comprises an emotional state attributable to the first customer given the first interaction type, the emotional state described by at least one descriptor representative of either a negative emotional state or a positive emotional state.

5. The computer-implemented method according to claim 4, wherein the interaction data included in the dataset comprises data from the interactions evidencing the negative and positive emotional states, including at least one of the following:
    feedback data comprising data related to an evaluation, survey, or satisfaction score provided by the first customer after a termination of the interaction; and
    conclusory statement data comprising data related to statements made by the first customer as the interaction is concluding, wherein the meaning of the statements is extracted by natural language processing.

6. The computer-implemented method according to claim 4, wherein the first interaction type is defined as ones of the interactions having a particular intent such that:
    the interaction predictor comprises a customer-specific prediction relating to the emotional state of the first customer for an incoming interaction having the particular intent.

7. The computer-implemented method according to claim 4, wherein the first interaction type is defined as ones of the interactions involving a particular one of the contact centers such that:
    the interaction predictor comprises a customer-specific prediction relating to the emotional state of the first customer for an incoming interaction involving the particular one of the contact centers.

8. The computer-implemented method according to claim 7, wherein the second subprocess for generating the interaction predictors is repeated after successive iterations of the first subprocess until the customer profile includes the interaction predictors predicting the emotional state of the first customer for incoming interactions involving each of the contact centers.

9. The computer-implemented method according to claim 7, wherein a plurality of the steps of the first subprocess is performed by an automate assistant operating on the communication device of the first customer;
further comprising the steps of:
generating, by the automated assistant, one or more user interfaces on a display of the communication device that:
show the emotional state of the interaction predictor related to the particular one of the contact centers; and
prompt the first customer for input modifying the emotional state of the interaction predictor;
receiving, by the automated assistant, input from the first customer modifying the emotional state of the interaction predictor; and
updating, by the automated assistant, the emotional state of the interaction predictor in accordance with the input received from the first customer.

10. The computer-implemented method according to claim 3, wherein the behavioral factor of the interaction predictor comprises an emotional state attributable to the first customer given the first interaction type, the emotional state comprising a severity rating that rates a level of importance the first customer places on the first interaction type; and
wherein the interaction data included in the dataset comprises data from the interactions evidencing the level of importance the first customer placed on the interaction, the level of importance being based, at least in part, on an analysis of an interaction transcript in which usage of words indicative of a high level of emotionality and/or a low level of emotionality is evaluated.

11. The computer-implemented method according to claim 10, wherein the first interaction type is defined as ones of the interactions having a particular intent such that:
the interaction predictor comprises a customer-specific prediction relating to the severity rating the first customer places on an incoming interaction having the particular intent.

12. The computer-implemented method according to claim 3, wherein the behavioral factor of the interaction predictor comprises a a behavioral tendency attributable to the first customer given the first interaction type, the behavioral tendency comprising an upselling/cross-selling opportunity rating that rates a willingness of the first customer to consider an upselling or cross-selling offer given the first interaction type; and
wherein the interaction data included in the dataset comprises data from the interactions describing at least one of: unsuccessful upselling or cross-selling offers; successful upsell or cross-selling offers; or service or products purchased in relation to upselling or cross-selling offers.

13. The computer-implemented method according to claim 12, wherein the first interaction type is defined as ones of the interactions having a particular intent such that:
the interaction predictor comprises a customer-specific prediction relating to the upselling/cross-selling opportunity rating for the first customer for an incoming interaction having the particular intent.

14. The computer-implemented method according to claim 3, wherein the behavioral factor of the interaction predictor comprises an agent preference attributable to the first customer given the first interaction type, the agent preference comprising a preferred agent characteristic for the first customer given the first interaction type; and
wherein the interaction data included in the dataset comprises choice data, the choice data comprising preferred agent characteristics of the first customer based on manual selections the first customer previously made when prompted to manually select an agent from among a plurality of offered agents.

15. The computer-implemented method according to claim 14, wherein the first interaction type is defined as ones of the interactions having a particular intent such that:
the interaction predictor comprises a customer-specific prediction relating to the preferred agent characteristic for the first customer for an incoming interaction having the particular intent.

16. The computer-implemented method according to claim 2, further comprising the step of:
providing one or more customer databases storing data related to other customers, wherein the one or more customer databases include interaction data relating to interactions occurring between the other customers and the contact centers; and
wherein the interaction predictor is generated by a second subprocess that includes the steps of:
identifying a dataset that includes the interaction data stored within the one or more customer databases;
deriving the knowledge of the interaction predictor by applying a machine learning algorithm to the dataset to identify patterns therein correlating one or more input factors to one or more outcomes relevant to a type of customer given the first interaction type; and
attributing the interaction predictor to the first customer based shared similarities between the first customer and the type of customer.

17. The computer-implemented method according to claim 16, wherein the type of customer represents a subgroup of the other customers having one or more common characteristics found to be predictively relevant by the machine learning algorithm in regard to the interaction predictor; and
wherein the step of attributing the interaction predictor to the first customer comprises:
after the customer profile is updated by a completed iteration of the first subprocess, identifying data within the customer profile relevant to the one or more common characteristics; and
confirming that the one or more common characteristics are possessed by the customer.

18. The computer-implemented method according to claim 17, wherein the customer profile and the one or more customer databases store biographical personal data relating to the first customer and the other customer, respectively;
wherein the one or more common characteristics relate to one or more respective characteristics stored within the biographical personal data;
wherein the behavioral factor of the interaction predictor is defined as an emotional state, behavioral tendency, or preference, and the machine learning algorithm comprises a neural network.

19. The computer-implemented method according to claim 18, wherein the behavioral factor of the interaction predictor comprises an emotional state attributable to the type of customer given the first interaction type, the emotional state described by at least one descriptor representative of either a negative emotional state or a positive emotional state;
wherein the interaction data included in the dataset comprises data from the interactions evidencing the negative and positive emotional states, including at least one of the following:

feedback data comprising data related to an evaluation, survey, or satisfaction score provided by a particular one of the other customers after a termination of the interaction; and conclusory statement data comprising data related to statements made a particular one of the other customers as the interaction is concluding, wherein the meaning of the statements is extracted by natural language processing.

20. The computer-implemented method according to claim 19, wherein the first interaction type is defined as ones of the interactions having a particular intent such that, once attributed to the first customer:

the interaction predictor comprises a customer-specific prediction relating to the emotional state of the first customer for an incoming interaction having the particular intent.

21. The computer-implemented method according to claim 19, wherein the first interaction type is defined as ones of the interactions having a particular one of the contact centers such that, once attributed to the first customer:

the interaction predictor comprises a customer-specific prediction relating to the emotional state of the first customer for an incoming interaction involving the particular one of the contact centers.

22. A system for personalizing a delivery of services to a first customer, the first customer having a communication device through which the first customer conducts interactions with contact centers, the system comprising:

a hardware processor; and a machine-readable storage medium on which is stored instructions that cause the hardware processor to execute a process, wherein the process comprises the steps of:

providing a customer profile that stores data related to the first customer;

updating the customer profile via performing a first subprocess to collect interaction data related to the interactions between the first customer and the contact centers, the first subprocess being performed repetitively so to update the customer profile after each successive one of the interactions, a plurality of the steps of the first subprocess being performed by an automated assistant operating on the communication device of the first customer, wherein, described in relation to an exemplary first interaction between the first customer and a first contact center, the first subprocess includes the steps of:

monitoring activity on the communication device and, therefrom, detecting the first interaction with the first contact center;

identifying data relating to the first interaction for collecting as the interaction data; and updating the customer profile to include the interaction data identified from the first interaction;

generating an interaction predictor, the interaction predictor comprising knowledge about the first customer derived, at least in part, from the interaction data stored within the customer profile, the knowledge comprising a behavioral factor attributable to the first customer given a first interaction type;

augmenting the customer profile by storing therein the interaction predictor, the storage of the interaction predictor linking the behavioral factor to the first interaction type to facilitate real time retrieval when detecting an incoming interaction of the first interaction type;

detecting the incoming interaction that comprises the first interaction type;

in response to detecting the first interaction type, retrieving the interaction predictor and identifying the behavioral factor corresponding thereto; and modifying, in accordance with the behavioral factor, a manner in which the services are delivered to the first customer in the incoming interaction;

wherein the contact centers involved in the interactions from which the interaction data was collected include multiple different ones of the contact centers; and wherein the customer profile comprises one or more cloud-hosted databases that are updated, in accordance with the first subprocess, via the automated assistant transmitting the collected interaction data over a network to the one or more cloud-hosted databases.

23. The system according to claim 22, wherein the process further comprises the step of:

transmitting the behavioral factor to a one of the contact centers involved in the incoming interaction for use thereby in modifying the manner in which the services are delivered to the first customer in the incoming interaction;

wherein the behavioral factor of the interaction predictor is defined as an emotional state, behavioral tendency, or preference attributable to the first customer given the first interaction type.

24. The system according to claim 22, wherein the interaction predictor is generated by a second subprocess that includes the steps of:

after the customer profile is updated by a completed iteration of the first subprocess, identifying a dataset that includes the interaction data stored in the customer profile; and deriving the knowledge of the interaction predictor by applying a machine learning algorithm to the dataset to identify patterns therein correlating one or more input factors to one or more outcomes relevant to the first customer given the first interaction type;

wherein the behavioral factor of the interaction predictor comprises an emotional state attributable to the first customer given the first interaction type, the emotional state described by at least one descriptor representative of either a negative emotional state or a positive emotional state.

* * * * *